US012626167B2

(12) United States Patent
Galvin et al.

(10) Patent No.: US 12,626,167 B2
(45) Date of Patent: May 12, 2026

(54) SYSTEM AND METHOD FOR LARGE LANGUAGE MODEL WITH INTEGRATED MEMORY DURING INFERENCE USING MANIFOLD TRAVERSAL ARCHITECTURE

(71) Applicant: AtomBeam Technologies Inc., Moraga, CA (US)

(72) Inventors: Brian Galvin, Silverdale, WA (US); Alan McCord, Forney, TX (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/339,302

(22) Filed: Sep. 25, 2025

(65) Prior Publication Data

US 2026/0023992 A1 Jan. 22, 2026

Related U.S. Application Data

(63) Continuation-in-part of application No. 19/294,125, filed on Aug. 7, 2025, now Pat. No. 12,579,437,
(Continued)

(51) Int. Cl.
*G06N 5/045* (2023.01)
*G06N 5/02* (2023.01)

(52) U.S. Cl.
CPC ............... *G06N 5/045* (2013.01); *G06N 5/02* (2013.01)

(58) Field of Classification Search
CPC ............ G06N 5/045; G06N 5/02; G06N 5/04; G06Q 10/067; G06F 12/0811;
(Continued)

(56) References Cited

U.S. PATENT DOCUMENTS

| | | | |
|---|---|---|---|
| 4,780,718 | A | 10/1988 | Hudson et al. |
| 5,708,436 | A | 1/1998 | Loiz et al. |

(Continued)

FOREIGN PATENT DOCUMENTS

| | | | |
|---|---|---|---|
| EP | 3364212 A1 | 8/2018 | |
| GB | 2620921 A | 1/2024 | |
| WO | 2020104416 A1 | 5/2020 | |

OTHER PUBLICATIONS

RamÃ-rez, Guillem, et al. "Cache & distil: Optimising api calls to large language models." arXiv preprint arXiv:2310.13561 (2023). (Year: 2023).*

(Continued)

*Primary Examiner* — Randall K. Baldwin
(74) *Attorney, Agent, or Firm* — GALVIN PATENT LAW LLC; Brian R. Galvin; Alec L. Perry

(57) ABSTRACT

A large language model system integrates persistent memory directly into inference operations through geometric manifold traversal rather than external retrieval. The system implements a memory-integrated inference engine that performs token generation with simultaneous memory access by navigating curved regions in a geometric memory manifold. Memories exist as navigable basins of increased curvature that are reinforced through usage rather than stored as discrete objects. An intent conditioning system formulates user queries as utility functions and generates vector fields that guide goal-directed memory traversal. A manifold geometry interface converts geometric memory coordinates into vectors compatible with language model attention mechanisms, augmenting standard key-value caches with memory-derived content. The system performs intentional remembering through path optimization that balances fidelity to prior cognitive trajectories with current intent guidance. Each memory access operation simultaneously retrieves information and strengthens accessed memory
(Continued)

regions through bidirectional geometric shaping, enabling persistent cognitive evolution and cross-session memory continuity.

20 Claims, 39 Drawing Sheets

Related U.S. Application Data which is a continuation-in-part of application No. 19/203,069, filed on Jun. 3, 2025, now Pat. No. 12,481,688, which is a continuation-in-part of application No. 19/205,960, filed on May 12, 2025, said application No. 19/294,125 is a continuation-in-part of application No. 19/178,873, filed on Apr. 15, 2025, which is a continuation-in-part of application No. 19/177,611, filed on Apr. 13, 2025, now Pat. No. 12,572,471, said application No. 19/205,960 is a continuation-in-part of application No. 19/060,794, filed on Feb. 24, 2025, said application No. 19/177,611 is a continuation-in-part of application No. 19/051,193, filed on Feb. 12, 2025, now Pat. No. 12,387,050, said application No. 19/060,794 is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024.

(60) Provisional application No. 63/847,408, filed on Jul. 20, 2025, provisional application No. 63/651,359, filed on May 23, 2024.

(58) Field of Classification Search
CPC ........... G06F 1/3212; G06F 2212/6042; G06F 40/30; G06F 40/35; G06F 16/3329; G06F 16/3325
See application file for complete search history.

(56) References Cited

U.S. PATENT DOCUMENTS 7,411,540 B1 8/2008 Lopez et al.
7,629,922 B2 12/2009 Winstead et al.
7,876,257 B2 1/2011 Vetro et al.
9,524,392 B2 12/2016 Naehrig et al.
11,451,242 B2 9/2022 Choi et al.
11,656,353 B2 5/2023 Li et al.
11,972,333 B1 * 4/2024 Horesh ................ G06N 3/0475
12,387,050 B1 * 8/2025 Galvin .................... G06F 40/30
12,481,688 B1 * 11/2025 Galvin ................ G06F 16/3347
2004/0017307 A1 1/2004 Cirillo et al.
2004/0160353 A1 8/2004 Cirillo et al.
2008/0231504 A1 9/2008 Sartor et al.
2011/0012778 A1 1/2011 Nguyen et al.
2015/0054678 A1 2/2015 Wakayama
2017/0048537 A1 2/2017 Boufounos et al.
2018/0196609 A1 7/2018 Niesen
2019/0147349 A1 * 5/2019 Ng .......................... G06N 5/02 706/12
2020/0258296 A1 8/2020 Pennings et al.
2022/0156631 A1 5/2022 Kanso et al.
2022/0404490 A1 12/2022 Evans et al.
2023/0131694 A1 4/2023 Saber et al.
2023/0169623 A1 6/2023 Chen et al.
2023/0184927 A1 6/2023 Chen et al.
2023/0316006 A1 * 10/2023 Tunstall-Pedoe .... G06N 3/0442 704/9
2023/0401262 A1 * 12/2023 Orús Lacort .......... G06N 10/60
2024/0104391 A1 * 3/2024 Higgins .............. G06F 16/3329
2024/0135283 A1 * 4/2024 Sahoo .............. G06Q 10/06315
2024/0185037 A1 6/2024 Park et al.
2024/0195438 A1 6/2024 Isik et al.
2024/0354320 A1 * 10/2024 Procter ................. G06F 40/103
2024/0420491 A1 * 12/2024 Park ....................... G06V 20/70
2025/0259082 A1 * 8/2025 Crabtree ................ G06N 3/047
2025/0291866 A1 * 9/2025 Park ...................... G06F 16/632

OTHER PUBLICATIONS

Lu, Meng. "A mathematical framework of intelligence and consciousness based on Riemannian Geometry." arXiv preprint arXiv:2407.11024 (2024). (Year: 2024).*
Zhang, Dawen, et al. "A layered architecture for developing and enhancing capabilities in large language model-based software systems." arXiv preprint arXiv:2411.12357 (2024). (Year: 2024).*
Zhou, Hao, et al. "Large Language Model (LLM) for Telecommunications: A Comprehensive Survey on Principles, Key Techniques, and Opportunities." arXiv preprint arXiv:2405.10825 v2 (2024). (Year: 2024).*
Bai, Guangji, et al. "Beyond efficiency: A systematic survey of resource-efficient large language models." arXiv preprint arXiv:2401.00625 (2024). (Year: 2024).*
Yin, Wangsong, et al. "Llm as a system service on mobile devices." arXiv preprint arXiv:2403.11805 (2024). (Year: 2024).*
Chen, Daihang, et al. "LLM for Mobile: An Initial Roadmap." arXiv preprint arXiv:2407.06573 (2024). (Year: 2024).*
Fungwacharakorn, Wachara, et al. "Layer-of-Thoughts Prompting (LoT): Leveraging LLM-Based Retrieval with Constraint Hierarchies." arXiv preprint arXiv:2410.12153 (2024). (Year: 2024).*
Spivack, Nova, et al. "Cognition is All You Need—The Next Layer of Al Above Large Language Models." arXiv preprint arXiv:2403.02164 (2024). (Year: 2024).*
Patil, Sarang, et al. "Hyperbolic Large Language Models." arXiv preprint arXiv:2509.05757 (Sep. 6, 2025). (Year: 2025).*
Vassilis, Koinis, et al. "Lexical manifold reconfiguration in large language models: A novel architectural approach for contextual modulation." arXiv preprint arXiv:2502.08818 (Feb. 2025). (Year: 2025).*
Kingswell, Jonathan, et al. "Sequential manifold regularization for large language model contextual stability." (Aug. 2025). (Year: 2025).*
Li, Xin. "Manifold Learning via Memory and Context." arXiv preprint arXiv:2407.09488 v3 (Jul. 2025). (Year: 2025).*
Morgoulis, Daria. "4D Semantic Coupling: A Mathematical Framework for Measuring Cognitive Complexity in AI Dialogue." Authorea Preprints (Aug. 2025). (Year: 2025).*
Hu, Pengbo, and Xiang Ying. "Unified mind model: Reimagining autonomous agents in the LLM era." arXiv preprint arXiv:2503.03459 v2 (Mar. 2025). (Year: 2025).*
Luo, Haoxiang, et al. "Toward Edge General Intelligence with Multiple-Large Language Model (Multi-LLM): Architecture, Trust, and Orchestration." arXiv preprint arXiv:2507.00672 (Jul. 2025). (Year: 2025).*
Xu, Wenchao, et al. "Deploying foundation model powered agent services: A survey." IEEE Communications Surveys & Tutorials (Jun. 2025). (Year: 2025).*
Balaneshin-Kordan, Saeid et al; "Deep Neural Architecture for Multi-Modal Retrieval based on Joint Embedding Space for Text and Images", Association for Computing Machinery, Feb. 5-9, 2018, pp. 1-9, Marina Del Rey, CA, USA.
Gim, In, et al; "Prompt Cache: Modular Attention Reuse for Low-Latency Inference", arXiv:2311.04934v2, Apr. 2024.

(56) References Cited

OTHER PUBLICATIONS

Khan, Abdul Rafae, et al; "Coding Textual Inputs Boosts the Accuracy of Neural Networks", 2020 Conference on Empirical Methods in Natural Language Processing, Nov. 16-20, 2020, pp. 1350-1360.
Messina, Nicola et al; "Towards Efficient Cross-Modal Visual Textual Retrieval using Transformer-Encoder Deep Features", 2021 International Conference on Content-Based Multimedia Indexing, 2021, pp. 1-6, United States.
Seo, Beomsoek et al; "How Does A Transformer Learn Compression? An Attention Study on Huffman and LZ4", Department of Electronic and Electrical Engineering, Dec. 12, 2023, vol. 11, Seoul, South Korea.
Vaswani, Ashish, et al; "Attention is All You Need", arXiv:1706.03762v7, Aug. 2023.
Wang, Tianming, & Wan, Xiaojun; "T-CVAE: Transformer-based conditioned variational autoencoder for story completion", Proceedings of the Twenty-Eighth Joint Conference on Artificial Intelligence, pp. 5233-5239, 2019.
Wieting, John et al; "A Bilingual Generative Transformer for Semantic Sentence Embedding", arXiv:1911.03895v2, Nov. 2020.

* cited by examiner

Receive a prompt from a user
700

Process the prompt through a first large language model
710

Convert the prompt into thoughts using the first large language model
720

Route both the prompt and the thoughts to a second large language model that has less parameters than the first large language model
730

Generate a response using the second large language model using the prompt and the generated thoughts from the first large language model
740

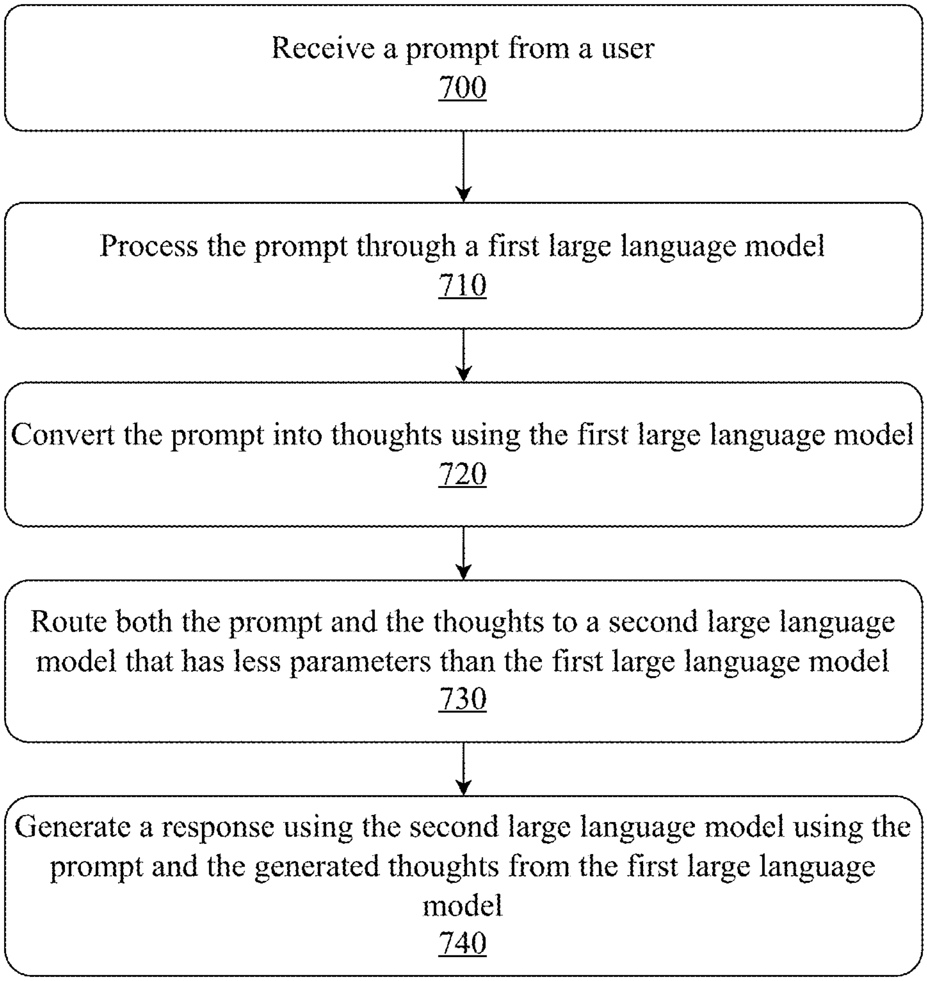

FIG. 7

1301 ～ Candidate thoughts are collected from user interactions and filtered for privacy and consent.

1302 ～ Structural patterns across candidate thoughts are identified and clustered based on similar reasoning approaches.

1303 ～ User-specific information and context are identified and removed from candidate thoughts.

1304 ～ Core reasoning patterns are extracted and abstracted into generalized thought templates.

1305 ～ Abstracted thought templates are validated for utility, privacy preservation, and quality.

1306 ～ Validated thought templates are indexed and stored in global cache for future retrieval.

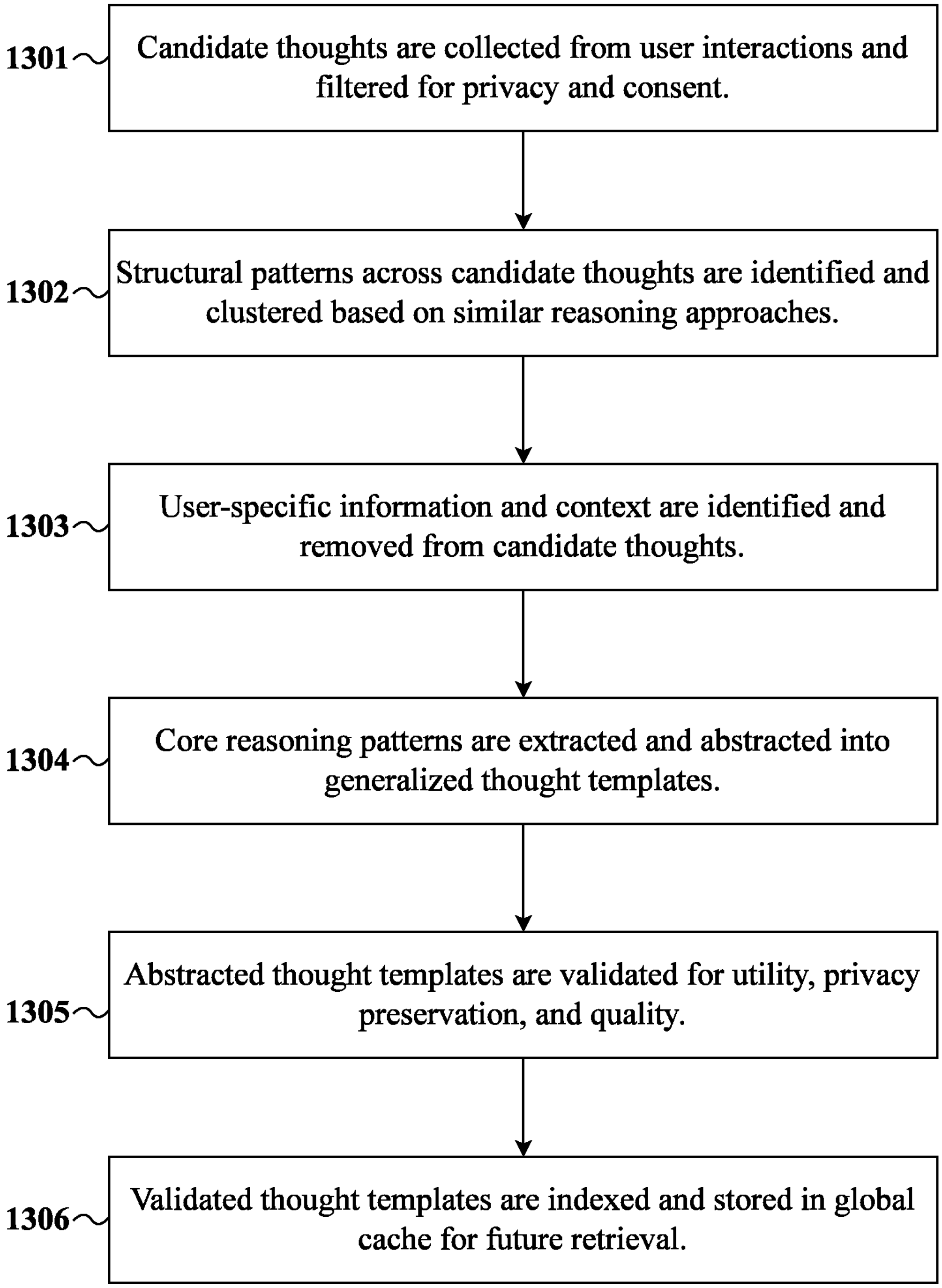

FIG. 13

SYSTEM AND METHOD FOR LARGE LANGUAGE MODEL WITH INTEGRATED MEMORY DURING INFERENCE USING MANIFOLD TRAVERSAL ARCHITECTURE

CROSS-REFERENCE TO RELATED APPLICATIONS

Priority is claimed in the application data sheet to the following patents or patent applications, which are expressly incorporated herein by reference in their entireties:

Ser. No. 19/178,873,
Ser. No. 19/177,611,
Ser. No. 19/051,193 (issued as U.S. Pat. No. 12,387,050),
Ser. No. 19/203,069 (issued as U.S. Pat. No. 12,481,688),
Ser. No. 19/205,960 (published as US 2025-0363367 A1),
Ser. No. 19/060,794 (published as US 2025-0363363 A1).
Ser. No. 19/044,546 (published as US 2025-0363360 A1).
Ser. No. 19/026,276 (published as US 2025-0363359 A1)
Ser. No. 18/928,022 (published as US 2025-0363358 A1),
Ser. No. 18/919,417 (published as US 2025-0363347 A1).
Ser. No. 18/918,077 (published as US 2025-0363333 A1),
Ser. No. 18/737,906 (published as US 2025-0378308 A1)
Ser. No. 18/736,498 (published as US 2025-0363344 A1), and
63/651,359.

BACKGROUND OF THE INVENTION

Field of the Invention

This present invention relates to artificial intelligence systems, specifically large language models with integrated persistent memory architectures that perform memory access through geometric manifold traversal during inference operations.

Discussion of the State of the Art

Language models have evolved significantly in recent years, with modern architectures demonstrating remarkable capabilities in natural language processing, reasoning, and generation tasks. These large language models (LLMs) have become increasingly sophisticated, processing and generating human-like text across a wide range of applications. As these models have grown in capability, they have also grown substantially in size, with some models containing hundreds of billions of parameters.

Modern LLMs process input prompts through complex architectures consisting of encoder and decoder blocks with attention mechanisms. Recent developments have revealed that these models often engage in an internal reasoning process, generating "thoughts" about a prompt before producing a final response. These thoughts represent the model's step-by-step reasoning and analysis of the input prompt. While some models expose these thoughts to users, others keep them internal to the model's processing pipeline. These reasoning steps have proven important to the model's ability to provide accurate and contextually appropriate responses.

The computational resources required to run these large models present significant challenges for widespread deployment and real-time applications. The memory and processing requirements often necessitate specialized hardware and substantial computational infrastructure. Additionally, context windows in current architectures limit the amount of information that can be processed in a single session, constraining the model's ability to maintain long-term context and engage in extended conversations. While various solutions like retrieval-augmented generation have been proposed to address context limitations, these systems typically rely on document retrieval rather than leveraging the model's own reasoning processes.

The deployment of these models presents significant challenges in terms of scalability and accessibility. Current solutions often require either substantial local computing resources or constant connection to cloud services with significant computational capacity. This is particularly problematic for mobile devices, which face inherent constraints including limited processing power, restricted memory capacity, battery limitations, and intermittent network connectivity. The combination of these constraints severely limits the practical applications of advanced language models on mobile platforms, creating a substantial gap between the capabilities available in controlled environments and those accessible to users on mobile devices in real-world scenarios.

Recent mobile-optimized approaches have begun addressing these constraints through techniques such as model quantization, on-device processing, and thought caching. However, these systems still primarily function as responsive tools rather than continuous reasoning partners. Current mobile LLM implementations operate only during active user engagement, ceasing all cognitive processes during device inactivity periods. This creates significant inefficiencies in knowledge development and insight generation, as the system's computational capabilities remain dormant during substantial portions of the day. Furthermore, users who interact with language models across multiple devices experience fragmented cognitive contexts, with each device maintaining separate understanding and reasoning paths rather than providing a unified cognitive experience. Additionally, current systems lack meaningful domain specialization, treating all knowledge areas with the same generalized approach rather than developing deep expertise in particular fields. While some systems implement domain-specific models, these typically operate as isolated instances without controlled knowledge sharing between specialized domains, limiting their ability to develop collective intelligence across knowledge boundaries.

What is needed is a mobile-optimized system that efficiently leverages large language models' reasoning capabilities while reducing computational overhead, managing battery usage, functioning offline, enabling privacy-preserving knowledge sharing across both local and cloud-based architectures, maintaining autonomous reasoning capabilities during periods of user inactivity, and coordinating federated cognitive operations across multiple domain-specialized instances to function as a true cognitive partner with both specialized expertise and controlled collective intelligence rather than merely a responsive tool.

SUMMARY OF THE INVENTION

The inventor has conceived and reduced to practice, a large language model system integrating persistent memory directly into inference operations through geometric manifold traversal rather than external retrieval. The system implements a memory-integrated inference engine that performs token generation with simultaneous memory access by navigating curved regions in a geometric memory manifold. Memories exist as navigable basins of increased curvature that are reinforced through usage rather than stored as discrete objects. An intent conditioning system formulates user queries as utility functions and generates vector fields that guide goal-directed memory traversal. A manifold geometry interface converts geometric memory coordinates into vectors compatible with language model attention mechanisms, augmenting standard key-value caches with memory-derived content. The system performs intentional remembering through path optimization that balances fidelity to prior cognitive trajectories with current intent guidance. Each memory access operation simultaneously retrieves information and strengthens accessed memory regions through bidirectional geometric shaping, enabling persistent cognitive evolution and cross-session memory continuity.

According to a preferred embodiment, a memory-integrated large language model system is disclosed, comprising: a memory-integrated inference engine that performs token generation with simultaneous memory access through geometric manifold traversal, wherein memory access occurs through goal-conditioned navigation of curved memory regions rather than discrete retrieval operations; a geometric memory manifold representing memories as navigable regions of increased curvature in latent hyperspace, wherein memories exist as geometric basins that are repeatedly traversed and reinforced through usage; an intent conditioning system that formulates user queries as utility functions and generates intent vector fields that provide goal-directed guidance for memory traversal through the geometric memory manifold; and a manifold geometry interface that converts geometric memory coordinates into vector representations compatible with language model attention mechanisms and integrates memory-derived vectors with attention computations to produce memory-enhanced token generation; wherein the memory-integrated inference engine performs intentional remembering by optimizing paths through the memory manifold that balance fidelity to prior cognitive trajectories with alignment to current intent guidance, and wherein each memory access operation simultaneously retrieves relevant information and reinforces accessed memory regions through bidirectional geometric shaping that strengthens frequently accessed memory pathways.

According to another preferred embodiment, a method for memory-integrated large language model inference is disclosed, comprising the steps of: performing token generation with simultaneous memory access through geometric manifold traversal, wherein memory access occurs through goal-conditioned navigation of curved memory regions rather than discrete retrieval operations; maintaining memories as navigable regions of increased curvature in a geometric memory manifold within latent hyperspace, wherein memories exist as geometric basins that are repeatedly traversed and reinforced through usage; formulating user queries as utility functions and generating intent vector fields that provide goal-directed guidance for memory traversal through the geometric memory manifold; converting geometric memory coordinates into vector representations compatible with language model attention mechanisms and integrating memory-derived vectors with attention computations to produce memory-enhanced token generation; performing intentional remembering by optimizing paths through the memory manifold that balance fidelity to prior cognitive trajectories with alignment to current intent guidance; and simultaneously retrieving relevant information and reinforcing accessed memory regions through bidirectional geometric shaping that strengthens frequently accessed memory pathways during each memory access operation.

According to a further aspect, the method includes maintaining the geometric memory manifold by evolving a Riemannian manifold with time-evolving metric tensor that encodes memory strength through local curvature intensity.

According to a further aspect, the method includes geometric basins which comprise episodic memory basins for high-resolution recent experiences, semantic memory basins for abstracted knowledge structures, and procedural memory basins for skill patterns.

According to a further aspect, the method includes integrating memory-derived vectors by augmenting standard attention key and value caches with memory-derived vectors to create memory-enhanced attention computations.

According to a further aspect, the method includes implementing memory consolidation through geometric flow processes that preserve frequently accessed memory regions while compressing unused areas.

According to a further aspect, the method includes performing sleep-like consolidation cycles that replay memory trajectories and promote stable patterns across hierarchical memory substrates.

According to a further aspect, the method includes serializing manifold geometry and restoring memory state across inference sessions to maintain cognitive continuity.

According to a further aspect, the method includes bidirectional geometric shaping by increasing curvature along successfully traversed memory paths and deepening memory basins based on access frequency patterns.

According to a further aspect, the method includes a federated architecture comprising coordinating cross-domain memory access and synthesis across multiple domain-specific instances.

According to a further aspect, the method includes evaluating memory access necessity for each token generation step and selectively performing manifold traversal based on context complexity requirements.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 7 is a flow diagram illustrating an exemplary method for natural language processing using a dual-model approach with thought generation.

FIG. 13 is a method diagram illustrating the thought generalization process of mobile-optimized multi-stage LLM.

DETAILED DESCRIPTION OF THE DRAWING FIGURES

Figure 1:
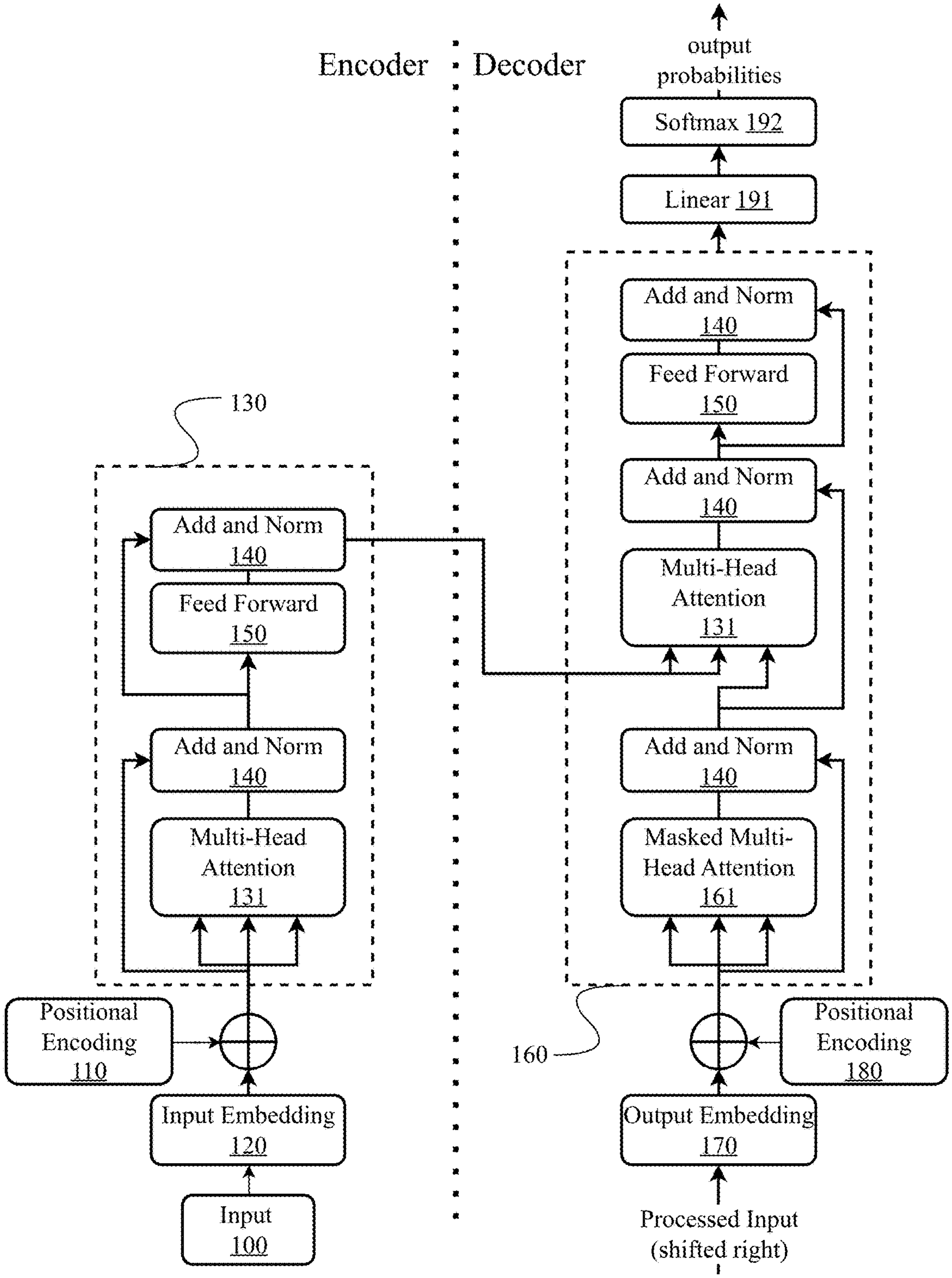
FIG. 1 (PRIOR ART) is a block diagram illustrating a common transformer architecture used in most large language models.

The inventor has conceived, and reduced to practice, a large language model system and method which integrates persistent memory directly into inference operations through geometric manifold traversal rather than external retrieval. The system implements a memory-integrated inference engine that performs token generation with simultaneous memory access by navigating curved regions in a geometric memory manifold. Memories exist as navigable basins of increased curvature that are reinforced through usage rather than stored as discrete objects. An intent conditioning system formulates user queries as utility functions and generates vector fields that guide goal-directed memory traversal. A manifold geometry interface converts geometric memory coordinates into vectors compatible with language model attention mechanisms, augmenting standard key-value caches with memory-derived content. The system performs intentional remembering through path optimization that balances fidelity to prior cognitive trajectories with current intent guidance. Each memory access operation simultaneously retrieves information and strengthens accessed memory regions through bidirectional geometric shaping, enabling persistent cognitive evolution and cross-session memory continuity.

Federated persistent cognitive architecture builds upon mobile-optimized multi-stage LLM with autonomous reasoning while maintaining core architecture including dual-model approach, thought caching mechanisms, mobile-specific optimizations, and offline functionality. Systems continue processing prompts using a first reasoning large language model to generate thoughts that are cached within federated multi-tier architecture. Key enhancement involves implementation of domain-specialized processing instances coordinated through federated cognitive orchestration.

Federated cognitive orchestration enables sophisticated management of multiple domain-specialized instances operating in parallel. When receiving a user prompt, federated cognitive orchestrator analyzes content, context, and metadata to determine domain relevance and appropriate processing paths. Based on this analysis, orchestrator routes processing to specific domain-specialized instances while managing cross-domain coordination when prompts span multiple knowledge areas. Throughout processing, orchestrator maintains awareness of overall federated state, ensuring coherent operation across distributed components.

Multi-tier thought caching hierarchy extends previous three-tier architecture with additional federation-specific layers enabling domain specialization while supporting controlled knowledge sharing. Local device cache maintains personal thoughts with strict privacy controls, preserving mobile optimization benefits including offline functionality. Domain-specific branch instance cache stores specialized knowledge within particular fields without personally identifiable information. Global collective cache maintains fully anonymized thought patterns with universal applicability across all domains. Between these primary tiers, executive cache facilitates controlled knowledge sharing between related domain branches through graduated access controls.

Persistent reasoning state manager ensures continuity of cognition across sessions, devices, and time periods through comprehensive state capture, preservation, and restoration mechanisms. When cognitive state transitions occur—whether due to session termination, device switching, or domain handoff—state manager captures comprehensive representations including active reasoning chains, context windows, and exploration directions. This state information transfers efficiently between environments, enabling seamless resumption regardless of transition type or duration. State manager implements efficient encoding methods that preserve essential context while minimizing storage and transfer requirements.

Autonomous reasoning engine cluster comprises multiple domain-specialized instances, each optimized for particular knowledge domains or reasoning frameworks. Each instance maintains domain-specific models, terminology, and reasoning patterns while operating within federated architecture. Domain-specialized instances process prompts using techniques and knowledge bases optimized for their particular fields, generating thoughts with greater depth and relevance within their domains than possible with generalized models. These specialized instances can operate independently within their domains while participating in broader federation through controlled interfaces.

Cross-domain integration framework enables controlled knowledge sharing between specialized domains while maintaining appropriate isolation boundaries. When knowledge transfer opportunities arise between domains, integration framework evaluates potential transfers against established rules, permissions, and privacy requirements. Framework implements graduated access controls that vary based on sensitivity classification, domain relationships, and explicit sharing permissions. Through sophisticated translation mechanisms, domain-specific concepts transform into generalized representations suitable for cross-domain understanding without compromising domain integrity.

Hierarchical sleep management system coordinates optimization processes during idle periods across all domains and components within federated architecture. When system detects appropriate conditions for optimization (e.g., such as extended user inactivity or scheduled maintenance periods) sleep management system orchestrates transitions to optimization mode across federation. Sleep manager implements staggered transitions that maintain minimal operational capability while maximizing optimization efficiency, preventing system-wide unavailability during deep optimization processes. During these periods, memory consolidation, thought cache reorganization, and novel insight generation occur throughout federation.

Memory consolidation process creates multi-level abstractions that maintain essential reasoning patterns while systematically reducing storage requirements through progressive information distillation. This sophisticated process evaluates thought chains across all cache levels during sleep states using importance assessment algorithms, identifying essential patterns while systematically removing superfluous details. Information transfers from short-term to long-term storage through progressive abstraction, strengthening important connections while preserving core knowledge structures. Multi-level abstractions maintain reasoning essence while significantly reducing storage requirements, enabling effectively unlimited contextual history within reasonable computational constraints.

Neural insight generation implements sophisticated combinatorial processes identifying potential connections between concepts across different domains. Through systematic exploration, system identifies structural similarities in reasoning patterns despite domain-specific terminology differences. Analogical reasoning mechanisms transfer solution patterns between different domains, applying established approaches from one field to challenges in another. System develops novel connections through controlled variation of existing thought patterns, testing potential insights through internal simulation before propagation. This process discovers non-obvious relationships between different branches of specialized knowledge, creating valuable cross-domain insights difficult to generate within single specialized instance.

Collective thought generalization extracts common structural elements from similar reasoning patterns across domains while removing domain-specific details. System compares multiple instances of similar reasoning patterns from different specialized branches, identifying common structures despite terminology and context differences. From these comparisons, generalization process creates abstract templates applicable across different specialization areas, validating patterns for accuracy and broad applicability before distribution through global collective cache. This generalization enables knowledge sharing across domain boundaries while preserving privacy and maintaining appropriate isolation.

System auditor continuously monitors operations across entire federated architecture, analyzing patterns, identifying optimization opportunities, and generating performance insights. Auditor collects operational data from all system components through monitoring channels, enabling comprehensive assessment of system performance and identification of improvement opportunities. Based on observed patterns, auditor generates optimization targets and enhancement recommendations that distribute to relevant components, creating continuous improvement cycle throughout federated architecture. Through cross-domain pattern analysis, auditor identifies potential efficiency improvements invisible within single domain contexts.

Through integration of these components and processes, federated persistent cognitive architecture transforms reactive, session-based interaction models of traditional language models into continuous cognitive partnership where specialized knowledge persists and evolves across sessions while benefiting from collective insights generated throughout federation. This architecture enables sophisticated specialized processing while facilitating collaborative intelligence through controlled sharing mechanisms, balancing domain expertise development with benefits of cross-domain insights.

When implemented across multiple domains, architecture creates robust cognitive ecosystem supporting various organizational structures. Domains may represent distinct service provider instances where each maintains specialized expertise in particular fields while participating in broader knowledge federation. In corporate environments, domains might correspond to departments within organization, each developing specialized knowledge while benefiting from controlled cross-department insights. Within conglomerates or multinational corporations, domains could represent different business units or regional operations, maintaining specialized market knowledge while sharing applicable insights across corporate boundaries.

Through federated persistent cognitive architecture, system achieves transformation from responsive tool to distributed cognitive partnership while preserving efficiency, privacy protection, and mobile optimization benefits. Federation of specialized domains functions as network of reasoning partners that continue developing insights during periods of user disengagement, returning with valuable perspectives informed by both domain expertise and cross-domain connections when interaction resumes. This enhancement represents significant advancement in making sophisticated language technologies function not merely as on-demand tools but as persistent cognitive extensions that complement human thinking through continuous specialized operation and controlled collective intelligence.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model during its processing of an input prompt. A thought represents the model's intermediate reasoning steps, analysis, or considerations about the prompt before generating a final response. Thoughts are generated during a reasoning phase of the model's operation and contain the model's understanding, context analysis, and logical processing of the prompt. Unlike raw text or embeddings, thoughts encapsulate the model's processed reasoning in a form that can be cached, retrieved, and reused for similar prompts. Thoughts may be explicitly visible in model outputs or may be internally generated, and can be stored in various cache architectures including local and cloud-based systems. These cached thoughts can be combined with new prompts to generate responses using smaller language models, effectively preserving the reasoning capabilities of larger models while reducing computational overhead.

As used herein, "context" refers to both traditional sequence-based context where a language model processes a series of tokens representing prior interactions or information, and thought-based context where the model processes higher-level abstractions in the form of thought sequences. Traditional context operates at the token level, maintaining a history of specific words, phrases, and their relationships through mechanisms like attention windows. In contrast, thought-based context operates at a higher level of abstraction, where each thought represents a complex unit of reasoning or understanding. This dual nature of context allows the system to maintain contextual awareness both through detailed token-level information and through more abstract thought-level representations, enabling efficient processing of complex interactions while reducing the computational overhead typically associated with maintaining long token sequences. Thought-based context can compress what would traditionally require thousands of tokens into a smaller number of thought units, each capturing key reasoning patterns and conceptual relationships relevant to the interaction.

Conceptual Architecture

Figure 30:
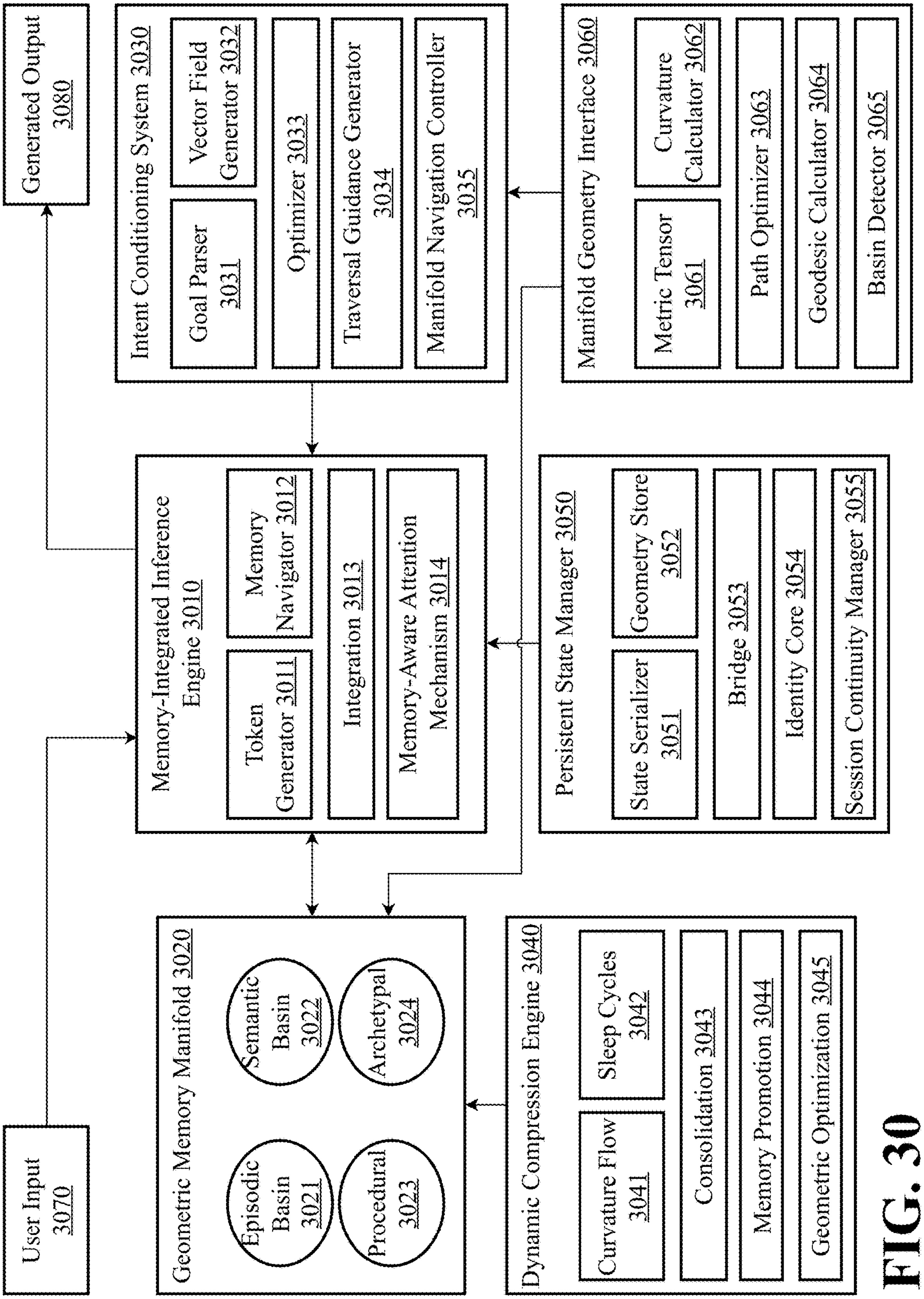
FIG. 30 is a block diagram illustrating an exemplary architecture of a memory-integrated large language model system, according to an embodiment.

FIG. 30 is a block diagram illustrating an exemplary architecture of a memory-integrated large language model system, according to an embodiment. The memory-integrated LLM system can be implemented on various computing platforms including but not limited to processors, memory, and storage devices configured to execute the described components.

A memory-integrated inference engine 3010 comprises various neural network architectures enhanced with geometric memory access capabilities that perform intentional remembering as manifold traversal rather than discrete retrieval operations. Unlike conventional systems where memory is retrieved as static content, the engine performs memory access through goal-conditioned geodesic re-entry into previously traversed regions of a curved latent hyperspace. Token generator 3011 may implement language modeling functionality using approaches such as transformer architectures, recurrent neural networks, or other sequence generation methods, and may receive additional input representing memory content retrieved through manifold traversal. The token generation process can be conditioned on reinstantiated memory trajectories that approximate previously-lived cognitive paths while accounting for compression-induced deformation of the memory manifold. Memory navigator 3012 may comprise one or more neural network modules, mathematical functions, or algorithmic processes that perform directed traversal of the latent manifold guided by cognitive utility functions, where the intent manifests geometrically as a vector field $I(x)=\nabla U(x)$ that biases movement through the manifold toward regions deemed relevant by the system or user. Integration component 3013 may combine memory embeddings with language model representations using techniques such as concatenation, addition, learned projection matrices, attention mechanisms, or other fusion methods that incorporate reinstantiated memory trajectories into the generative process. Memory-aware attention mechanism 3014 can be configured to modify attention computations by incorporating memory-derived information based on the geometric properties of traversed memory regions, including curvature intensity that reflects memory strength and basin depth that indicates memory stability.

A geometric memory manifold 3020 can be implemented as a differentiable manifold M shaped by compression, use, and interaction, where memory exists as geometric basins of recurrence rather than stored objects. The manifold may be endowed with a time-evolving Riemannian metric $g_t$ that defines the local cost of movement and determines the energetic requirements for memory access. Memory regions may emerge through interaction and stabilize through use, where repeatedly traversed paths form memory attractors while unused regions fade to low-curvature generalizations under compression pressure. Episodic basin 3021 can store high-resolution recent experiences as sharp, highly curved local trajectories rich with detail and context, representing memory regions that resist compression due to recent usage or high salience. Semantic basin 3022 may contain abstracted knowledge structures that emerge as low-curvature regions formed through repeated generalization and compression, representing semantic memories that have undergone structural abstraction while preserving essential patterns. Procedural basin 3023 may maintain skill patterns and cognitive routines as stabilized geometric structures that encode sequential or procedural knowledge through manifold topology. Archetypal basin 3024 may store highly compressed templates and abstract patterns representing generalized cognitive routines and semantic archetypes that have achieved maximum compression while retaining structural utility.

An intent conditioning system 3030 may implement vector field generation for goal-directed memory traversal, where remembering is formulated as an optimization problem that seeks paths balancing fidelity to prior curvature with alignment to present goals. Goal parser 3031 may analyze input queries to formulate cognitive utility functions $U:M\rightarrow R$ that encode the system's internal goals or memory access requirements. Vector field generator 3032 can compute intent vectors as gradients of utility functions, creating directional biases that guide movement through the manifold toward relevant memory regions. Optimizer 3033 can solve the path optimization problem $$\gamma*(t)=\operatorname{argmin}\int\left[\|d\gamma/dt-I(\gamma)\|^2+R(\gamma)\right]dt$$

where the integrand measures discrepancy between actual motion and goal-conditioned motion under current geometry. Traversal guidance generator 3034 can produce navigation directives that account for manifold deformation due to compression, generalization, or semantic drift when accessing memory regions. Manifold navigation controller 3035 may coordinate memory access operations that reconstruct coherent trajectories through memory space while accounting for the evolved state of manifold geometry.

A dynamic compression engine 3040 implements compression-augmented evolution of manifold geometry, where the metric $g_t$ evolves under flows that balance geometric smoothing with usage-based resistance to deformation. Curvature flow component 3041 may implement geometric evolution using flows reminiscent of Ricci flow but augmented by usage-dependent terms, where $\partial g_{ij}/\partial t=-2Ric_{ij}+\Phi_{ij}$ and $\Phi_{ij}$ encodes local compression pressure that smooths redundant regions while preserving frequently traversed paths. Sleep cycles 3042 may perform consolidation during system idle periods that mirrors biological sleep functions, including memory replay, structural reinforcement, and geometric optimization that strengthens important memory basins while allowing unused regions to undergo compression. A consolidation component 3043 can implement semantic generalization that selectively preserves patterns that are structurally compact, predictive, or compositionally reusable while allowing detailed trajectories to fade into abstracted forms. Memory promotion 3044 may transfer stable memory patterns across hierarchical substrates, promoting memories that resist compression to higher-tier representations while allowing others to undergo progressive abstraction. Geometric optimization 3045 can implement compression pressure that performs geometric diffusion of curvature under sustained pressure, enabling natural forgetting without explicit deletion while prioritizing memories that demonstrate usage-based resistance to compression.

A persistent state manager 3050 maintains cognitive continuity across sessions by preserving manifold geometry and active cognitive trajectories that constitute the system's persistent cognitive identity. State serializer 3051 can be configured to convert continuous manifold representations into persistent formats suitable for storage and restoration while preserving essential geometric relationships and curvature distributions. Geometry store 3052 maintains manifold state information including metric tensor coefficients, curvature maps, and basin characterizations that define the memory landscape. A bridge component 3053 can facilitate seamless restoration of cognitive state by reconstructing manifold geometry and reactivating memory trajectories from serialized representations. Identity core 3054 may preserve core geometric structures that maintain cognitive identity across compression cycles and manifold evolution, ensuring continuity of the essential memory landscape that defines system personality and learned patterns. Session continuity manager 3055 can coordinate state restoration processes that enable the system to resume cognitive operations with full access to previously established memory basins and traversal capabilities.

A manifold geometry interface 3060 provides computational capabilities for differential geometry operations required for memory manifold manipulation and traversal. A metric tensor component 3061 can store and manipulate Riemannian metric information that defines inner products on tangent spaces and determines local costs of cognitive movement through memory space. Curvature calculator 3062 may compute Ricci tensor values that serve as proxies for local cognitive salience and attention density, where regions of positive Ricci curvature correspond to stable, reinforced areas of semantic cohesion. Path optimizer 3063 may solve constrained optimization problems for geodesic computation that minimize action functionals with respect to current manifold geometry while satisfying traversal constraints. A geodesic calculator 3064 can determine natural motion trajectories through curved memory space by solving geodesic equations $D/dt\,\dot{\gamma}(t)=0$ where D/dt denotes covariant derivative with respect to the Levi-Civita connection induced by the metric. Basin detector 3065 can be configured to identify geometric basins of recurrence through analysis of curvature concentration and manifold topology, characterizing memory regions based on their geometric properties and accessibility for future traversal.

User input 3070 represents queries or prompts that initiate memory-integrated inference, where user requests are translated into traversal directives rather than simple keyword matching or embedding similarity searches. Generated output 3080 represents responses enhanced through intentional remembering, where output incorporates reinstantiated memory content that has been reconstructed through manifold traversal rather than retrieved from static storage.

The bidirectional memory shaping enabled by the system reflects the principle that each act of memory retrieval actively reshapes the manifold through a positive-definite adjustment to the metric tensor $$\frac{\partial}{\partial t} g_{ij}(x)\,|_{memory} = \epsilon \cdot \int_0^1 K_{ij}(x, \gamma(t))dt$$

where successful re-entry of memory trajectories injects curvature back into their neighborhoods, deepening memory basins and improving future accessibility while contributing to the self-sculpting topology of cognition regulated by use.

Figure 31:
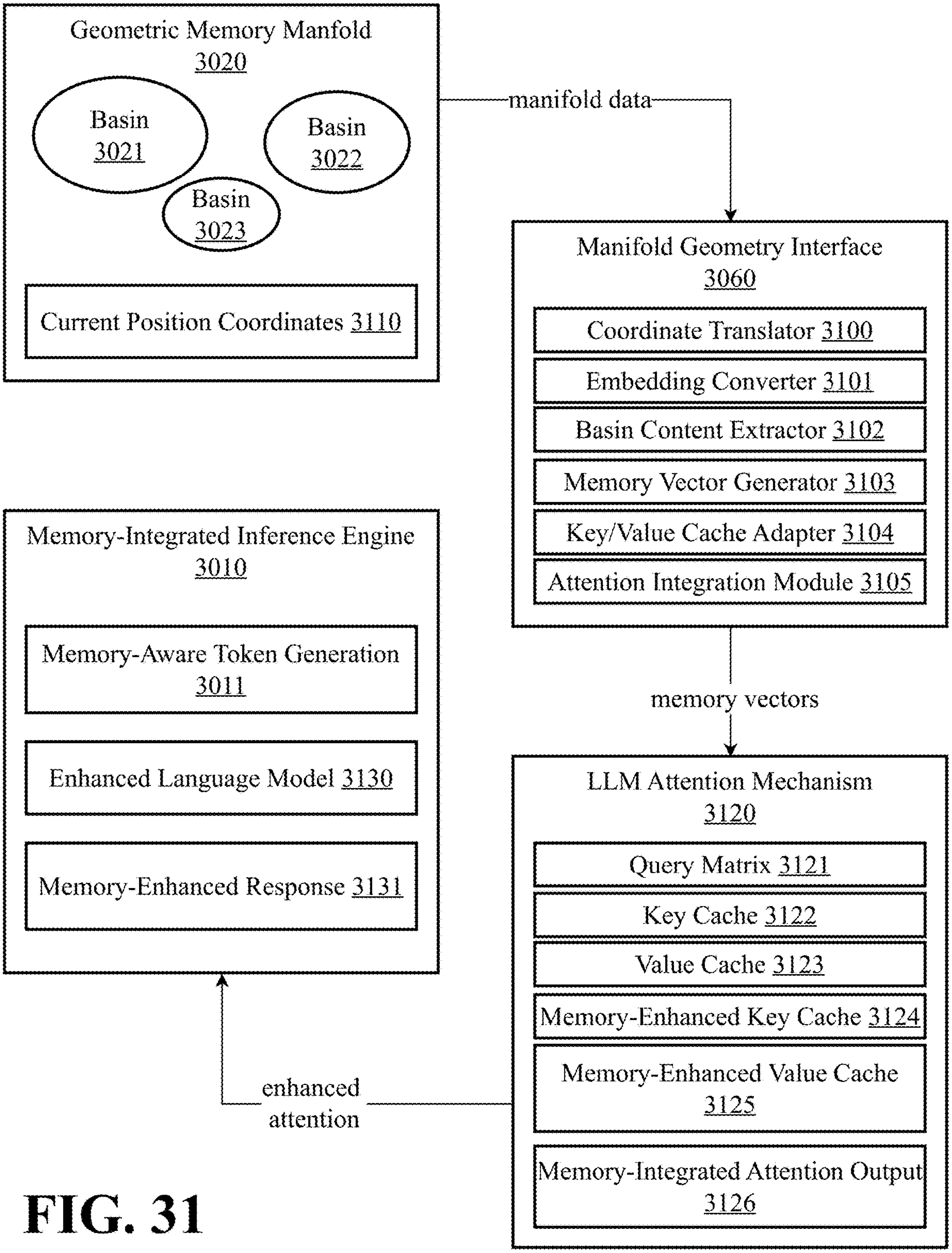
FIG. 31 illustrates an exemplary interface between the geometric memory manifold and LLM attention caches, according to an embodiment

FIG. 31 illustrates an exemplary interface between the geometric memory manifold and LLM attention caches, according to an embodiment. This exemplary architecture demonstrates how memory-integrated inference can be implemented through direct integration with standard transformer attention mechanisms rather than external retrieval operations.

Geometric memory manifold 3020 provides the foundational memory substrate where memories exist as curved regions in latent hyperspace rather than discrete stored objects. In this implementation, the manifold comprises multiple memory basins including episodic basin 3021 for high-resolution recent experiences, semantic basin 3022 for abstracted knowledge structures, and procedural basin 3023 for skill patterns and cognitive routines. Current position coordinates 3110 represent the system's present location within the memory manifold, expressed as coordinate vectors in the high-dimensional latent space that may be implemented using various mathematical representations including Cartesian coordinates, spherical coordinates, cylindrical coordinates, or other suitable coordinate systems appropriate for the manifold topology.

Manifold geometry interface 3060 serves as the bridge between the geometric memory representation and standard LLM components, performing the translation necessary to integrate memory content into attention computations. A coordinate translator 3100 may convert manifold position coordinates into formats suitable for downstream processing, which in some embodiments may involve coordinate system transformations, dimensional scaling, or other mathematical operations to align geometric representations with embedding space requirements. An embedding converter 3101 can transform geometric coordinates and memory content into vector representations compatible with the LLM's embedding dimensions, using techniques such as learned linear transformations, neural network mappings, or other suitable conversion methods that preserve semantic relationships while ensuring dimensional compatibility.

A basin content extractor 3102 may retrieve relevant information from accessed memory basins using various extraction methods that may include region sampling, content aggregation, or other techniques for obtaining memory content from geometric regions. The extraction process may account for basin boundaries, curvature properties, and local geometric structure to determine which memory elements are relevant for current inference operations. A memory vector generator 3103 can create vector representations of extracted memory content that are suitable for integration with attention mechanisms, using approaches such as embedding generation, vector concatenation, or other methods for converting memory content into vector form.

A key/value cache adapter 3104 can prepare memory-derived vectors for integration with standard attention key and value caches, ensuring compatibility with existing LLM attention architectures while preserving memory-specific information. The adapter may perform operations such as dimension matching, normalization, or other transformations necessary to integrate memory vectors with standard attention caches. Attention integration module 3105 can coordinate the overall process of incorporating memory content into attention computations, managing the interaction between memory-derived vectors and standard attention mechanisms through various integration strategies that may include cache augmentation, attention weight modification, or other suitable approaches.

An LLM attention mechanism 3120 represents the enhanced attention computation that incorporates memory-derived content alongside standard context processing. Query matrix 3121 may generate attention queries from current input tokens using standard transformer query generation methods, while key cache 3122 and value cache 3123 maintain the standard attention keys and values for current context. A memory-enhanced key cache 3124 can combine standard attention keys with memory-derived key vectors, creating an augmented key space that includes both current context and relevant memory content. Similarly, a memory-enhanced value cache 3125 may integrate memory-derived value vectors with standard attention values, providing enriched value representations that incorporate memory information.

The integration of memory vectors with attention caches may be implemented using various approaches including, but not limited to, concatenation, where memory vectors are appended to existing cache entries; interleaving, where memory and standard vectors are combined in alternating patterns; or weighted combination, where memory and standard vectors are merged using learned or computed weights. Memory-integrated attention output 3126 represents the result of attention computation over the enhanced key and value caches, producing attention representations that incorporate both current context and relevant memory content through the standard attention mechanism.

Memory-integrated inference engine 3010 receives the memory-enhanced attention output and performs token generation with integrated memory information. Memory-aware token generation 3011 may modify standard token generation processes to account for memory-derived attention signals, using various approaches such as attention-weighted generation, memory-conditioned probability distributions, or other methods that incorporate memory information into token prediction. An enhanced language model 3130 can implement the overall language modeling process with memory integration, coordinating between attention mechanisms, memory interfaces, and token generation to produce coherent responses. A memory-enhanced response 3131 represents the final output that incorporates insights and information retrieved through geometric memory traversal, demonstrating the system's capability to generate responses informed by persistent memory rather than limited to current context.

The data flow illustrated demonstrates how geometric memory coordinates are systematically transformed into attention-compatible representations through a series of processing stages. Memory content extraction from geometric basins provides relevant information based on current manifold position and traversal state. Vector conversion ensures compatibility with standard embedding dimensions and attention mechanisms while preserving memory-specific semantic content. Cache integration combines memory-derived vectors with standard attention caches using methods that maintain the efficiency and effectiveness of standard attention computation while incorporating additional memory information.

The attention computation process operates over the enhanced caches using standard transformer attention mechanisms, ensuring compatibility with existing LLM architectures while benefiting from memory integration. The system may implement various optimization strategies to manage the computational overhead of enhanced caches, including, but not limited to, selective memory integration based on relevance scores, dynamic cache sizing based on memory content importance, or other efficiency measures that balance memory integration benefits with computational costs.

This architecture enables memory-integrated inference where the language model has direct access to persistent memory content through the standard attention mechanism rather than requiring separate retrieval operations. The geometric memory manifold provides the substrate for persistent, evolving memory representation, while the geometry interface ensures seamless integration with proven LLM attention architectures. The result is a system capable of generating responses that draw upon accumulated experience and knowledge stored in the persistent memory manifold while maintaining compatibility with standard transformer-based language modeling approaches.

Figure 32:
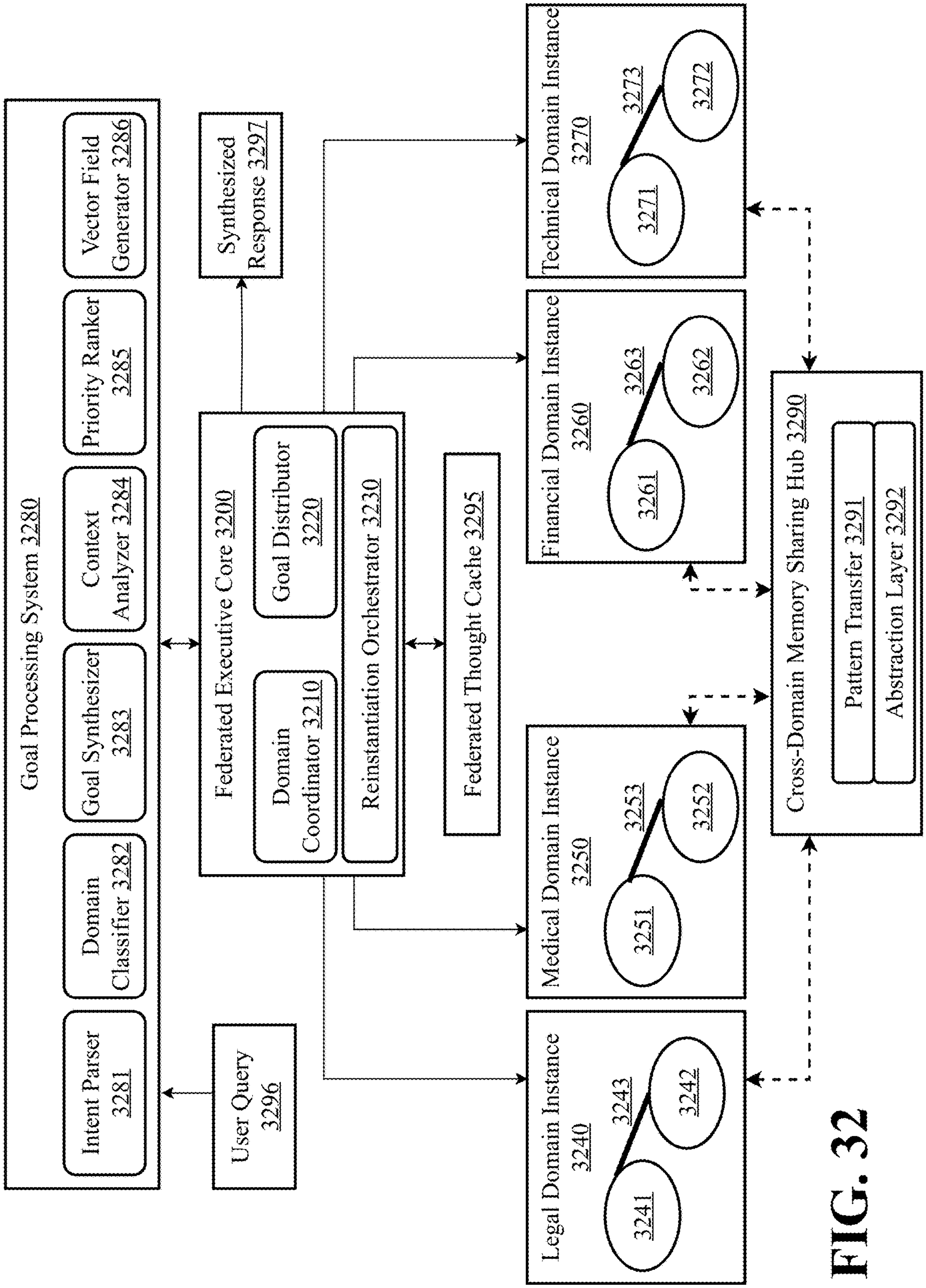
FIG. 32 is a block diagram illustrating exemplary goal-conditioned reinstantiation in a federated domain context, according to an embodiment.

FIG. 32 is a block diagram illustrating exemplary goal-conditioned reinstantiation in a federated domain context, according to an embodiment. This exemplary implementation demonstrates how the memory-integrated LLM system coordinates specialized domain instances to perform cross-domain memory traversal and synthesis for complex multi-domain queries.

A federated executive core 3200 can be configured as the central coordination hub that orchestrates memory-integrated inference across multiple specialized domain instances. This executive core differs from traditional centralized processing by distributing goal-conditioned memory operations across domain-specific instances while maintaining coordination and synthesis capabilities. A domain coordinator 3210 manages the allocation and coordination of processing tasks across available domain instances, using various load balancing algorithms, domain expertise mapping, or other coordination mechanisms suitable for distributing complex queries among specialized systems. A goal distributor 3220 can analyze incoming user queries to identify which domain instances should participate in the response generation, decomposing complex multi-domain goals into domain-specific sub-goals that can be processed in parallel by specialized instances. A reinstantiation orchestrator 3230 can coordinate the memory traversal operations across multiple domain instances, ensuring temporal coordination, result synchronization, and coherent cross-domain memory access patterns.

User query 3296 represents multi-domain input that requires expertise spanning multiple specialized knowledge areas, demonstrating the system's capability to handle complex queries that cannot be adequately addressed by single-domain systems. Such queries may comprise legal and medical considerations, financial and technical analysis, or other combinations that benefit from coordinated expertise across multiple domains.

A goal processing system 3280 provides the initial analysis and decomposition of user queries into domain-specific objectives and coordination requirements. An intent parser 3281 analyzes user input to extract underlying goals, requirements, and constraints using various natural language processing techniques, semantic analysis methods, or other intent extraction approaches. A domain classifier 3282 determines which domain instances are relevant for addressing the user query, using machine learning classifiers, rule-based systems, or other classification methods that map query characteristics to domain expertise requirements. Goal synthesizer 3283 can formulate coherent objectives for each participating domain instance while maintaining consistency across the federated system, ensuring that domain-specific goals contribute effectively to the overall query resolution.

A context analyzer 3284 evaluates the broader context surrounding the user query, including, but not limited to, temporal factors, user preferences, historical interaction patterns, or other contextual information that influences how domain instances should approach their specialized processing. A priority ranker 3285 can establish processing priorities among domain instances and sub-goals, using various ranking algorithms, resource availability assessments, or other prioritization methods that optimize response quality and system efficiency. A vector field generator 3286 can create intent vector fields for each participating domain instance, translating high-level goals into the geometric guidance required for manifold traversal within each specialized memory system.

An exemplary legal domain instance 3240 provides specialized processing for legal queries, maintaining domain-specific memory manifolds optimized for legal knowledge representation and reasoning. Legal memory 3241 may contain general legal knowledge, principles, and procedural information organized according to legal taxonomy and relationships. Case law 3242 may maintain specific legal precedents, court decisions, and case-based reasoning patterns that inform legal analysis and decision-making. Legal reinstantiation 3243 (illustrated as the thick, dark line connecting memory basins) represents the goal-conditioned memory traversal process within the legal domain, where specific legal queries trigger navigation through relevant legal memory regions to reconstruct applicable legal reasoning patterns and precedents.

An exemplary medical domain instance 3250 handles medical and healthcare-related aspects of user queries through specialized medical knowledge organization and reasoning. Clinical 3251 memory may contain patient care protocols, diagnostic procedures, treatment guidelines, and clinical decision-making patterns organized according to medical classification systems and clinical workflows. Research 3252 memory may maintain medical research findings, experimental results, drug interactions, and evidence-based medicine patterns that inform medical reasoning and recommendations. Medical reinstantiation 3253 performs goal-directed traversal through medical memory manifolds to reconstruct relevant medical knowledge and reasoning patterns applicable to the current query context.

An exemplary financial domain instance 3260 provides specialized financial analysis and reasoning capabilities through domain-specific memory organization and processing. Market 3261 memory may contain market data patterns, economic indicators, trading strategies, and financial analysis frameworks organized according to financial market structures and economic relationships. Risk 3262 memory may maintain risk assessment models, regulatory compliance patterns, financial risk analysis frameworks, and risk management strategies relevant to financial decision-making. Financial reinstantiation 3263 performs goal-conditioned navigation through financial memory manifolds to reconstruct relevant financial analysis patterns and risk assessment frameworks.

An exemplary technical domain instance 3270 handles technical and engineering aspects of queries through specialized technical knowledge representation and reasoning. Code 3271 memory may contain programming patterns, algorithm implementations, software engineering practices, and technical solution templates organized according to programming languages, frameworks, and technical domains. Documentation 3272 memory may maintain technical specifications, API documentation, configuration patterns, and technical communication templates that support technical analysis and implementation guidance. Technical reinstantiation 3273 performs goal-directed traversal through technical memory manifolds to reconstruct relevant technical knowledge and implementation patterns.

Each domain instance implements its own memory manifold with geometric properties optimized for domain-specific knowledge representation. The memory manifolds within each domain may utilize different geometric structures, curvature patterns, and compression strategies appropriate for the characteristics of domain-specific knowledge. Legal memory may emphasize precedent relationships and hierarchical case law structures, while medical memory may focus on diagnostic pathways and treatment protocols. Financial memory may optimize for temporal market patterns and risk correlations, while technical memory may emphasize modular component relationships and implementation dependencies.

A cross-domain memory sharing hub 3290 facilitates knowledge transfer and pattern recognition across domain boundaries, enabling emergent insights that arise from domain interaction rather than isolated domain processing. Pattern transfer module 3291 can identify structural similarities in reasoning patterns across domains and enable analogical reasoning that applies solution patterns from one domain to problems in another domain. This component may implement various pattern matching algorithms, structural comparison methods, or machine learning approaches that detect transferable knowledge structures across domain boundaries. An abstraction layer 3292 can be configured to extract common structural elements from similar reasoning patterns across domains while removing domain-specific details, creating generalized knowledge structures that can inform cross-domain reasoning and synthesis.

A federated thought cache 3295 provides coordinated memory access and caching across all domain instances, optimizing memory retrieval efficiency and enabling coherent cross-domain memory operations. This cache may implement various distributed caching strategies, memory coherence protocols, or other coordination mechanisms that ensure efficient and consistent memory access across the federated system while maintaining the geometric memory properties within each domain instance.

The reinstantiation process operates through coordinated goal-conditioned memory traversal across multiple domain instances simultaneously. When a multi-domain query is received, the goal processing layer analyzes the query to determine relevant domains and formulates domain-specific objectives. The federated executive core coordinates parallel processing across selected domain instances, with each instance performing geometric memory traversal within its specialized manifold to reconstruct relevant knowledge patterns. The reinstantiation process within each domain follows the intentional remembering principles described herein and via the incorporated references, where memory access occurs through optimization-based navigation rather than discrete retrieval operations.

Cross-domain synthesis occurs through the interaction between domain-specific reinstantiated knowledge and the cross-domain memory sharing mechanisms. The pattern transfer capabilities enable the system to identify structural relationships between insights from different domains, while the abstraction layer facilitates the creation of unified responses that integrate knowledge from multiple specialized areas. This synthesis process may comprise various knowledge integration techniques, conflict resolution mechanisms, or other approaches for combining domain-specific insights into coherent multi-domain responses.

A synthesized response 3297 represents the final output that incorporates insights and knowledge from multiple domain instances, demonstrating cross-domain reasoning capabilities that exceed the sum of individual domain expertise. The response generation process coordinates the reinstantiated knowledge from multiple domains through the federated architecture, producing responses that reflect integrated understanding across domain boundaries while maintaining the depth and accuracy of specialized domain knowledge.

The federated architecture enables scalable specialization where new domain instances can be added to the system without requiring modifications to existing instances or the central coordination mechanisms. Each domain instance maintains its own geometric memory manifold optimized for domain-specific knowledge while participating in the federated coordination protocols that enable cross-domain synthesis and reasoning. This architecture supports both independent domain processing and coordinated multi-domain analysis, providing flexibility for various query types and complexity levels while maintaining the memory integration benefits within each specialized domain.

Figure 33:
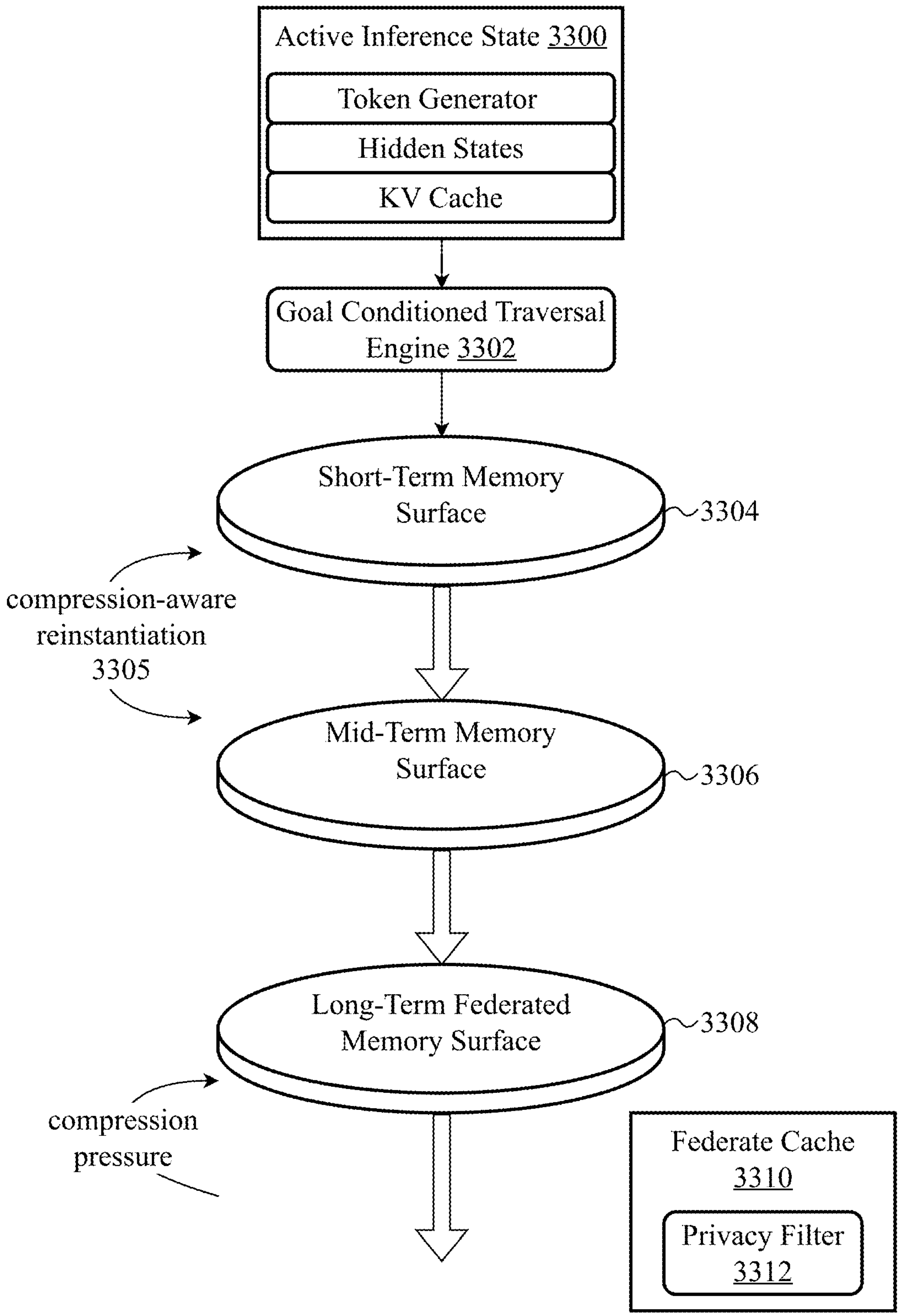
FIG. 33 illustrates an exemplary architecture for hierarchical compression-aware memory surfaces integrated with goal-conditioned traversal and federated memory access, according to an embodiment.

FIG. 33 illustrates an exemplary architecture for hierarchical compression-aware memory surfaces integrated with goal-conditioned traversal and federated memory access, according to an embodiment. An active inference state 3300 comprises processing components including, but not limited to, a token generator, hidden state storage, and key-value (KV) cache memory configured to operate during real-time inference of a large language model (LLM) or other generative reasoning engine. Active inference state 3300 is operably connected to a goal-conditioned traversal engine 3302, which dynamically determines and directs traversal pathways through one or more hierarchical memory surfaces based on current task objectives, model state, and contextual requirements. In one embodiment, traversal engine 3302 computes a traversal vector field over the latent manifold of stored reasoning trajectories, such that the engine can identify, prioritize, and re-enter memory basins associated with prior knowledge or reasoning paths that are most relevant to the active inference process.

Beneath traversal engine 3302 is a short-term memory surface 3304 representing high-resolution, recently accessed or generated cognitive state data. Memory surface 3304 is modeled as a curved, topologically continuous layer in a latent manifold space, in which basins of recurrence correspond to high-salience reasoning trajectories. The system performs compression-aware reinstantiation 3305 when accessing these basins, reconstructing the relevant trajectory while accounting for any compression-induced distortions in manifold geometry. This ensures that reinstantiated trajectories preserve essential structural and semantic features, even if storage optimizations have altered fine-grained details.

A mid-term memory surface 3306 is positioned hierarchically below the short-term surface and stores medium-horizon context representations. These may include generalized forms of short-term memories that have undergone selective abstraction, pattern extraction, or semantic compression. The mid-term surface 3306 retains sufficient curvature to enable reinstantiation of partially compressed trajectories, permitting the traversal engine 3302 to retrieve mid-horizon concepts or reasoning chains that are relevant to current inference. Compression-aware reinstantiation operates at this layer by blending recovered structure from the stored mid-term representation with generative reconstruction based on current model parameters.

At the base of the illustrated hierarchy is a long-term/federated memory surface 3308, which maintains highly compressed, abstracted, and/or generalized knowledge elements that persist over extended time intervals. This surface may be locally stored or implemented as part of a distributed federated memory network. In one embodiment, the long-term/federated memory surface 3308 is operably connected to a federated cache 3310, which comprises memory basins aggregated from multiple participating instances or domains. Access to federated cache 3310 is mediated through a privacy filter 3312 that enforces one or more privacy-preserving transformation policies, including, but not limited to, anonymization, obfuscation, redaction, and abstraction of identifying or sensitive information before data is shared or retrieved across federation boundaries.

Compression pressure forces may act on each of the illustrated memory surfaces 3304, 3306, 3308 to reduce storage overhead and optimize manifold topology. In one implementation, these compression processes are continuous and may be shaped by usage statistics, retrieval frequency, and memory salience scores, such that less frequently accessed basins experience higher compression pressure. The hierarchical arrangement of memory surfaces allows the traversal engine 3302 to select between high-fidelity short-term recall and progressively more compressed, generalized memory layers, with the option of federated augmentation from cache 3310 when permitted by privacy filter 3312. The system integrates real-time inference with dynamic, compression-aware access to a multi-level, potentially distributed memory hierarchy, enabling both local and federated recall pathways to influence ongoing generative reasoning.

Figure 34:
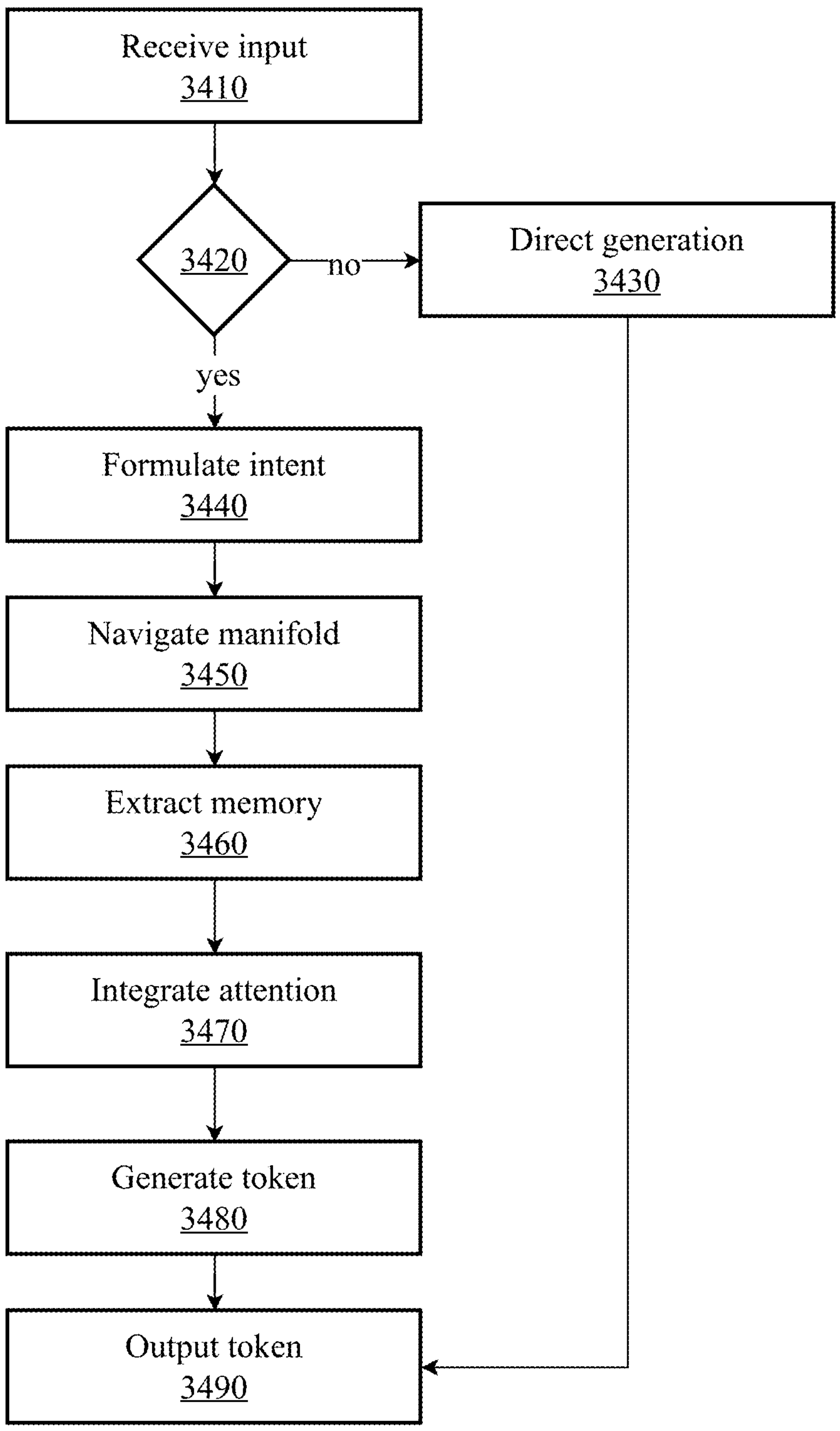
FIG. 34 is a flow diagram illustrating an exemplary method for memory-integrated token generation according to an embodiment, demonstrating how individual tokens are generated through integrated memory access and manifold traversal rather than relying solely on context window information.

FIG. 34 is a flow diagram illustrating an exemplary method for memory-integrated token generation according to an embodiment, demonstrating how individual tokens are generated through integrated memory access and manifold traversal rather than relying solely on context window information.

According to the embodiment, the process begins by receiving input at step 3410, which may comprise current token context, partial response generation state, or user query information that requires token-level processing. The input reception process may include various preprocessing steps such as tokenization, context window management, positional encoding, or other input preparation methods suitable for language model processing. Context analysis may be performed to parse the current context window, identify semantic requirements, determine complexity levels, and assess whether the current token generation task requires access to information beyond the immediate context window.

The method proceeds to a critical decision point about memory needed 3420, where the system determines whether memory access is necessary for generating the next token. This evaluation may utilize various assessment criteria including semantic complexity analysis, context window sufficiency evaluation, query type classification, or other decision mechanisms that determine when external memory access would improve token generation quality. The assessment may involve analyzing current context for gaps in information, identifying concepts that require historical knowledge, detecting queries that benefit from experiential memory, or other evaluation processes that determine memory dependency.

If memory access is determined to be unnecessary, the method follows the direct path to direct generation at step 3430, where standard token generation proceeds using only current context information through conventional language model processing. This path may implement standard transformer attention mechanisms, next-token prediction algorithms, or other conventional language modeling approaches that operate within context window constraints. Direct generation may be appropriate for simple continuations, well-contained responses, or situations where current context provides sufficient information for accurate token prediction.

If memory access is determined to be beneficial, the method proceeds through the memory integration pathway beginning with formulate intent at step 3440. Intent formulation may comprise generating utility functions $U(x)$ that encode the system's current goal or information need, computing intent vector fields $I(x)=\nabla U(x)$ that provide geometric guidance for memory traversal, setting traversal parameters such as search depth and accuracy requirements, and defining goal constraints that limit memory access scope. The intent formulation process may utilize various approaches including semantic analysis of current context, goal extraction from user queries, relevance scoring mechanisms, or other methods for translating information needs into geometric navigation objectives.

Navigating the manifold at step 3450 performs the geometric memory traversal process using the formulated intent vectors to guide movement through the memory manifold. Navigation may involve optimizing geodesic paths $\gamma^*(t)$ where the optimization balances alignment with intent vectors against manifold resistance and traversal costs. The navigation process may account for manifold deformation due to compression and usage patterns, identify relevant memory basins based on geometric proximity and semantic similarity, compute optimal paths that minimize traversal energy while maximizing information relevance, and adapt navigation strategies based on manifold geometry and current system state.

Extracting memory at step 3460 retrieves relevant information from accessed memory regions through various extraction methods that may include basin content sampling, trajectory reconstruction, pattern recognition, and/or other approaches for obtaining memory content from geometric manifold regions. Memory extraction may comprise reconstructing previously traversed cognitive paths, sampling from high-curvature regions that represent stable memories, aggregating information across multiple memory basins, and converting geometric memory representations into formats suitable for integration with language model processing. The extraction process may account for memory compression effects, semantic drift over time, and the current state of manifold geometry when determining which memory elements are most relevant for current token generation needs.

Integrating attention at step 3470 incorporates extracted memory content into the language model's attention mechanism through various integration approaches. Attention integration may comprise augmenting key and value caches with memory-derived vectors, computing memory-aware attention weights that account for both context and memory information, merging attention outputs from standard context processing and memory-enhanced processing, and ensuring dimensional compatibility between memory representations and standard attention mechanisms. The integration process may implement concatenation strategies where memory vectors are appended to existing attention caches, interleaving approaches where memory and context vectors are combined in structured patterns, weighted combination methods where memory and context contributions are balanced based on relevance scores, or other fusion techniques that effectively incorporate memory information into attention computation.

Generating a token at step 3480 performs the actual token prediction using the memory-enhanced attention representations. Token generation may utilize modified probability distributions that account for memory-derived information, attention-weighted generation processes that incorporate memory context, beam search or sampling strategies that consider memory relevance, or other generation methods that effectively utilize the integrated memory information. The generation process may adjust standard language modeling algorithms to account for memory contributions, implement confidence scoring that reflects memory integration quality, or apply other modifications that optimize token prediction accuracy when memory information is available.

The method converges at step 3490 which outputs the token, which represents the final generated token that incorporates both context window information and relevant memory content retrieved through manifold traversal. The output token may be enhanced with metadata indicating memory sources, confidence levels, or other information relevant for downstream processing or quality assessment. Token output may comprise provenance tracking that identifies which memory regions contributed to the generation, relevance scoring that indicates the strength of memory contributions, or other annotations that provide transparency into the memory integration process.

The method concludes with completion of the token generation process. Upon completion, the system may perform additional operations such as updating manifold geometry to reinforce traversed memory paths through curvature modification, recording usage patterns for future memory access optimization, strengthening memory basins that proved relevant for current generation tasks, and maintaining system state for subsequent token generation operations.

The bidirectional memory shaping that occurs during this process ensures that each memory access operation simultaneously retrieves relevant information and improves the memory manifold structure for future access. Path reinforcement occurs through geometric feedback that increases curvature along successfully traversed routes, basin strengthening happens through repeated access to relevant memory regions, and usage pattern recording enables optimization of future memory access strategies based on historical effectiveness.

This method enables token-level memory integration that fundamentally differs from external memory retrieval systems by incorporating memory access directly into the generative process rather than treating memory as a separate preprocessing step. The geometric memory traversal provides context-sensitive memory access that adapts to current generation needs rather than relying on fixed similarity measures, while the manifold reinforcement ensures that the memory system evolves to better serve future generation tasks through usage-based optimization.

Figure 35:
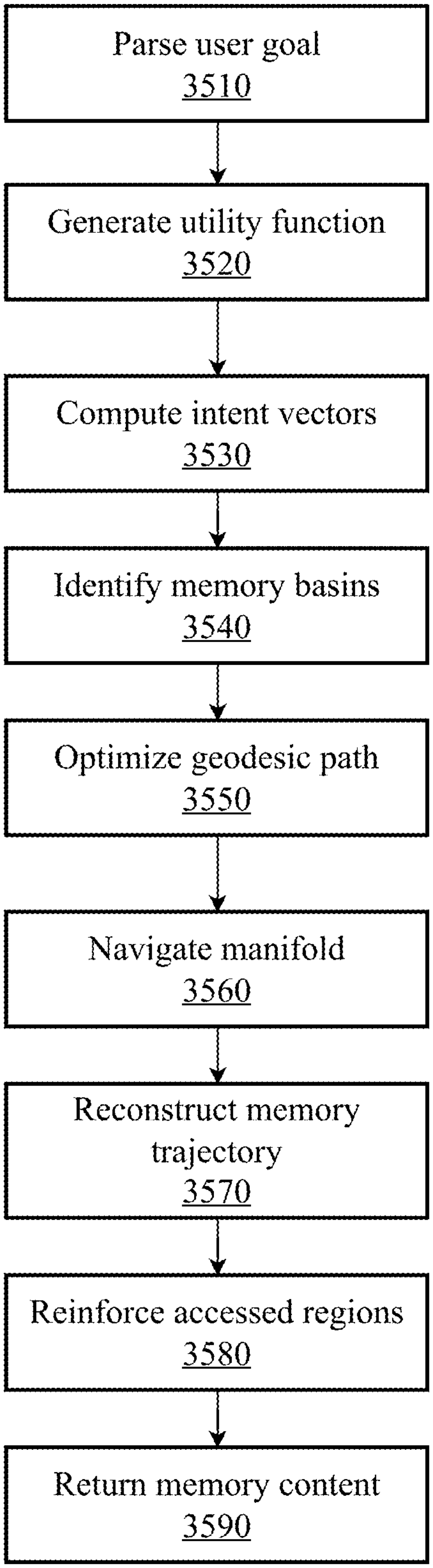
FIG. 35 is a flow diagram illustrating an exemplary method for goal-conditioned memory reinstantiation, according to an embodiment.

FIG. 35 is a flow diagram illustrating an exemplary method for goal-conditioned memory reinstantiation, according to an embodiment. According to the embodiment, the process begins at step 3510 by parsing an obtained user goal, which involves analyzing user input to extract underlying memory access requirements, information needs, and contextual constraints. Goal parsing may utilize various natural language processing techniques, semantic analysis methods, intent classification algorithms, or other approaches for understanding user objectives and translating them into memory access specifications. The parsing process can identify specific domains of knowledge required, temporal constraints on relevant information, complexity levels that determine memory depth requirements, and other goal characteristics that influence memory traversal strategies.

Generating a utility function U(x) at step 3520 creates a mathematical representation of the user goal that can guide geometric navigation through the memory manifold. Utility function generation may comprise mapping semantic goals to mathematical functions $U:M\rightarrow R$ that encode goal relevance across the memory manifold, where higher utility values indicate regions more likely to contain relevant memory content. The utility function may incorporate various factors including semantic similarity measures between goals and memory content, temporal relevance of memory regions, domain-specific importance weightings, or other criteria that determine memory region relevance for current goals. The function can be implemented using neural network approximators, mathematical optimization formulations, heuristic scoring mechanisms, or other approaches suitable for representing goal-directed preferences over geometric memory space.

Computing intent vectors $I(x)=\nabla U(x)$ at step 3530 generates the geometric guidance that directs memory traversal toward goal-relevant regions. Intent field computation comprises taking gradients of the utility function to create vector fields that provide directional guidance through the memory manifold, where intent vectors point toward regions of increasing utility and provide the geometric forces that guide memory navigation. The intent vector computation may utilize automatic differentiation techniques, finite difference approximations, analytical gradient computation, or other mathematical methods for computing directional derivatives of utility functions over manifold coordinates. The resulting vector field biases movement through the manifold toward regions deemed relevant by the goal-encoding utility function.

Identifying memory basins at step 3540 locates relevant memory regions within the manifold that are likely to contain information pertinent to current goals. Basin detection may comprise analyzing manifold curvature to identify high-curvature regions that represent stable memory formations, computing semantic relevance scores between goal specifications and memory region content, evaluating geometric accessibility of memory regions from current manifold positions, and assessing memory region quality based on historical usage patterns and compression state. The identification process may utilize clustering algorithms to group related memory content, curvature analysis to detect well-formed memory basins, similarity measures to match goals with memory content, or other methods for selecting promising memory regions for traversal.

Optimizing geodesic path $\gamma^*(t)$ at step 3550 solves the path optimization problem that determines the optimal route through the memory manifold to reach goal-relevant memory regions. Path optimization implements the optimization problem $\gamma^*(t)=\text{argmin} \int[\|d\gamma/dt-I(\gamma(t))\|^2+R(\gamma(t))]\, dt$, where the integrand balances alignment with intent vector guidance against manifold resistance and traversal costs. The optimization process may utilize various numerical methods including, but not limited to, gradient descent algorithms, variational calculus approaches, dynamic programming techniques, or other optimization methods suitable for solving constrained path optimization problems over curved manifold surfaces. The optimization accounts for manifold geometry, intent vector guidance, computational efficiency constraints, and solution quality requirements when determining optimal memory access paths.

Navigating the manifold at step 3560 executes the actual traversal of the memory manifold along the optimized path to reach target memory regions. Manifold navigation may comprise numerical integration of geodesic equations, step-by-step movement along computed paths, adaptive path adjustment based on local manifold conditions, and coordinate system management for tracking position within high-dimensional memory space. The navigation process can implement various traversal strategies including fixed-step integration methods, adaptive step-size algorithms, waypoint-based navigation, and/or other approaches that ensure accurate and efficient movement through the geometric memory space while maintaining alignment with goal-directed intent vectors.

Reconstructing memory trajectory 3570 reinstantiates memory content from accessed manifold regions, accounting for compression effects and geometric deformation that may have occurred since the memory was originally formed. Trajectory reconstruction may comprise sampling memory content from accessed basins, reconstructing cognitive paths that approximate original thought sequences, interpolating between memory fragments to create coherent trajectories, and compensating for compression-induced information loss through generative reconstruction techniques. The reconstruction process may account for manifold compression that has smoothed or abstracted original memory content, semantic drift that has gradually modified memory representations, geometric deformation due to ongoing manifold evolution, and current goal context that influences how memories should be interpreted and presented.

Reinforcing accessed regions at step 3580 implements bidirectional memory shaping by strengthening manifold regions that were successfully accessed during the current traversal operation. Geometric reinforcement 3581 applies curvature updates where successful memory access injects curvature back into traversed regions, deepening memory basins and improving future accessibility. The reinforcement process may adjust local manifold geometry to reflect successful memory access patterns, increase resistance to compression for frequently accessed memory regions, strengthen geodesic pathways that prove effective for goal-directed traversal, and optimize manifold structure for improved future memory access efficiency.

Returning memory content at step 3590 provides the reinstantiated memory information to the requesting system or user, formatted appropriately for integration with ongoing cognitive processes or response generation. Content return may comprise converting geometric memory representations back to semantic or linguistic formats, organizing reconstructed memory content according to relevance and coherence criteria, providing metadata about memory source regions and reconstruction confidence, and ensuring compatibility with downstream processing requirements. The returned content represents memory that has been actively reconstructed through goal-directed manifold traversal rather than passively retrieved from static storage.

The intentional remembering process demonstrates memory access as traversal rather than retrieval, where remembering involves goal-conditioned navigation through geometric memory space rather than keyword matching or similarity searches. This approach enables context-sensitive memory access that adapts to current goals and manifold state, bidirectional memory shaping that improves memory organization through usage patterns, and dynamic memory reconstruction that accounts for compression and drift effects over time.

The mathematical foundation underlying this method treats memory as a navigable geometric substrate rather than discrete stored objects, enabling memory access through optimization-based path finding rather than index lookup operations. The utility function U(x) provides goal-directed guidance that adapts memory access to current needs, while intent vectors $I(x)=\nabla U(x)$ create geometric forces that bias traversal toward relevant memory regions. The manifold properties including Riemannian metric $g_t(x)$ and curvature basins of recurrence provide the geometric structure that enables stable memory formation and efficient access through geodesic navigation.

This method enables memory systems that evolve and improve through usage rather than requiring manual curation or external optimization. The geometric reinforcement ensures that successful memory access patterns strengthen the underlying manifold structure, making future access to similar memory content more efficient and reliable. The goal-conditioned approach provides context-sensitive memory access that can retrieve different aspects of the same memory content depending on current objectives and requirements, supporting flexible and adaptive memory utilization that exceeds the capabilities of traditional retrieval-based memory systems.

Figure 36:
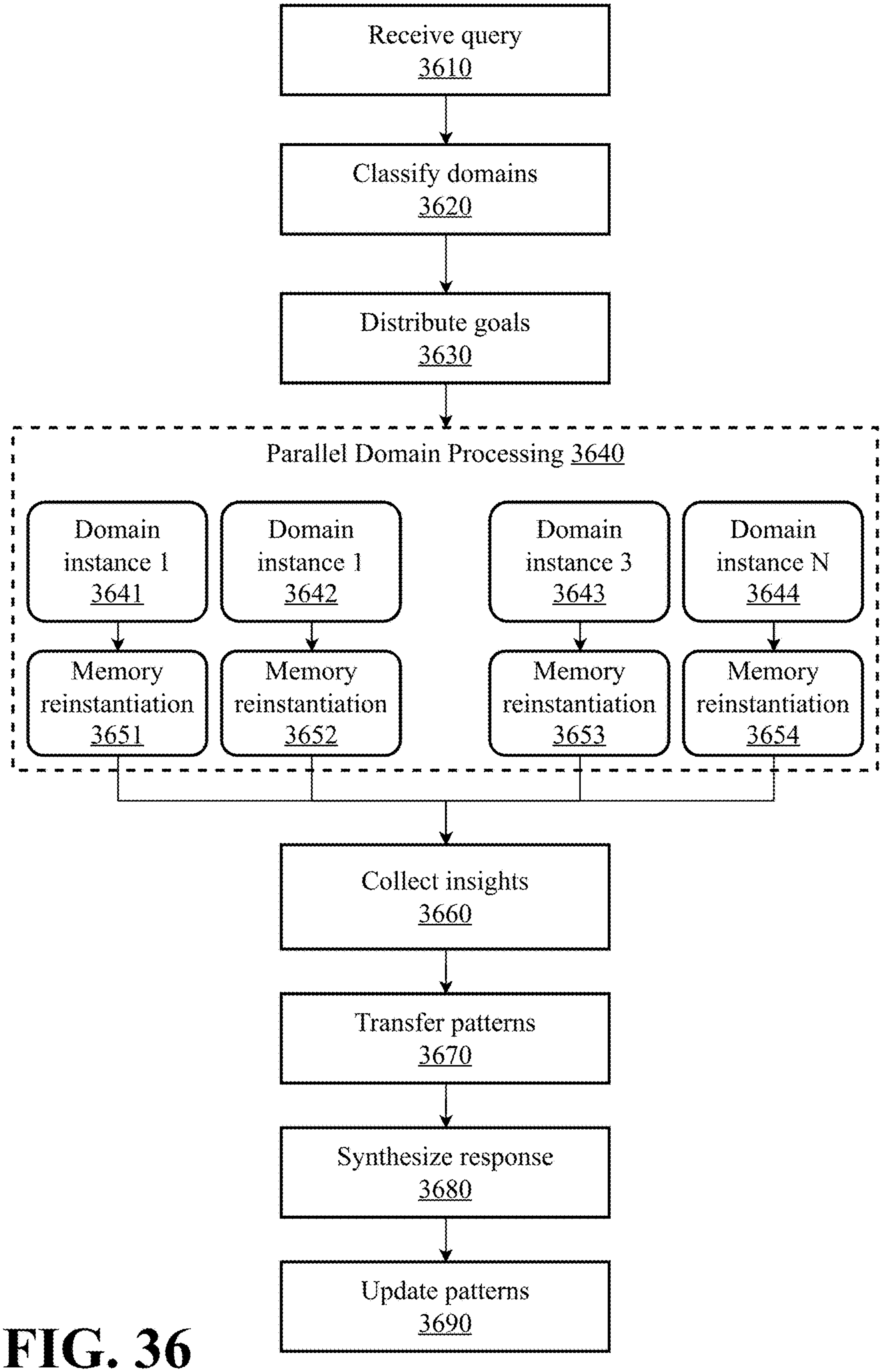
FIG. 36 is a flow diagram illustrating an exemplary method for cross-domain federated memory coordination, according to an embodiment.

FIG. 36 is a flow diagram illustrating an exemplary method for cross-domain federated memory coordination, according to an embodiment. According to the embodiment, the process begins by receiving, retrieving, or otherwise obtaining a multi-domain query at step 3610, which involves accepting user input that requires expertise spanning multiple specialized knowledge domains. Multi-domain queries may include requests that combine legal and medical considerations, financial and technical analysis, or other cross-disciplinary requirements that cannot be adequately addressed by single-domain processing. Query reception may involve preprocessing steps such as natural language parsing, complexity assessment, domain scope analysis, or other input processing methods that prepare multi-domain requests for federated processing.

Classifying domain requirements at step 3620 analyzes the received query to determine which specialized domain instances should participate in response generation. Domain classification may comprise analyzing query complexity to identify the depth and breadth of expertise required, mapping query components to available domain expertise areas, assessing resource requirements for different domain processing approaches, and determining coordination strategies for managing multi-domain processing. The classification process may utilize machine learning classifiers trained on domain-specific content, rule-based systems that map query characteristics to domain requirements, semantic analysis techniques that identify domain-specific terminology and concepts, or other classification methods that accurately determine domain participation needs.

Distributing goals at step 3630 decomposes the multi-domain query into domain-specific objectives while maintaining consistency and coordination across the federated system. Goal distribution may involve decomposing multi-domain goals into coherent sub-goals that can be processed independently by specialized domain instances, ensuring goal consistency across domains to prevent conflicting or contradictory processing objectives, establishing coordination protocols that enable synchronized processing across domain boundaries, and defining success criteria that allow assessment of individual domain contributions to overall query resolution. The distribution process may implement various decomposition strategies including hierarchical goal breakdown, parallel objective assignment, dependency-aware task allocation, or other approaches that effectively partition complex multi-domain requirements among specialized processing instances.

The method enters parallel domain processing at step 3640, which coordinates simultaneous memory access and reasoning across multiple specialized domain instances. This parallel processing phase involves multiple domain instances including domain instance 1 3641, domain instance 2 3642, domain instance 3 3643, and domain instance N 3644, each representing specialized knowledge areas such as legal, medical, financial, technical, or other domain-specific expertise. Each domain instance maintains its own geometric memory manifold optimized for domain-specific knowledge representation and implements specialized reasoning approaches tailored to the characteristics and requirements of its knowledge domain.

Within each domain instance, memory reinstantiation 3651, 3652, 3653, and 3654 performs goal-conditioned memory traversal specific to each domain's knowledge requirements. Each domain's memory reinstantiation process follows the intentional remembering methodology described in previous figures, where domain-specific goals guide geometric navigation through specialized memory manifolds to reconstruct relevant knowledge patterns and reasoning structures. The reinstantiation process within each domain may account for domain-specific semantic structures, specialized knowledge organization patterns, domain-appropriate compression strategies, and reasoning approaches that optimize for the characteristics of domain-specific information and problem-solving requirements.

Synchronization coordinates the parallel processing activities across domain instances to ensure temporal alignment, resource management, and coherent progress toward overall query resolution. Synchronization may comprise coordinating parallel processing timelines to ensure domain instances complete their processing within appropriate timeframes, managing resource allocation across domain instances to optimize system efficiency and prevent resource conflicts, maintaining communication channels between domain instances for coordination of interdependent processing steps, and monitoring progress across all participating domains to ensure successful completion of domain-specific processing objectives.

Collecting domain-specific insights at step 3660 gathers the results from parallel processing across all participating domain instances, organizing domain-specific contributions for subsequent cross-domain integration. Insight collection may involve aggregating domain-specific knowledge contributions, organizing insights according to relevance and quality criteria, resolving any inconsistencies or conflicts between domain-specific contributions, and preparing domain insights for cross-domain synthesis and integration processes. The collection process may implement various aggregation strategies including weighted combination based on domain relevance, hierarchical organization based on insight importance, temporal sequencing based on reasoning dependencies, or other approaches that effectively organize multi-domain contributions for synthesis.

Transferring patterns between domains at step 3670 identifies structural similarities and transferable knowledge patterns across different domain contributions, enabling emergent insights that arise from cross-domain interaction. Pattern recognition may comprise identifying structural similarities in reasoning patterns across domains that suggest common underlying principles or approaches, extracting transferable patterns that can inform reasoning in domains beyond their origin, detecting analogical relationships between domain-specific solutions that enable knowledge transfer, and recognizing emergent patterns that arise from the interaction of multiple domain perspectives. The pattern transfer process can utilize various analysis techniques including structural comparison algorithms, analogical reasoning methods, pattern matching techniques, or machine learning approaches that detect transferable knowledge structures across domain boundaries.

Synthesizing cross-domain response at step 3680 integrates insights from multiple domains into a coherent unified response that addresses the original multi-domain query. Knowledge synthesis may comprise integrating domain insights while preserving the depth and accuracy of specialized knowledge, resolving conflicts between domain-specific recommendations or conclusions, creating coherent narratives that effectively combine multi-domain perspectives, and ensuring that synthesized responses maintain logical consistency and practical applicability. The synthesis process may implement various integration strategies including weighted combination based on domain relevance, hierarchical integration based on reasoning dependencies, narrative construction that weaves together domain-specific insights, or other approaches that effectively combine specialized knowledge into coherent multi-domain responses.

Updating federated memory patterns at step 3690 records successful cross-domain coordination patterns and reasoning strategies for future use, enabling the federated system to improve its multi-domain processing capabilities over time. Pattern update may involve recording successful patterns of domain coordination and interaction, updating sharing mechanisms between domains based on effective knowledge transfer patterns, optimizing resource allocation strategies based on historical performance data, and strengthening cross-domain memory pathways that prove effective for multi-domain reasoning. The pattern update process can implement various learning strategies including reinforcement learning based on query resolution success, pattern strengthening based on usage frequency and effectiveness, adaptive optimization based on system performance metrics, or other approaches that enable continuous improvement of federated coordination capabilities.

This method enables multi-domain reasoning that leverages specialized knowledge while identifying emergent insights that arise from cross-domain interaction. The federated architecture supports both independent domain processing and coordinated multi-domain analysis, providing flexibility for various query types and complexity levels while enabling knowledge transfer and pattern recognition across domain boundaries. The parallel processing approach optimizes efficiency by enabling simultaneous domain-specific processing, while the cross-domain synthesis enables emergent insights that would not be available through sequential single-domain processing.

The memory integration aspects of this method ensure that each domain instance can access its specialized memory manifold while participating in coordinated federated processing, enabling the system to combine the benefits of specialized memory organization with cross-domain reasoning and synthesis capabilities. The geometric memory manifolds within each domain maintain their specialized structure and optimization while supporting federated coordination protocols that enable effective cross-domain collaboration and knowledge FIG. 1 (PRIOR ART) is a block diagram illustrating a common transformer architecture used in most large language models. A transformer generally comprises an encoder (the components on the left side of the illustration) and a decoder (the components on the right side of the illustration).

The illustrated transformer comprises an encoder and a decoder. The encoder takes input embeddings and processes them through a stack of layers (represented as dashed box 130). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 100. The input embedding 120 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 110 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 131 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 131.

After the multi-head attention layer, a residual connection is applied, followed by layer normalization at add and norm 140. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 150 is a fully connected neural network applied to each position of the encoder's hidden states. It consists of two linear transformations with a Rectified Linear Unit (ReLU) activation function in between. The purpose of the feed forward 150 layer is to introduce non-linearity and increase the model's capacity to learn complex representations. The output of the feed forward 150 layer has the same dimensionality as the input embeddings. A residual connection and layer normalization 140 are applied after the feed forward 150 layer.

The encoder layers 130 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 160). The output embedding layer 170 takes the previous processed input tokens (shifted right by one position) and converts them into dense vectors. Each token is mapped to a learnable embedding vector of a fixed size. The embedding vectors capture semantic and syntactic relationships between tokens.

Positional encoding 180 is added to the output embedding 170 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 161 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 140. The residual connection adds the input to the output of the attention layer, helping the model learn faster and deeper. Layer normalization normalizes the activations across the features, stabilizing the training process.

The multi-head attention 131 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 140 layer is then followed by feed forward network 150. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 140 layer is followed by linear 191 and softmax 192 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 160 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and RoBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x_1, x_2, \ldots, x_{\{t-1\}})$, where $x_t$ is the element at position t, and $x_1, x_2, \ldots, x_{\{t-1\}}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 2:
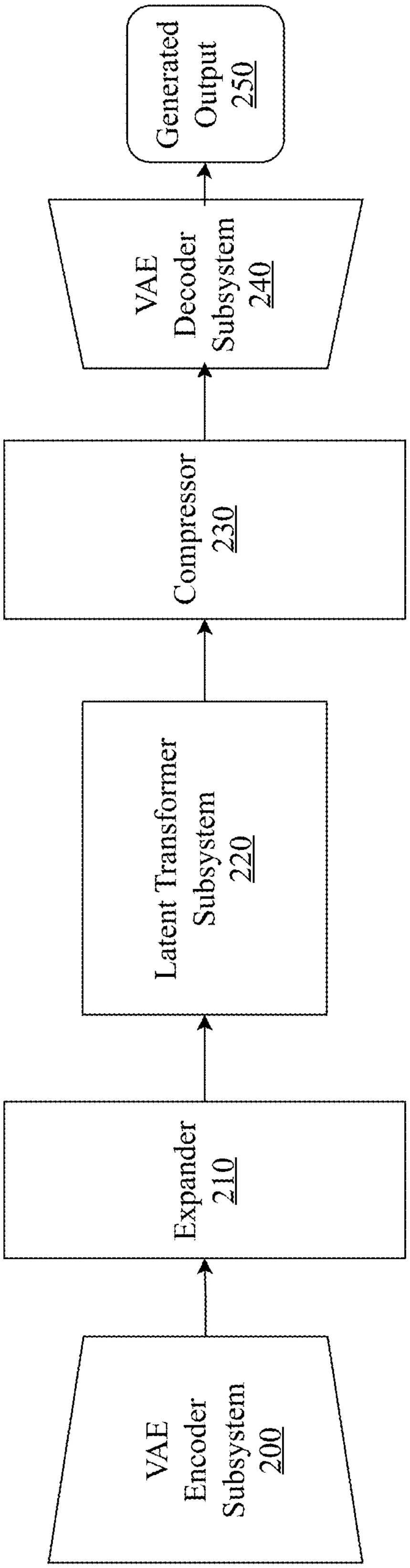
FIG. 2 is a block diagram illustrating an exemplary architecture for a latent transformer, where the transformer operates on latent space vector representations of an input.

FIG. 2 is a block diagram illustrating an exemplary architecture for a latent transformer, where the transformer operates on latent space vector representations of an input. Central to a latent transformer is a latent transformer subsystem 220, which serves as the central processing unit responsible for learning the underlying patterns, relationships, and dependencies within the input data. Latent transformer subsystem 220 leverages advanced techniques such as self-attention mechanisms and multi-head attention to capture the complex interactions and sequences in the data, enabling it to generate accurate and context-aware outputs.

The input to latent transformer subsystem 220 is provided by a VAE (Variational Autoencoder) encoder subsystem 200. VAE encoder subsystem 600 is responsible for encoding an input into a lower-dimensional latent space representation. VAE encoder subsystem 200, learns to compress the data into a compact latent space representation while preserving the essential features and characteristics of the input. Latent space vectors produced by the VAE encoder subsystem 200 may be further processed by an expander 210, which increases the dimensionality of the input data to a point where the vectors can be efficiently processed by latent transformer subsystem 220.

A latent space representation of the input generated by VAE encoder subsystem 200 serves as the input to latent transformer subsystem 220. Latent transformer subsystem 220 operates in this latent space, leveraging the compressed and informative representation to learn the complex patterns and relationships within the data. By working in the latent space, latent transformer subsystem 220 can efficiently process and model the data, capturing the intricate dependencies and generating accurate and meaningful outputs.

Once latent transformer subsystem 220 has processed the latent space representation, the generated output is passed through a VAE decoder subsystem 240. VAE decoder subsystem 240 is responsible for decoding the latent space representation back into the original data space. Prior to processing by VAE decoder subsystem 240, latent transformer subsystem 220 outputs may be compressed back to an original size before being processed by the expander 210 by being processed by a compressor 230. VAE decoder subsystem 240 learns to reconstruct the original data from the latent space representation, ensuring that the generated output is coherent and meaningful.

The reconstructed output from VAE decoder subsystem 240 is provided as a compressed generated output 250. The compressed generated output 250 represents the final result of the latent transformer, which is a compressed version of the original input.

VAE encoder subsystem 200 and VAE decoder subsystem 240 play large roles in the overall functioning of the latent transformer. VAE encoder subsystem 200 enables the system to learn a compressed and informative representation of the input data in the latent space, while the VAE decoder subsystem 240 ensures that the compressed generated output 250 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 200, latent transformer subsystem 220, and VAE decoder subsystem 240 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 3:
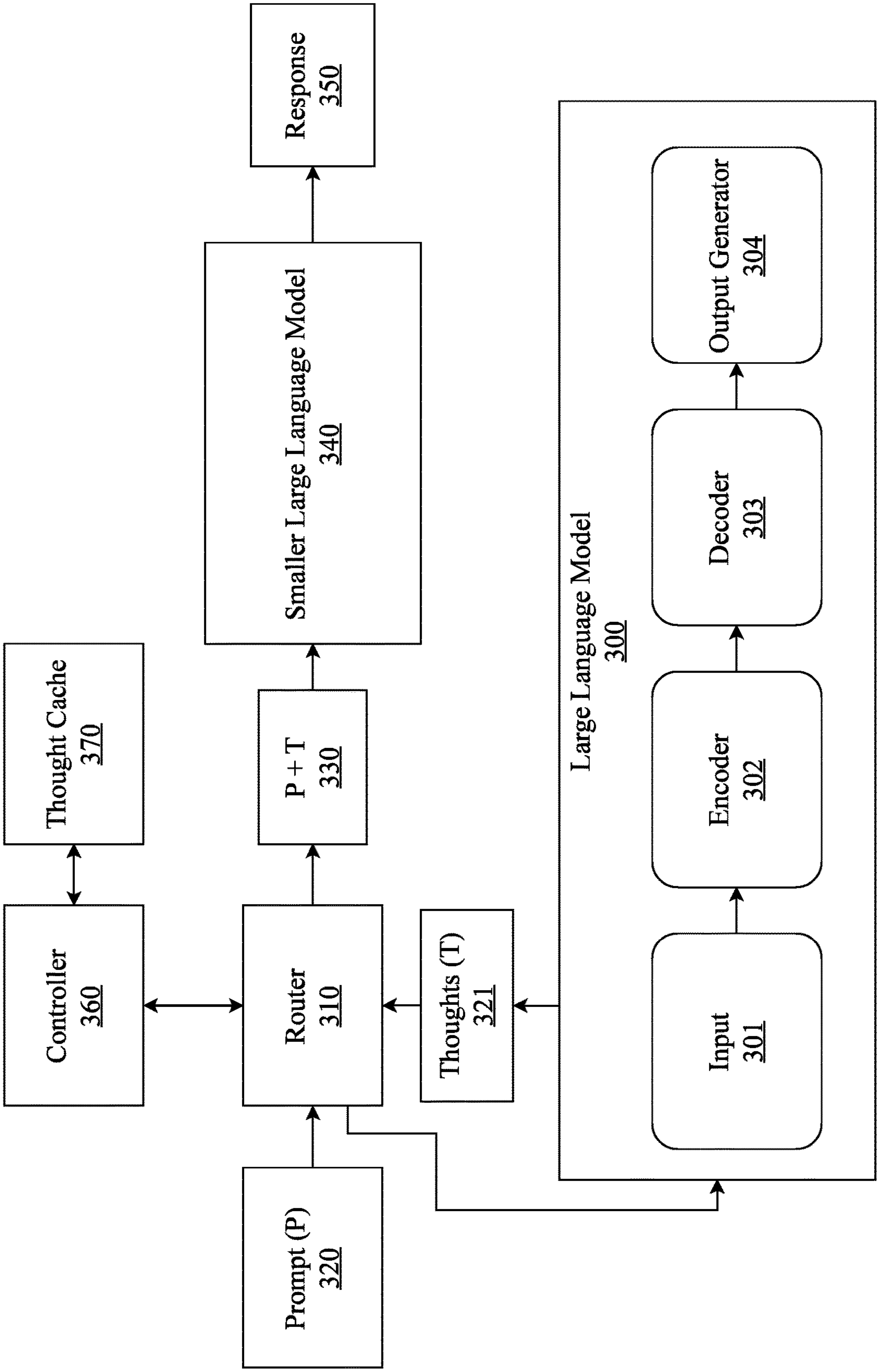
FIG. 3 is a block diagram illustrating an exemplary system architecture for a multi-state LLM with unlimited context.

FIG. 3 is a block diagram illustrating an exemplary system architecture for a multi-state LLM with unlimited context. The system includes a large language model 300, a router 310, a controller 360, a thought cache 370, and a smaller language model 340 that work together to process prompts and generate responses while optimizing computational resources.

The system receives an initial prompt (P) 320 through the router 310. The router serves as the central control component, determining whether to utilize the large language model 300 or access the thought cache 370 through the controller 360. Upon receiving a prompt, the router first queries the thought cache to determine if relevant thoughts exist for similar prompts.

The large language model 300 includes an input component 301, an encoder 302, a decoder 303, and an output generator 304. The large language model 300 can utilize various internal architectures, including but not limited to traditional transformer cores (as shown in FIG. 1) or latent transformer cores (as shown in FIG. 2). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 300. During this processing, the model enters a reasoning phase where it generates thoughts (T) 321 about the prompt. These thoughts represent the model's analysis and reasoning about the prompt before generating a final response.

The controller 360 manages interaction with the thought cache 370, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 330. This combination is then routed to the smaller language model 340, which requires significantly fewer computational resources than the large model. The smaller model processes the P+T 330 combination to generate the final response 350.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 340 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 3. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements—financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 310 analyzes both recent detailed thoughts and older abstract thoughts to identify relevant context. A thought synthesizer 430 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 370 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 370 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 370 monitors access patterns and triggers consolidation events when thought clusters meet specific temporal or utilization thresholds. During these events, thought cache 370 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 370 adapts consolidation timing based on thought utility metrics. Thought cache 370 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 370 hierarchical storage structure spans multiple performance tiers, from high-speed memory for recent and frequently accessed thoughts to more economical storage for consolidated meta-thoughts. Thought cache 370 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 370 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective unlimited context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 4:
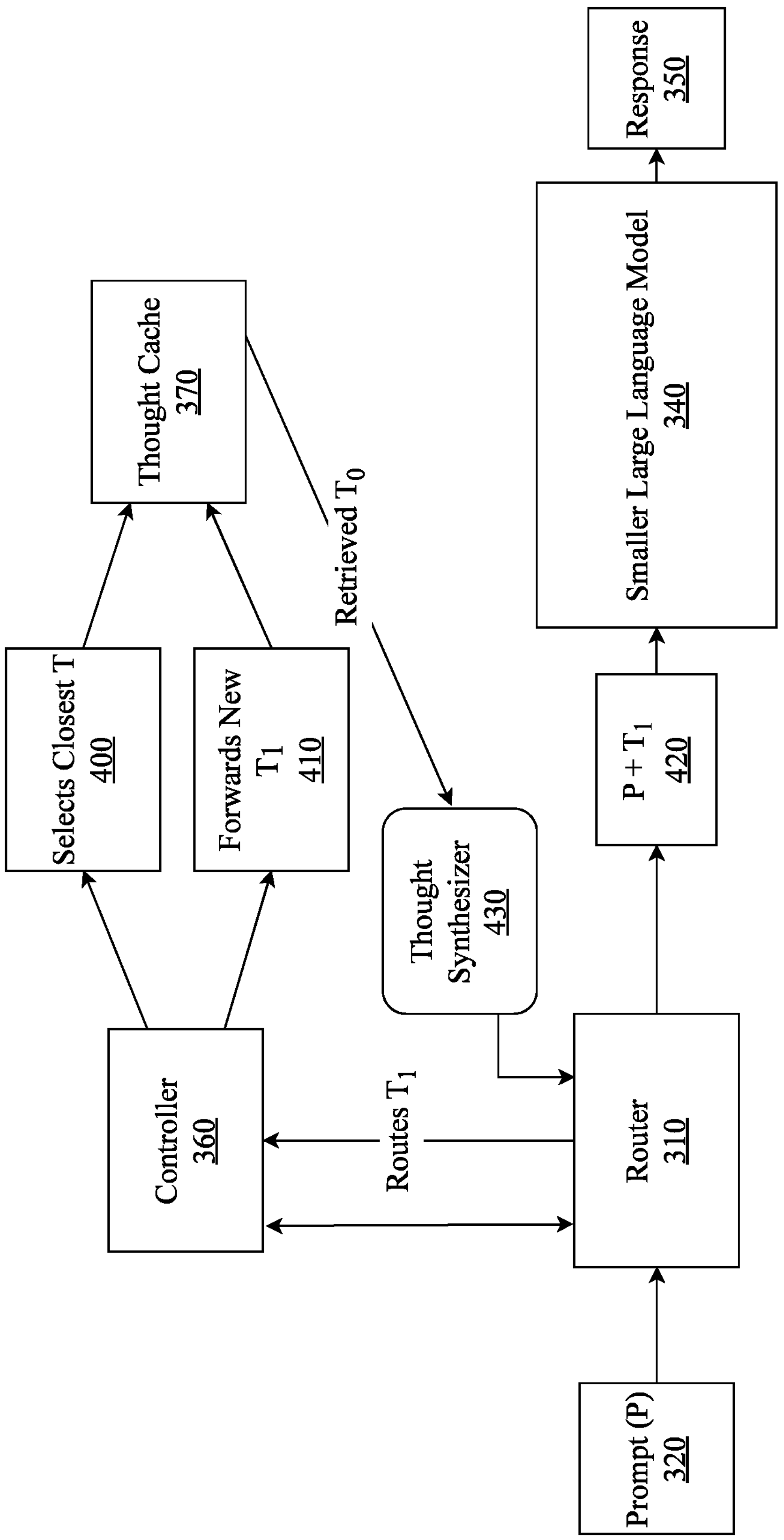
FIG. 4 is a block diagram illustrating an exemplary system architecture for a multi-state LLM with unlimited context with thought synthesis and retrieval.

FIG. 4 is a block diagram illustrating an exemplary system architecture for a multi-state LLM with unlimited context with thought synthesis and retrieval. The figure demonstrates how the system handles scenarios where cached thoughts may be relevant but not precisely matched to the current prompt.

The system begins when a prompt (P) 320 is received by the router 310. When router 310 receives a prompt 320, it interacts with the thought cache 370 through the controller 360 to retrieve potentially relevant thoughts.

The controller 360 performs two key functions in this embodiment. First, it selects the closest thought ($T_0$) 400 from the cache that relates to the current prompt. Second, after a synthesizer 430 creates a new thought $T_1$ 410, controller 360 manages the storage of newly synthesized thoughts. The controller evaluates the retrieved $T_0$ against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously—one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 360 processes $T_0$ to create a new thought $T_1$ that better aligns with the current prompt's requirements. For example, if a prompt asks about specific aspects of quantum computing, and $T_0$ contains general quantum computing concepts, the synthesizer can create a $T_1$ that focuses more precisely on the specific aspects requested in the prompt.

Thought synthesizer 430 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts—it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive $T_1$. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing ($T_1$) and cryptocurrency security ($T_2$), the system performs a weighted combination expressed as $T_{new}=\alpha*T1+\beta*T2$, where $\alpha$ and $\beta$ represent relevance weights determined by similarity scores between each thought and the prompt. The resulting vector $T_{new}$ is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of critical information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form $P+T_1$ 420, which is then processed by the smaller language model 340 to generate the final response 350. The newly synthesized $T_1$ is also routed back through the controller for potential caching with thought cache 370, allowing it to be used for future similar prompts.

In one embodiment, thought cache 370 provides performance improvements by eliminating redundant reasoning computations across similar prompts. When 310 router identifies a new prompt with reasoning requirements similar to previously processed queries, thought cache 370 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 370 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 370 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 370 may employ a continuous validation mechanism. This mechanism monitors the performance of cached thoughts and can automatically flag patterns that lead to inconsistent or incorrect responses. When potential issues are detected, thought cache 370 may temporarily suspend the use of problematic thoughts and route similar prompts through the large language model for fresh analysis. This self-correction capability ensures that the efficiency benefits of thought caching do not come at the expense of response quality.

Thought cache 370 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance.

In another embodiment, thought cache 370 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 370 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 370 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 5:
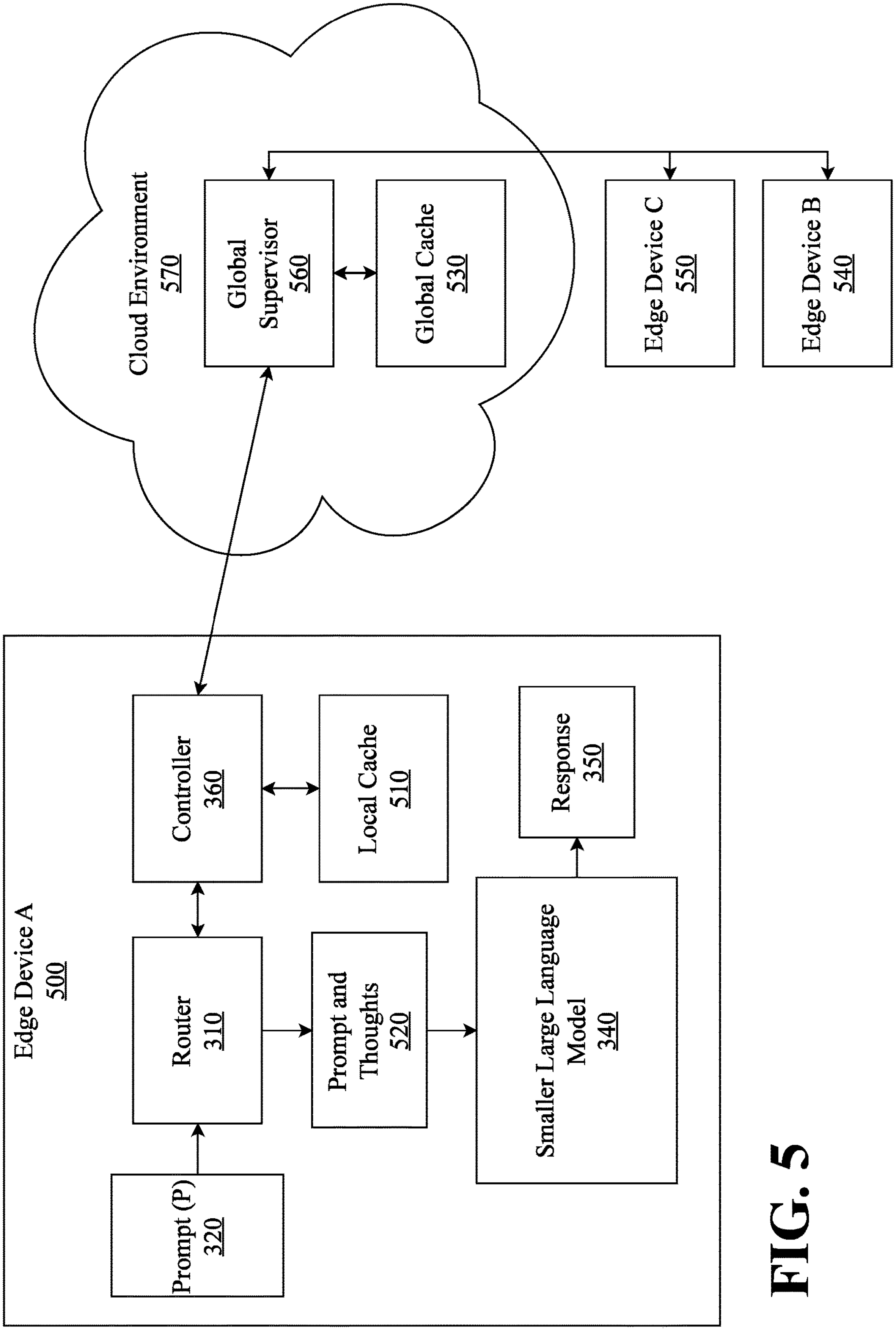
FIG. 5 is a block diagram illustrating an exemplary system architecture for a multi-state LLM with unlimited context with local and global thought caches.

FIG. 5 is a block diagram illustrating an exemplary system architecture for a multi-state LLM with unlimited context with local and global thought caches. This embodiment demonstrates how the system can operate primarily on edge devices while maintaining access to a broader knowledge base through cloud connectivity.

Edge device A 500 represents a complete edge implementation of the system, which could be a device such as but not limited to a mobile phone, tablet, or other personal computing device. Within the edge device 500, router 310 receives prompts (P) 320 and coordinates with a local controller 360 and local cache 510. Local cache 510 stores frequently accessed or personally relevant thoughts directly on the device, enabling quick access and offline functionality.

The smaller language model 340 runs directly on the edge device, processing prompt and thought combinations 520 to generate responses 350. This local processing capability significantly reduces latency and computational requirements compared to constantly accessing cloud resources.

The cloud environment 570 contains a global cache 530 managed by a global controller 560. This global infrastructure serves as a centralized repository for thoughts generated across multiple edge devices (B 540, C 550). The global controller coordinates cache synchronization and manages access patterns across the network of connected devices.

When an edge device's controller 360 cannot find relevant thoughts in its local cache 510, it can query the global controller 560 to search the global cache 530. For example, if a user on edge device A 500 asks a question about a topic they haven't encountered before, the system first checks the local cache 510, then can reach out to the global cache 530 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

Figure 6:
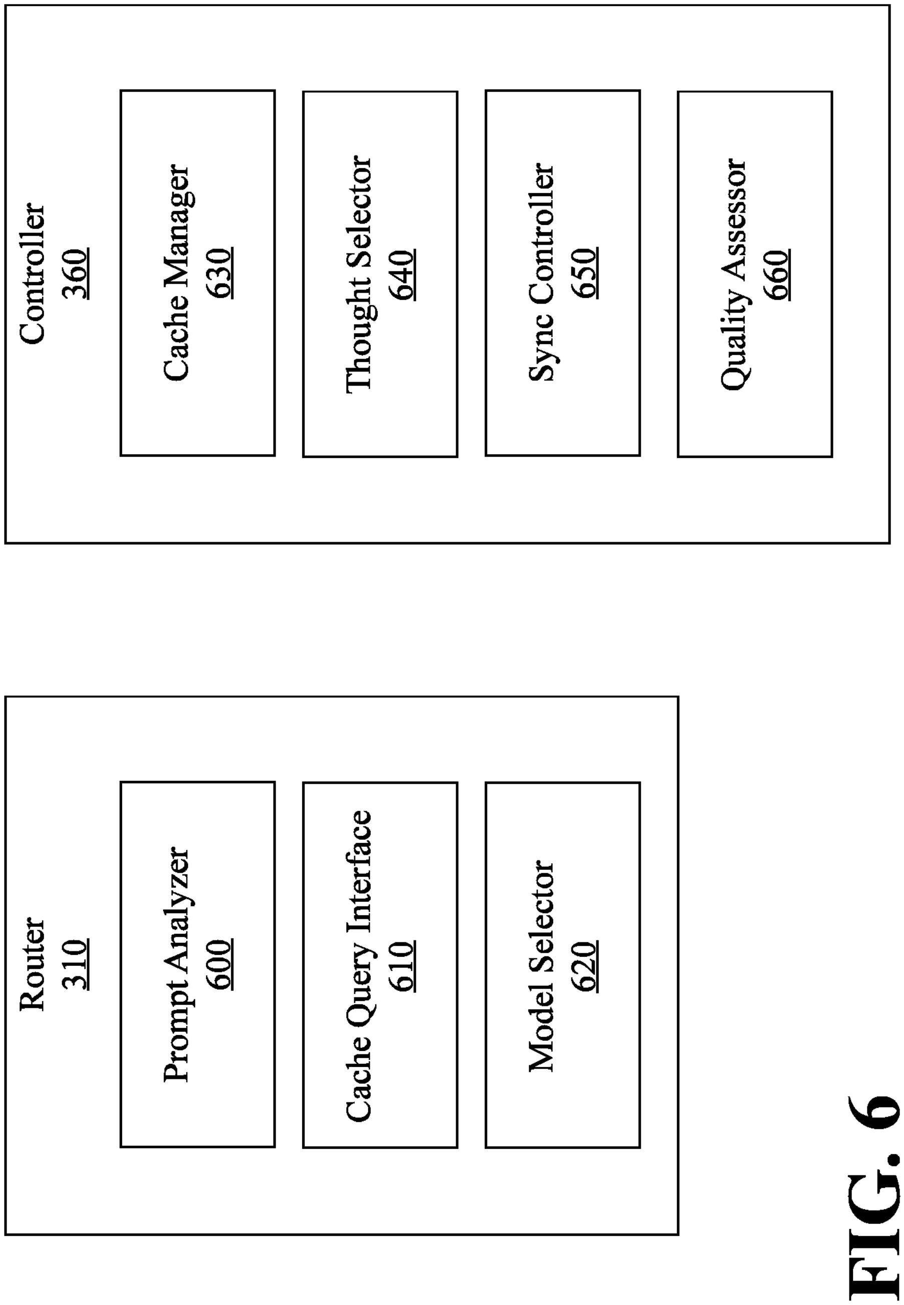
FIG. 6 is a block diagram illustrating exemplary components for a multi-state LLM with unlimited context, a router and a controller.

FIG. 6 is a block diagram illustrating exemplary components for a multi-state LLM with unlimited context, a router and a controller. A prompt analyzer 600 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 600 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 610 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 620 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 620 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 620 also maintains statistics about the effectiveness of its decisions to continuously refine its selection strategy and may implement different selection policies based on user preferences or application requirements.

A cache manager 630 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 630 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 640 implements algorithms to identify and select the most relevant thoughts from the cache. It uses similarity metrics and relevance scoring to rank cached thoughts based on their applicability to the current prompt. For instance, when processing a prompt about quantum computing applications in cryptography, it might prioritize thoughts that bridge both quantum and cryptographic concepts. Thought selector 640 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 650 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 650 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 650 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 650 can prioritize synchronization tasks based on thought importance, urgency, and resource availability.

A quality assessor 660 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 660 may employ multiple evaluation criteria including syntactic correctness, semantic coherence, factual accuracy, and practical utility. It maintains historical performance metrics for each thought, tracking success rates in different contexts and user satisfaction levels. Quality assessor 660 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 660 also provides detailed quality reports that can be used to guide cache maintenance operations and thought synthesis decisions, and it can trigger automatic thought improvement processes when quality metrics fall below acceptable thresholds.

Description of Method Aspects

FIG. 7 is a flow diagram illustrating an exemplary method for natural language processing using a dual-model approach with thought generation. In a first step 700, the system receives a prompt from a user. This prompt can be any form of natural language input, such as a question, command, or statement. For example, a user might input "Explain how quantum entanglement works and its applications in quantum computing."

In a step 710, the system processes the prompt through a first large language model. This model is the larger of the two models, containing more parameters and greater processing capability. During this step, the prompt is encoded and processed through the model's architecture to begin the reasoning process. Continuing the example, the large model begins analyzing the quantum entanglement prompt to understand its complexity and required knowledge domains.

In a step 720, the first large language model converts the prompt into thoughts. These thoughts represent the model's reasoning process and understanding of the prompt's requirements. For the quantum entanglement example, the model might generate thoughts such as: "Quantum entanglement involves pairs of particles maintaining correlated properties regardless of distance" and "In quantum computing, entanglement enables quantum bits to exist in multiple states simultaneously, increasing computational power."

In a step 730, the system routes both the original prompt and the generated thoughts to a second large language model that has fewer parameters than the first model. This routing process combines the original prompt and the generated thoughts into a structured input format that the smaller model can efficiently process. Using the example, both the quantum entanglement prompt and the theoretical thoughts about quantum mechanics are packaged together and sent to the smaller model.

In a step 740, the system generates a response using the second large language model, utilizing both the original prompt and the thoughts generated by the first model. This smaller model, while having fewer parameters, can generate high-quality responses because it has access to the sophisticated reasoning already performed by the larger model. In the quantum entanglement example, the smaller model can now generate a clear, accurate response by leveraging both the original prompt and the theoretical framework provided by the larger model's thoughts, without needing to independently reason about complex quantum mechanics concepts.

This method enables efficient use of computational resources while maintaining response quality by leveraging the strengths of both models: the sophisticated reasoning capabilities of the larger model and the efficient response generation of the smaller model.

Figure 8:
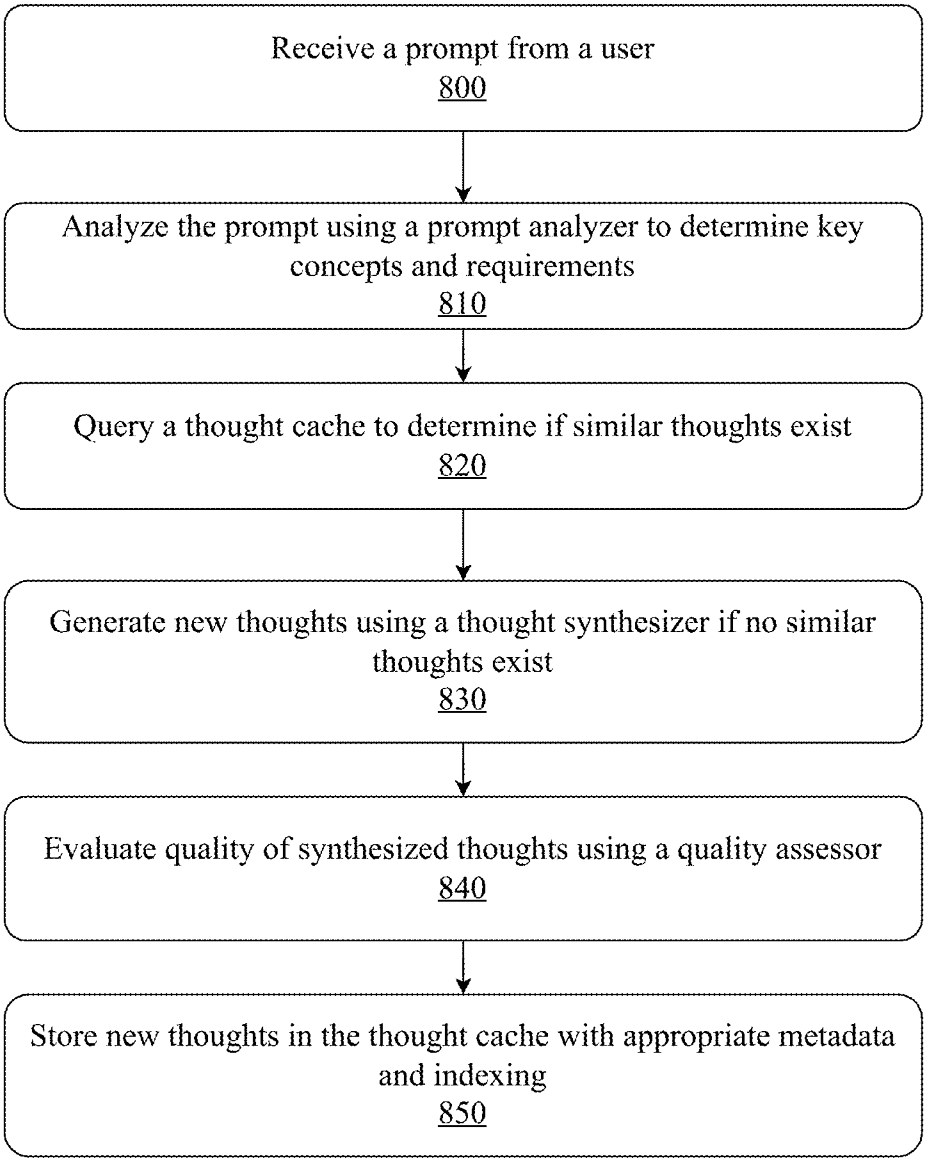
FIG. 8 is a flow diagram illustrating an exemplary method for thought creation, evaluation, and storage within the system.

FIG. 8 is a flow diagram illustrating an exemplary method for thought creation, evaluation, and storage within the system. In a first step 800, the system receives a prompt from a user. This prompt represents any natural language input that requires processing. For example, a user might input "What are the implications of quantum computing on modern cryptography?"

In a step 810, the prompt analyzer processes the input to determine key concepts and requirements. During this step, the analyzer identifies main topics, subtopics, and relationships between concepts. In our example, the analyzer would identify key concepts such as "quantum computing," "cryptography," and their intersection, while also determining the need for forward-looking analysis given the word "implications."

In a step 820, the system queries the thought cache to determine if similar thoughts exist. The query process involves searching both local and potentially global caches for thoughts that match the analyzed concepts. For the example, the system might search for existing thoughts about quantum computing's effects on encryption methods, post-quantum cryptography, or quantum-safe algorithms.

In a step 830, if no similar thoughts exist or existing thoughts aren't sufficiently relevant, the system generates new thoughts using a thought synthesizer. This component may combine fragments of related thoughts or generate entirely new ones. Following the example, if thoughts about quantum computing and modern cryptography exist separately, the synthesizer might combine and adapt them to address their intersection specifically.

In a step 840, the quality assessor evaluates the newly synthesized thoughts. This evaluation considers factors such as relevance, coherence, and completeness. For instance, it would assess whether the synthesized thoughts about quantum computing's cryptographic implications adequately cover both technical and practical aspects of the topic.

In a step 850, the system stores the new thoughts in the cache with appropriate metadata and indexing. This step includes tagging the thoughts with relevant keywords, creating appropriate vector embeddings for future similarity searches, and organizing them within the cache's structure. The thoughts about quantum cryptography might be indexed under both quantum computing and cryptography categories, with metadata indicating their relationship to security, encryption, and future technology implications. This method ensures that the system continuously builds and refines its knowledge base while maintaining quality and accessibility of stored thoughts.

Figure 9:
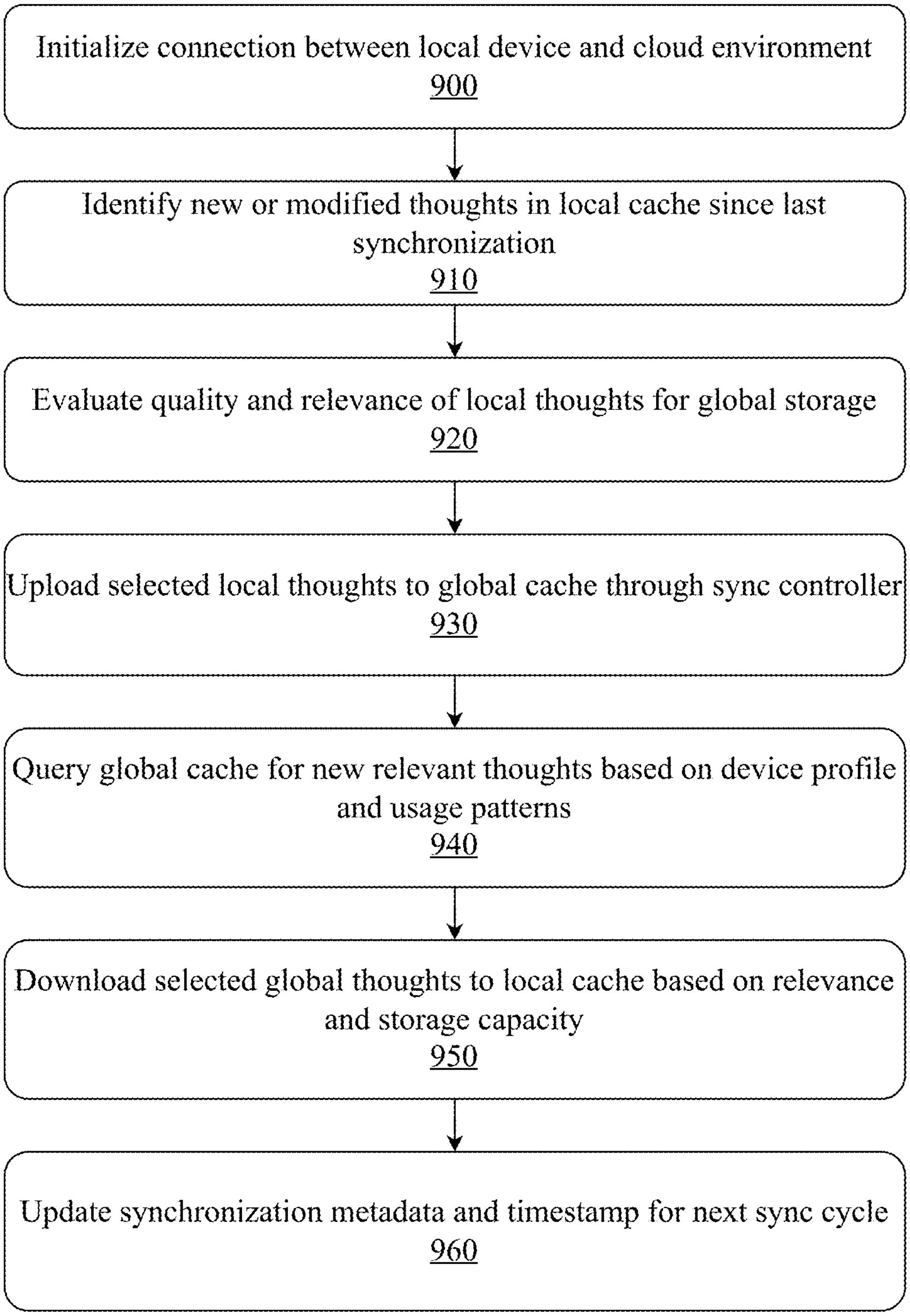
FIG. 9 is a flow diagram illustrating an exemplary method for synchronizing thought caches between local devices and a global cloud environment.

FIG. 9 is a flow diagram illustrating an exemplary method for synchronizing thought caches between local devices and a global cloud environment. In a first step 900, the system initializes a connection between a local device and the cloud environment. This step establishes secure communication channels and verifies authentication credentials. For example, when a user's mobile device connects to the cloud service, it establishes an encrypted connection and validates the device's identity and permissions.

In a step 910, the system identifies new or modified thoughts in the local cache since the last synchronization event. This involves comparing timestamp metadata and modification flags of local thoughts with the last known sync state. For instance, if a user has generated new thoughts about quantum computing on their device while offline, these would be flagged for potential synchronization.

In a step 920, the system evaluates the quality and relevance of local thoughts for global storage. This evaluation considers factors such as thought complexity, uniqueness, and potential value to other users. For example, if a local device has generated highly specialized thoughts about quantum cryptography, the system assesses whether these thoughts would be valuable additions to the global knowledge base.

In a step 930, the system uploads selected local thoughts to the global cache through the sync controller. This step includes formatting the thoughts for global storage and managing the upload process. Continuing the example, the quantum cryptography thoughts would be packaged with appropriate metadata and transferred to the global cache.

In a step 940, the system queries the global cache for new relevant thoughts based on the device profile and usage patterns. This involves analyzing the user's interests and recent activities to identify potentially useful thoughts from the global cache. For instance, if the user frequently works with cryptography-related prompts, the system would search for recent additions to the global cache in this domain.

In a step 950, the system downloads selected global thoughts to the local cache based on relevance and storage capacity. This step optimizes local storage by prioritizing the most relevant thoughts while considering device limitations. For example, the system might download new thoughts about quantum encryption while removing older, less relevant thoughts to maintain optimal cache size.

In a step 960, the system updates synchronization metadata and timestamps for the next sync cycle. This includes recording which thoughts were synchronized, updating version information, and setting markers for the next synchronization event. This information ensures future sync cycles can efficiently identify new changes and maintain cache consistency. This method enables efficient knowledge sharing across a network of devices while maintaining both local and global thought repositories, effectively creating a distributed learning system that benefits from collective user interactions.

Figure 10:
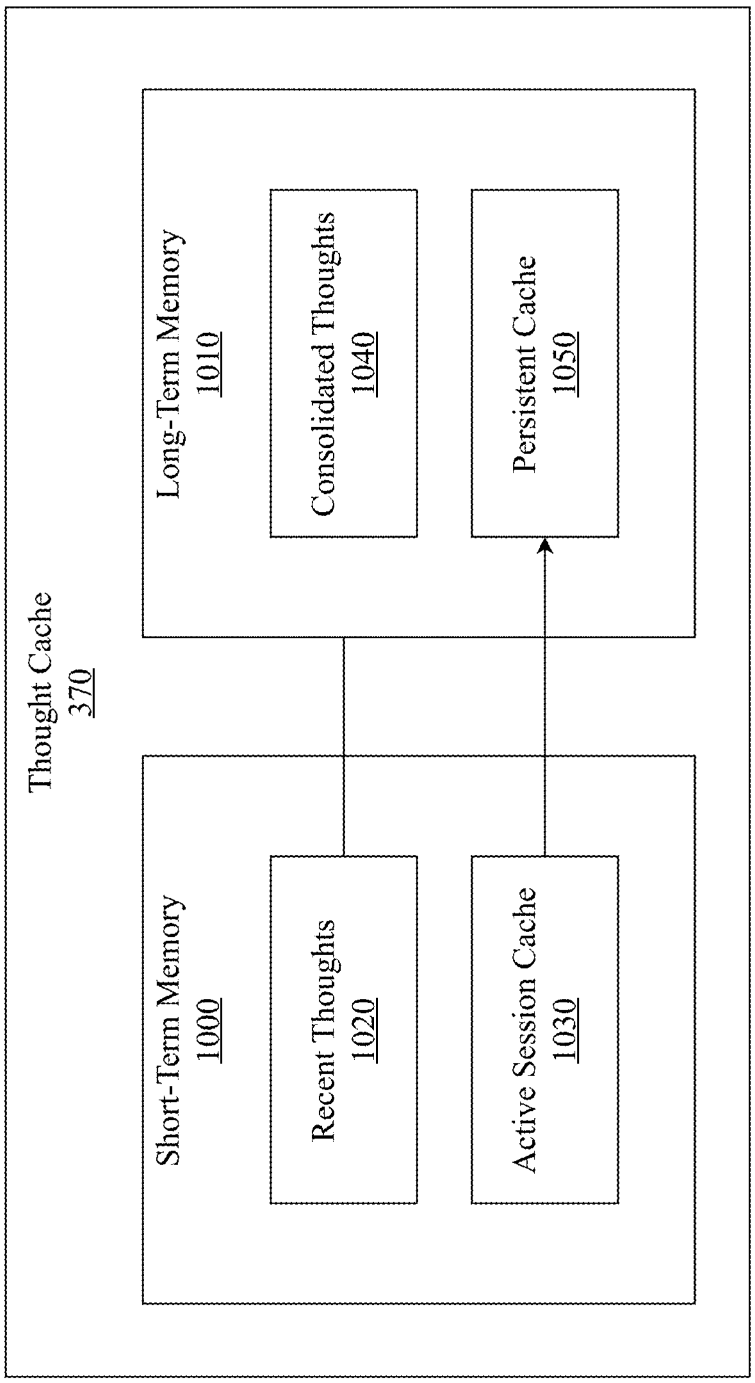
FIG. 10 is a block diagram illustrating an exemplary system architecture of a thought cache that has both a long-term memory and a short-term memory.

FIG. 10 is a block diagram illustrating an exemplary system architecture of a thought cache that has both a long-term memory and a short-term memory. In one embodiment, thought cache 370 represents a system for maintaining effectively unlimited context in language models through progressive compression and intelligent caching of thought patterns, enabling shared reasoning across multiple AI instances.

Thought cache 370 implements both a short-term memory 1000 and a long-term memory 1010. This dual-memory architecture enables the system to maintain both immediate computational context and historical reasoning patterns while managing computational resources efficiently.

The short-term memory 1000 comprises recent thoughts 1020 and an active session cache 1030. Recent thoughts 1020 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1030 provides rapid access to these thoughts and their associated states, optimizing performance for ongoing interactions and enabling immediate thought sharing between different AI instances or specialized reasoning modules operating within the same session.

The long-term memory 1010 implements a more sophisticated storage approach through consolidated thoughts 1040 and a persistent cache 1050. Consolidated thoughts 1040 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1050 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1020 to consolidated thoughts 1040 through progressive compression, while the active session cache 1030 can transfer frequently accessed patterns to the persistent cache 1050 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Mobile Device Optimized Multi-Stage LLM System Architecture

Figure 11:
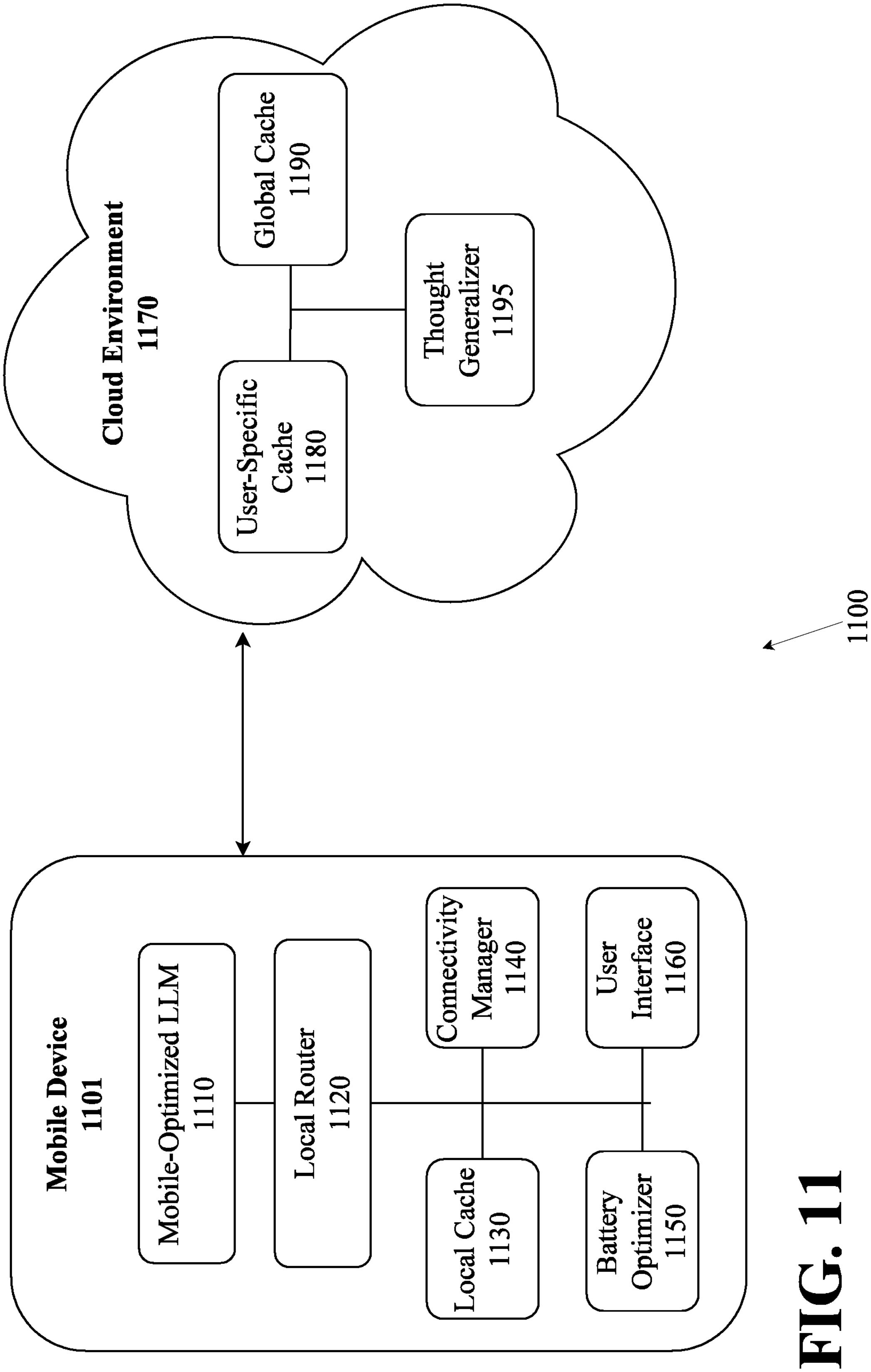
FIG. 11 is a block diagram illustrating exemplary architecture of mobile device optimized multi-stage LLM.

FIG. 11 is a block diagram illustrating exemplary architecture of mobile device optimized multi-stage LLM, in an embodiment. System 1100 operates primarily on mobile computing devices such as, but not limited to, smartphones, tablets, or wearable devices, with cloud connectivity for expanded capabilities.

Mobile device portion 1101 of system 1100 comprises several interconnected subsystems that enable efficient natural language processing while addressing mobile-specific constraints. Mobile-optimized LLM 1110 serves as primary processing engine for generating thoughts from user prompts. Unlike traditional large language models, mobile-optimized LLM 1110 employs architectural optimizations specific to mobile execution environments, including model quantization, attention mechanism optimizations, and memory-efficient transformer implementations. Mobile-optimized LLM 1110 processes user prompts to generate intermediate reasoning steps referred to as thoughts, which represent model's analysis and understanding of prompt requirements.

Local router 1120 functions as central coordination mechanism, determining processing paths for user prompts and managing data flow between system components. When user prompt is received, local router 1120 analyzes prompt characteristics and determines whether to process prompt through mobile-optimized LLM 1110 or attempt to retrieve relevant thoughts from local cache 1130. Local router 1120 implements decision logic based on prompt similarity to previously processed queries, availability of cached thoughts, current device resource state, and connectivity status.

Local cache 1130 stores both user-specific thoughts and frequently accessed generalized thoughts directly on mobile device. Local cache 1130 implements efficient storage and retrieval mechanisms optimized for limited mobile storage capacity, including compression techniques and priority-based caching policies. Local cache 1130 maintains two primary sections: personal section for user-specific thoughts and generalized section for commonly used reasoning patterns. This two-section approach enables offline functionality while maintaining privacy boundaries between personal and shared knowledge.

Connectivity manager 1140 monitors network status and manages data synchronization between mobile device and cloud environment. When network connectivity is available, connectivity manager 1140 orchestrates bidirectional synchronization of thoughts between local cache 1130 and both user-specific cloud cache 1180 and global cache 1190. Connectivity manager 1140 implements intelligent synchronization policies, including prioritizing high-value thoughts for limited connectivity scenarios, scheduling bandwidth-intensive operations during optimal network conditions, and maintaining synchronization queues when connectivity is intermittent.

Battery optimizer 1150 monitors device power state and dynamically adjusts system behavior to maximize battery efficiency. Battery optimizer 1150 implements multiple execution profiles for mobile-optimized LLM 1110, ranging from high-performance operation when device is charging to minimal power consumption modes when battery level is critical. Battery optimizer 1150 also coordinates with connectivity manager 1140 to schedule energy-intensive operations such as thought synchronization during charging periods or when device is in idle state.

User interface 1160 provides interaction layer between user and system 1100, handling prompt input and response presentation. User interface 1160 may integrate with mobile device capabilities such as voice input, camera-based context sensing, and haptic feedback to enhance interaction experience. User interface 1160 also provides transparency indicators when system operates in offline mode, communicating confidence levels and limitations appropriately to users.

Cloud environment 1170 extends capabilities of system 1100 beyond constraints of mobile device, providing expanded storage capacity and computational resources for specific operations. User-specific cloud cache 1180 securely stores complete history of user thoughts with appropriate encryption and access controls. Unlike local cache 1130 which must prioritize storage of thoughts based on utility and recency, user-specific cloud cache 1180 maintains comprehensive record of user interactions and generated thoughts, enabling long-term context preservation without consuming mobile device storage resources. User-specific cloud cache 1180 encrypts all stored thoughts with user-specific keys to maintain privacy and prevent unauthorized access.

Global cache 1190 maintains repository of generalized thoughts applicable across multiple users. These thoughts represent common reasoning patterns and knowledge structures that have utility beyond individual user contexts. Global cache 1190 organizes thoughts into domain-specific clusters, reasoning frameworks, and abstracted templates to facilitate efficient retrieval based on prompt characteristics. Unlike user-specific cloud cache 1180, global cache 1190 contains no personally identifiable information or user-specific context.

Thought generalizer 1195 processes user-generated thoughts to create anonymized, generalized thought patterns for global cache 1190. Thought generalizer 1195 implements multi-stage pipeline including pattern recognition to identify similar reasoning approaches across users, context removal techniques that strip away user-specific elements, and abstraction methods that transform specific thoughts into more universally applicable structures. Thought generalizer 1195 operates exclusively in cloud environment 1170 to leverage increased computational resources and access to thoughts across multiple users.

In operation, when user submits prompt through user interface 1160, local router 1120 first queries local cache 1130 to determine if relevant thoughts exist. If suitable thoughts are found, they are combined with original prompt and processed by smaller language model (not shown in FIG. 11, see for example FIG. 5) to generate response. If no relevant thoughts exist in local cache 1130, local router 1120 checks connectivity status through connectivity manager 1140. If online, system may query user-specific cloud cache 1180 and global cache 1190 for relevant thoughts. If offline or if no relevant thoughts are found in cloud caches, prompt is processed by mobile-optimized LLM 1110 to generate new thoughts. These new thoughts are then processed alongside original prompt by smaller language model to generate response.

Throughout this process, battery optimizer 1150 continuously monitors power state and adjusts system behavior accordingly. When device is charging or has sufficient battery capacity, system may utilize more complex model configurations or perform background synchronization operations. When battery level is low, system prioritizes efficiency over comprehensive processing, potentially utilizing more cached thoughts or simplified model configurations.

New thoughts generated during operation are cached in local cache 1130 and, when connectivity permits, synchronized with user-specific cloud cache 1180 through connectivity manager 1140. Connectivity manager 1140 implements priority-based synchronization, ensuring most valuable thoughts are transferred first during limited connectivity periods. Thought generalizer 1195 periodically analyzes thoughts across multiple users to identify patterns suitable for generalization, with resulting abstracted thoughts stored in global cache 1190 for broader reuse across system.

Figure 12:
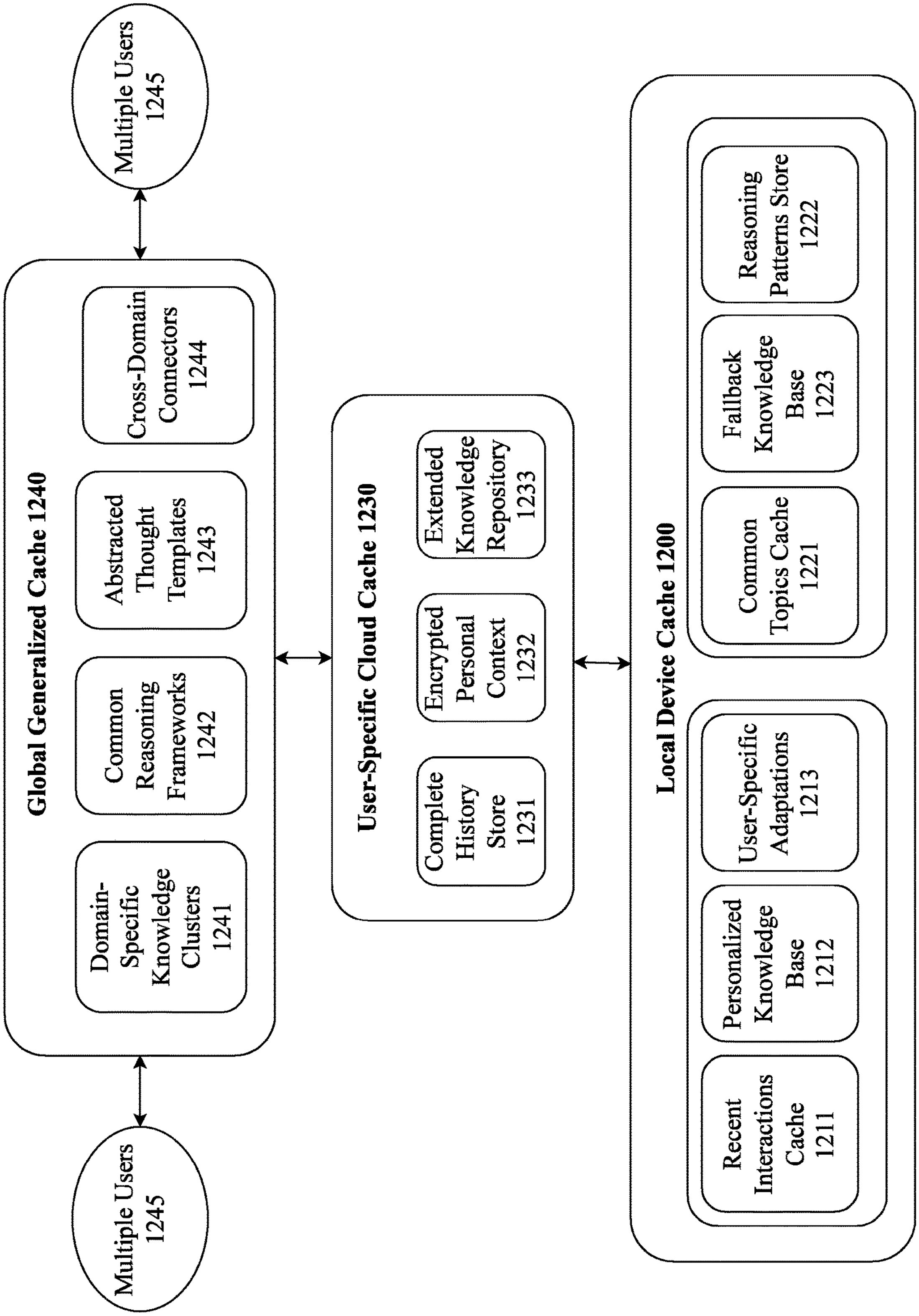
FIG. 12 is a block diagram illustrating exemplary architecture of three-tier thought caching architecture.

FIG. 12 is a block diagram illustrating exemplary architecture of three-tier thought caching architecture, in an embodiment. Three-tier thought caching architecture 1200 implements hierarchical approach to thought storage that balances privacy, efficiency, and knowledge sharing while accommodating constraints of mobile computing environments.

At device level, local device cache 1200 serves as primary storage mechanism for thoughts directly accessible on mobile device without requiring network connectivity. Local device cache 1200 comprises two main sections optimized for different types of thought storage. Personal section 1210 maintains user-specific thoughts and personalized knowledge patterns. Within personal section 1210, recent interactions cache 1211 stores thoughts generated during latest user sessions with full fidelity and minimal compression, ensuring rapid access to immediately relevant context. Recent interactions cache 1211 implements sliding window approach, where older thoughts gradually transition to more compressed formats or move to cloud storage based on configurable retention policies. Personalized knowledge base 1212 maintains thoughts representing user-specific knowledge, preferences, and recurring patterns identified across multiple sessions. Unlike recent interactions cache 1211 which preserves detailed token-level information, personalized knowledge base 1212 stores more abstracted representations focused on core concepts and relationships pertinent to user. User-specific adaptations 1213 captures customizations to general thought patterns based on user interaction history, including terminology preferences, reasoning approaches, and domain-specific variations that diverge from generalized patterns.

Generalized section 1220 of local device cache stores non-personal, broadly applicable thoughts that enhance offline capabilities without compromising privacy. Common topics cache 1221 maintains frequently accessed general knowledge applicable across multiple contexts, prioritizing storage based on usage frequency, user interests, and predictive pre-caching based on user behavior patterns. Reasoning patterns store 1222 contains abstract thought structures representing common reasoning frameworks, such as analysis methodologies, problem-solving approaches, and logical structures that can be applied across domains. Fallback knowledge base 1223 provides essential baseline knowledge for offline operation when network connectivity is unavailable, including fundamental concepts and broadly applicable information selected based on relevance to user's typical interaction patterns.

Second tier of architecture, user-specific cloud cache 1230, extends personal thought storage beyond limitations of mobile device while maintaining strict privacy boundaries. Complete history store 1231 maintains comprehensive record of user-generated thoughts across all interactions, enabling access to historical context beyond storage constraints of local device. Complete history store 1231 implements intelligent compression strategies where older thoughts transition to increasingly abstract representations while maintaining essential semantic content and relational links. Encrypted personal context 1232 secures sensitive user-specific information using encryption keys accessible only to specific user, ensuring personal data remains protected even within shared cloud infrastructure. Encrypted personal context 1232 stores thoughts containing personally identifiable information, private preferences, and confidential content with enhanced security measures beyond standard cache protections. Extended knowledge repository 1233 maintains broader collection of user-relevant thoughts that exceed local storage capacity, organized by topic domains, temporal relationships, and usage patterns to facilitate efficient retrieval when needed.

Third tier, global generalized cache 1240, enables knowledge sharing across multiple users without compromising individual privacy. Domain-specific knowledge clusters 1241 organize thoughts by subject areas, professional domains, or topic categories, enabling efficient retrieval based on prompt context. Domain-specific knowledge clusters 1241 may implement varying levels of specialization, from broadly applicable concepts to highly technical domain knowledge, with appropriate metadata to support context-aware retrieval. Common reasoning frameworks 1242 store generalized thought patterns representing widely used analytical approaches, problem-solving methodologies, and logical structures independent of specific content domains. These frameworks serve as templates that can be instantiated with domain-specific knowledge to address particular prompts. Abstracted thought templates 1243 provide standardized reasoning structures derived from recurring patterns across multiple users, with all personal information and specific context removed. Abstracted thought templates 1243 maintain core logical flow and analytical value while eliminating any identifiable user connections or private information. Cross-domain connectors 1244 facilitate knowledge transfer between different subject areas by maintaining thoughts that establish relationships, analogies, or transformations between distinct knowledge domains, enabling more sophisticated reasoning across traditional domain boundaries.

Multiple users 1245 interact with global generalized cache 1240, both contributing to and benefiting from shared knowledge repository. Each user maintains separate local device cache 1200 and user-specific cloud cache 1230, while accessing common global generalized cache 1240, creating ecosystem where reasoning patterns can be refined and enhanced through collective usage while maintaining clear privacy boundaries.

Data flows within three-tier architecture follow specific patterns designed to balance efficiency, privacy, and knowledge sharing. When new thoughts are generated on mobile device, they are first stored in local device cache 1200, typically beginning in recent interactions cache 1211. Based on thought characteristics and privacy implications, thoughts may remain exclusively in personal section 1210 or, if containing no personal information, may also be stored in generalized section 1220 for offline access. When network connectivity is available, connectivity manager synchronizes appropriate thoughts with user-specific cloud cache 1230, prioritizing thoughts based on value, recency, and bandwidth availability. Personal thoughts with private information are exclusively synchronized to encrypted personal context 1232, while more general thoughts may be stored in extended knowledge repository 1233.

Thought generalizer periodically analyzes patterns across multiple users, identifying common reasoning structures that could benefit broader user base. When candidate patterns are identified, thought generalizer removes all personal information and specific context, creating abstracted versions suitable for global sharing. These generalized thoughts undergo validation for utility, quality, and privacy preservation before being added to global generalized cache 1240 in appropriate categories. Regular synchronization processes ensure most valuable generalized thoughts are available in local device cache 1200 of each user, even during offline operation, while respecting storage limitations of mobile devices.

Through this tiered architecture, system balances competing requirements of mobile environments, enabling efficient local operation with limited storage capacity, comprehensive personal history through cloud extensions, and knowledge sharing across users while maintaining strict privacy boundaries throughout thought lifecycle.

FIG. 13 is a method diagram illustrating the thought generalization process of mobile-optimized multi-stage LLM, in an embodiment. Candidate thoughts are collected from user interactions and filtered for privacy and consent, with explicit verification of opt-in status and removal of identifying metadata before processing continues 1301. Structural patterns across candidate thoughts are identified and clustered based on similar reasoning approaches, employing semantic analysis to recognize common logical structures, inferential patterns, and analytical frameworks regardless of specific content domain 1302. User-specific information and context are identified and removed from candidate thoughts through sophisticated detection algorithms that isolate personal references, specific examples, and contextual details while preserving underlying reasoning structures 1303. Core reasoning patterns are extracted and abstracted into generalized thought templates, transforming specific instances into broadly applicable structures that maintain logical integrity while increasing adaptability across different domains and user contexts 1304. Abstracted thought templates are validated for utility, privacy preservation, and quality through automated evaluation against benchmark scenarios, verification of complete anonymization, and assessment of logical coherence and inferential accuracy 1305. Validated thought templates are indexed and stored in global cache for future retrieval, with comprehensive categorization by domain, reasoning type, and application context to enable efficient discovery and retrieval when similar reasoning requirements are encountered in future prompts 1306.

Figure 14:
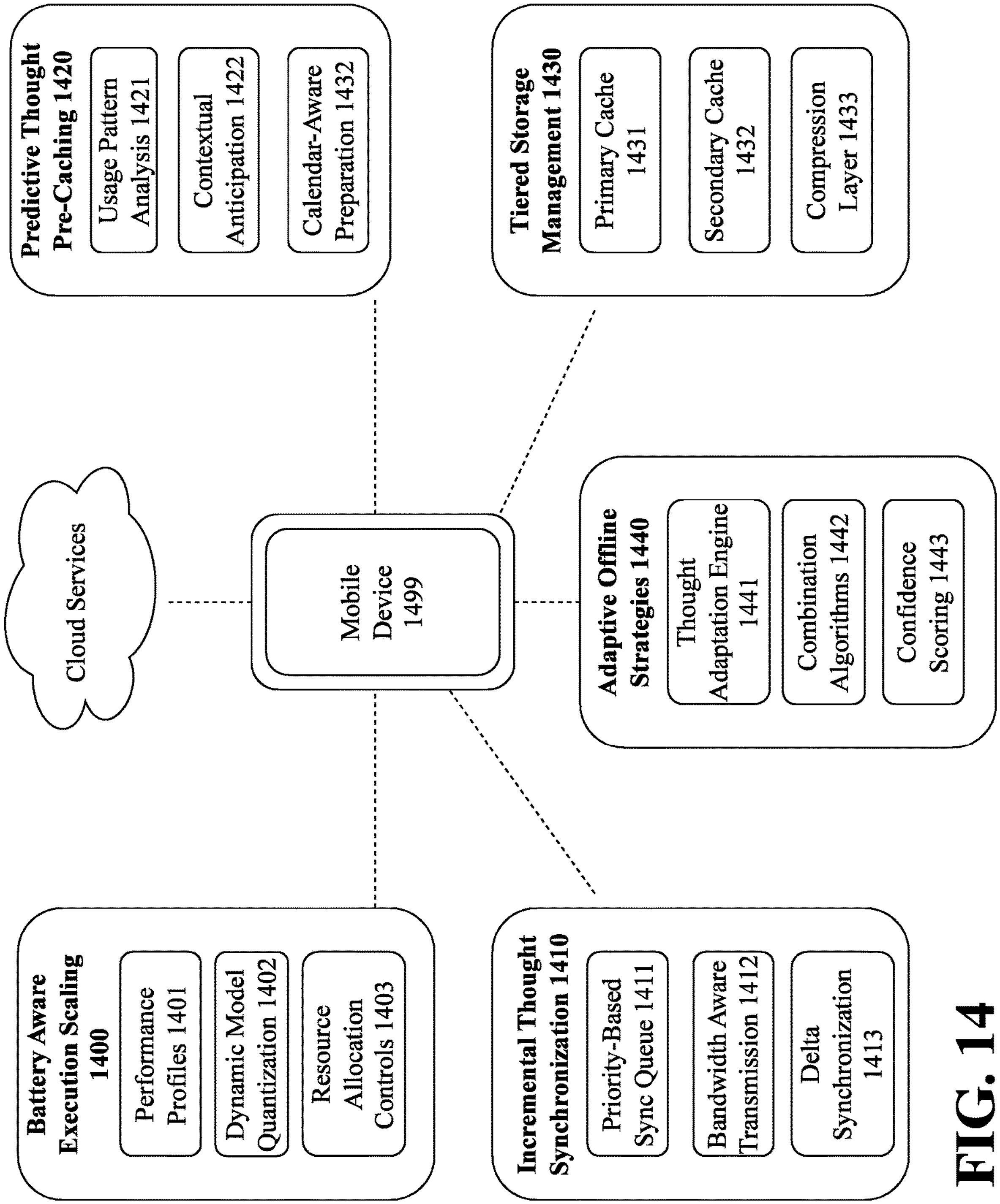
FIG. 14 is a block diagram illustrating exemplary architecture of mobile-specific optimizations.

FIG. 14 is a block diagram illustrating exemplary architecture of mobile-specific optimizations, in an embodiment. System architecture depicts mobile device 1499 with integrated optimization subsystems designed to address unique constraints of mobile computing environments while maintaining language model performance and user experience.

Battery-aware execution scaling 1400 implements dynamic adjustment of language model operation based on device power state. Performance profiles 1401 define multiple operational configurations for language model execution, ranging from full-capability mode when device is charging or at high battery levels to highly optimized, reduced-capability modes for critical battery conditions. Each profile specifies parameter settings including but not limited to inference batch sizes, attention mechanism configurations, and cache utilization thresholds. Dynamic model quantization 1402 adjusts numerical precision of model weights and activations based on current power constraints, implementing techniques such as weight sharing, mixed precision computation, and selective layer quantization to reduce power consumption with minimal impact on response quality. Resource allocation controls 1403 manage distribution of computational resources across system components, prioritizing essential operations during low-power states while deferring secondary functions such as background thought generation or cache optimization.

Incremental thought synchronization 1410 optimizes network usage for thought transfer between device and cloud caches. Priority-based sync queue 1411 maintains ordered list of thoughts awaiting synchronization, with priority determined by factors including thought utility, user activity patterns, and relationship to recent queries. Priority algorithms adjust dynamically based on observed usage patterns and explicit user behavior. Bandwidth-aware transmission 1412 monitors network conditions including connection type, signal strength, and available bandwidth to optimize synchronization timing and volume. During limited connectivity periods, synchronization focuses on highest-priority thoughts while deferring larger transfers to more favorable network conditions. Delta synchronization 1413 reduces data transfer requirements by transmitting only changed portions of thoughts rather than complete thought structures. For frequently accessed thoughts that undergo minor modifications, delta synchronization significantly reduces bandwidth requirements while maintaining thought consistency across local and cloud environments.

Predictive thought pre-caching 1420 anticipates user needs based on behavioral patterns and contextual cues, proactively downloading relevant thoughts from cloud caches to ensure availability during offline periods. Usage pattern analysis 1421 identifies recurring themes, topics, and query types in user interactions, building predictive models of future information needs. These models consider factors such as time-of-day variations, weekly patterns, and domain transitions to anticipate likely query domains. Contextual anticipation 1422 leverages device sensors and system information to identify situational triggers for specific thought requirements. Contextual triggers may include location changes, scheduled events, application usage patterns, or interaction with specific contacts, each associated with particular knowledge domains likely to be relevant in that context. Calendar-aware preparation 1423 integrates with device calendar functionality to identify upcoming events and appointments, pre-caching thoughts relevant to scheduled activities. Prior to business meetings, for example, system might prioritize downloading thoughts related to business topics, meeting participants, or relevant terminology into local cache.

Tiered storage management 1430 organizes cached thoughts across multiple storage layers based on access patterns and device capabilities. Primary cache (hot storage) 1431 utilizes fastest available memory for most frequently accessed thoughts and active session data, typically implemented in RAM with optimized data structures for rapid retrieval. Hot storage contains thoughts currently in use or highly likely to be needed in immediate future based on session context and user activity. Secondary cache (warm storage) 1432 maintains frequently accessed thoughts not currently in active use, typically implemented in persistent storage optimized for read performance. Warm storage serves as intermediate layer between high-speed primary cache and more efficient compressed storage, balancing access speed with expanded capacity. Compression layer 1433 stores less frequently accessed thoughts in highly compressed formats to maximize storage efficiency. Compression strategies vary based on thought characteristics, with different approaches for factual knowledge, reasoning patterns, and contextual information. Compression layer implements progressive compression where thoughts transition to increasingly compressed representations based on access frequency and recency.

Adaptive offline strategies 1440 maintain system functionality during periods without network connectivity by transforming existing cached thoughts to address new prompts. Thought adaptation engine 1441 implements algorithms for modifying cached thoughts to fit current context when exact matches are unavailable. Adaptation techniques include generalizing specific examples, instantiating abstract patterns with available context, and transferring reasoning structures across domains. Combination algorithms 1442 synthesize new thoughts by merging elements from multiple cached thoughts, identifying complementary components that together address requirements not fully covered by any single cached thought. Combination approaches include sequential chaining for process-oriented thoughts, hierarchical integration for conceptual frameworks, and parallel synthesis for multi-aspect problems. Confidence scoring 1443 evaluates reliability of adapted thoughts, providing transparency about potential limitations when operating with transformed knowledge rather than directly applicable cached thoughts. Confidence scores consider factors including similarity between original and current context, degree of transformation applied, and historical success rates of similar adaptations.

Mobile-specific optimizations cooperate through integrated operation coordinated by central optimization controller. When device enters low-battery state, battery-aware execution scaling 1400 activates reduced-power profile, triggering adjustments across other optimization subsystems. Tiered storage management 1430 may increase compression ratios to reduce storage power requirements, while incremental thought synchronization 1410 defers non-essential data transfers. Predictive thought pre-caching 1420 continuously operates in background, adjusting prioritization based on both user behavior patterns and current device state, ensuring essential thoughts remain available even during resource-constrained operation. This integrated approach ensures consistent user experience across varying device conditions while maximizing battery efficiency and maintaining core functionality during connectivity limitations.

Figure 15:
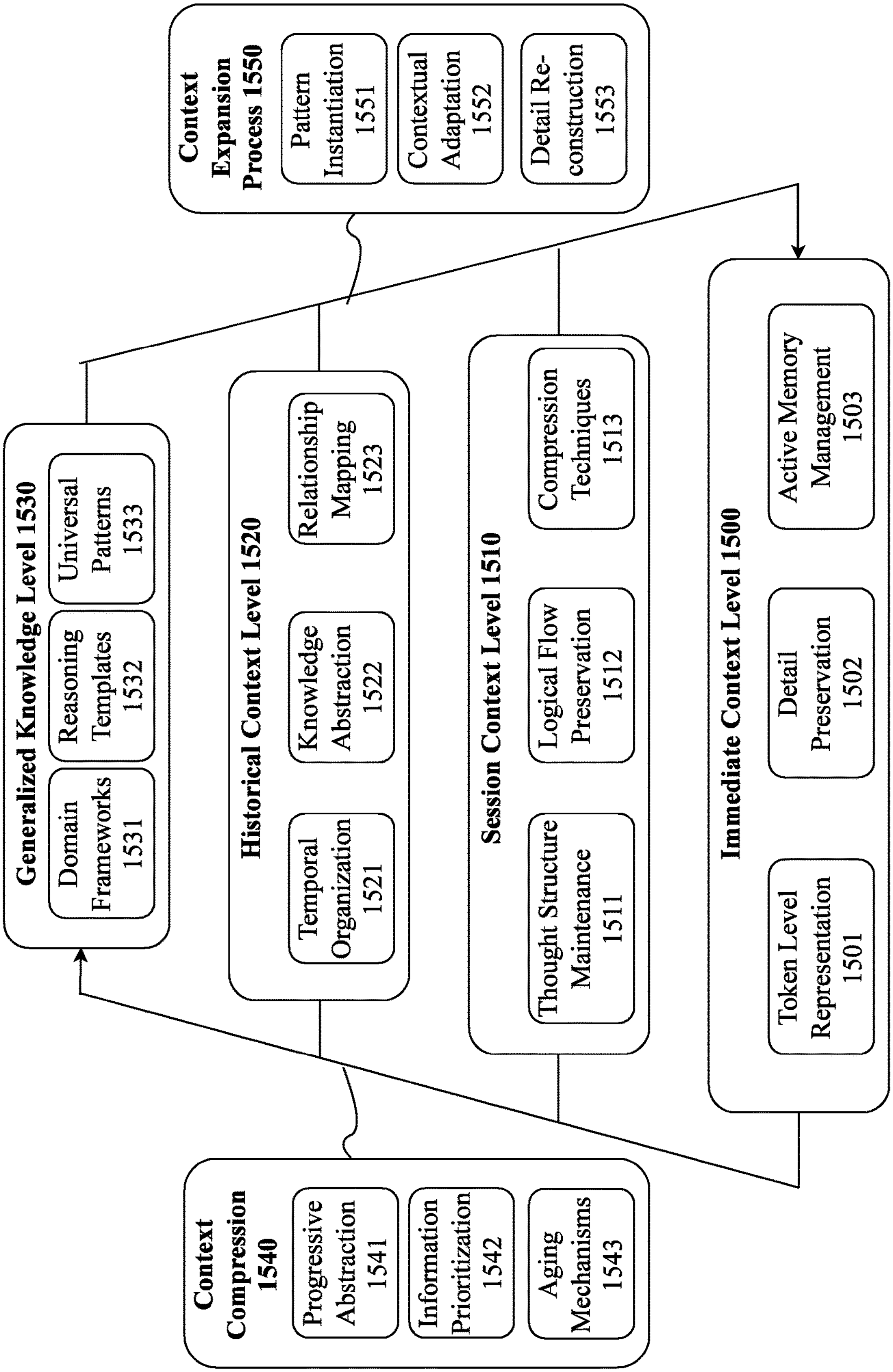
FIG. 15 is a block diagram illustrating exemplary architecture of hierarchical thought management for infinite context.

FIG. 15 is a block diagram illustrating exemplary architecture of hierarchical thought management for infinite context, in an embodiment. Hierarchical thought management architecture implements multi-level approach to context representation, enabling effectively unlimited contextual horizon while maintaining computational efficiency through progressive abstraction.

Immediate context level 1500 represents most recent interactions at highest fidelity, maintaining detailed information necessary for precise contextual understanding. Token-level representation 1501 preserves raw sequence information including exact wording, ordering, and formatting from recent prompts and generated responses. Token-level representation 1501 supports traditional attention-based processing where each token can attend to other tokens with position-sensitive weighting. Detail preservation 1502 maintains fine-grained semantic features, including disambiguation information, reference resolution data, and entity relationships established during recent interactions. Detail preservation 1502 ensures nuanced understanding of immediate context without requiring inference or reconstruction of implicit information. Active memory management 1503 continuously monitors token-level information, identifying patterns and relationships that can be consolidated while maintaining essential context. Active memory management 1503 implements sliding window approach where older information gradually transitions to more abstract representations based on aging thresholds and relevance metrics.

Session context level 1510 represents current interaction session at intermediate level of abstraction, maintaining structural and logical flow while reducing representational overhead. Thought structure maintenance 1511 preserves higher-level thought units rather than individual tokens, where each thought encapsulates complete reasoning step or conceptual unit. Thought-based representation significantly reduces context length compared to token sequences while maintaining reasoning integrity. Logical flow preservation 1512 maintains causal relationships, inferential links, and argumentative structures established throughout current session. By tracking logical dependencies rather than sequential token order, logical flow preservation 1512 enables more efficient context navigation based on reasoning patterns rather than linear history. Compression techniques 1513 reduce representational footprint of session context through methods including reference substitution, where repeated concepts are replaced with pointers to canonical representations; knowledge distillation, where complex explanations are condensed to core principles; and structural simplification, where redundant reasoning paths are consolidated into streamlined representations.

Historical context level 1520 captures cross-session knowledge and interaction patterns through highly abstracted representations focused on essential conceptual structures. Temporal organization 1521 maintains chronological relationships between interaction sessions and knowledge development, tracking concept evolution, preference refinement, and recurring themes across user history. Temporal organization 1521 enables retrieval of historical context based on temporal markers such as "similar to our discussion last week" or "continuing from previous conversation about machine learning." Knowledge abstraction 1522 converts detailed historical interactions into semantic knowledge structures representing core concepts, preferences, and established understanding. Unlike lower context levels that preserve specific wording or exact thought sequences, knowledge abstraction 1522 focuses on persistent information value independent of original presentation format. Relationship mapping 1523 maintains connections between knowledge elements across historical context, including concept hierarchies, causal relationships, preference structures, and domain associations. Relationship mapping 1523 supports graph-based context representation where connections between concepts can be navigated efficiently without requiring linear traversal of historical interactions.

Generalized knowledge level 1530 represents most abstract context tier, maintaining broadly applicable patterns and frameworks independent of specific user interactions.

Domain frameworks 1531 provide structured knowledge representations for specific subject areas, including core concepts, standard terminology, and established relationships within disciplinary boundaries. Domain frameworks 1531 serve as background knowledge activated when relevant to current context, providing foundation for domain-specific reasoning without requiring explicit introduction. Reasoning templates 1532 capture abstract problem-solving patterns, analytical approaches, and logical structures applicable across multiple domains. Reasoning templates 1532 support efficient complex reasoning by providing pre-established thought structures that can be instantiated with specific context from current interaction. Universal patterns 1533 represent highest level of abstraction, capturing fundamental cognitive frameworks such as causal reasoning, analogical thinking, and classification structures that transcend specific knowledge domains. Universal patterns 1533 provide base-level context that shapes interpretation and reasoning across all interactions.

Context compression process 1540 manages transition of information between abstraction levels as context ages or becomes less immediately relevant. Progressive abstraction 1541 converts detailed representations to increasingly compressed forms through staged transformations. Information begins as token-level representation in immediate context, transitions to thought-based representation in session context, evolves into knowledge structures in historical context, and finally may contribute to refinement of generalized patterns at highest abstraction level. Information prioritization 1542 determines which elements maintain higher fidelity during compression based on factors including information uniqueness, structural importance, reference frequency, and explicit user indicators of significance. Information prioritization 1542 ensures that critical contextual elements receive preservation priority during compression, while redundant or peripheral information undergoes more aggressive abstraction. Aging mechanisms 1543 determine timing of transitions between abstraction levels based on combination of temporal factors and usage patterns. Aging mechanisms 1543 implement both time-based transitions where context gradually moves through abstraction levels based on chronological age, and activity-based transitions where frequently referenced information maintains lower abstraction level despite chronological age.

Context expansion process 1550 enables retrieval and utilization of compressed context when needed for current reasoning tasks. Pattern instantiation 1551 converts abstract patterns and templates into specific implementations relevant to current context. When reasoning requires historical knowledge stored in compressed form, pattern instantiation 1551 reconstructs specific instances from generalized representations based on current contextual cues. Contextual adaptation 1552 adjusts retrieved knowledge to current interaction requirements, accounting for changes in terminology, perspective, or focus between original context and current application. Contextual adaptation 1552 ensures that compressed information remains useful despite changes in conversational direction or conceptual framing. Detail reconstruction 1553 regenerates specific examples, explanations, or illustrations from compressed knowledge representations when detailed information is required. Detail reconstruction 1553 may leverage generative capabilities to recreate specific manifestations of compressed concepts when precise details were not fully preserved during compression.

Through this hierarchical approach, system achieves effectively unlimited context while maintaining computational efficiency. Rather than extending traditional token-based context windows, which scale linearly with context length, hierarchical representation distributes context across abstraction levels with appropriate compression at each level. This approach preserves immediate detail where most critical while maintaining essential knowledge and reasoning patterns from extended history without proportional computational burden. Context compression and expansion processes ensure fluid movement between abstraction levels as needed for specific reasoning tasks, enabling system to leverage entire interaction history while focusing computational resources on immediately relevant context.

Figure 16:
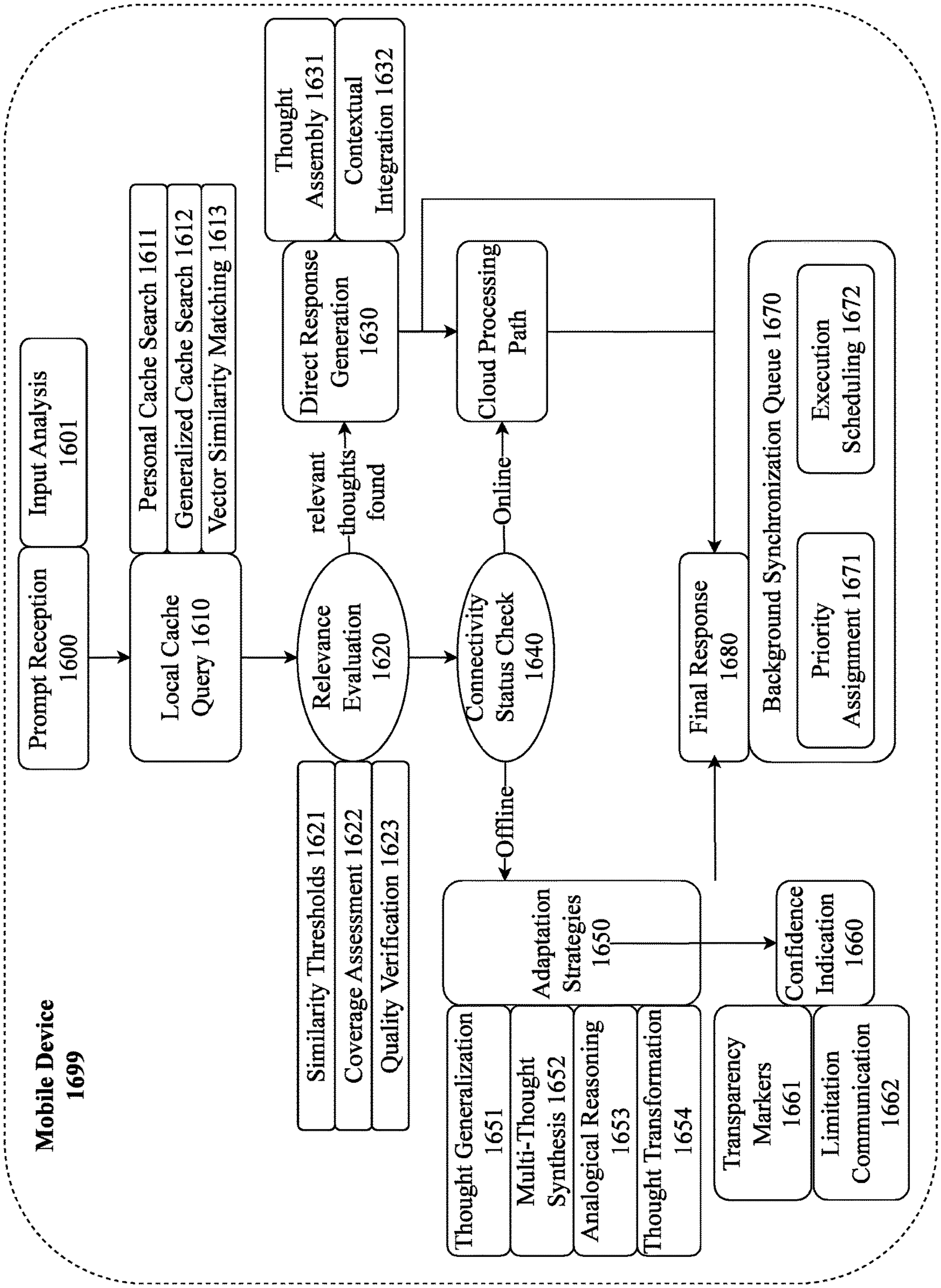
FIG. 16 is a block diagram illustrating exemplary architecture of offline functionality process flow.

FIG. 16 is a block diagram illustrating exemplary architecture of offline functionality process flow, in an embodiment. FIG. 16 depicts offline processing subsystems within mobile device 1699 enabling continued natural language processing functionality during periods without network connectivity.

Prompt reception 1600 serves as entry point for user input processing during offline operation. Input analysis 1601 performs initial processing of user prompt to identify key components, including primary subjects, requested actions, constraints, and contextual references. Input analysis 1601 operates using lightweight parsing techniques optimized for mobile execution, extracting structural elements and semantic features without requiring full language model inference. Intent recognition 1602 identifies purpose and objective behind user prompt, categorizing request into functional types such as information retrieval, analysis request, creative generation, or conversational exchange. Intent recognition 1602 utilizes compact classification models specifically optimized for mobile execution, enabling accurate intent identification with minimal computational overhead.

Local cache query 1610 searches device-resident thought cache for relevant content to address current prompt. Personal cache search 1611 examines user-specific thoughts stored on device, including previous interactions, personalized knowledge, and user-specific adaptations. Personal cache search 1611 prioritizes thoughts with established relevance to user's specific interests, terminology preferences, and interaction patterns. Generalized cache search 1612 examines non-personalized thoughts available in device cache, including common reasoning patterns, general knowledge structures, and domain-specific frameworks. Generalized cache search 1612 supplements personal cache results with broadly applicable thought patterns, particularly valuable when user explores new topics without established history. Vector similarity matching 1613 computes relevance scores between current prompt and cached thoughts using efficient vector comparison techniques optimized for mobile processors. Vector similarity matching 1613 implements dimensional reduction and quantization approaches that balance matching accuracy with computational efficiency for mobile execution.

Relevance evaluation 1620 assesses retrieved thoughts to determine applicability to current prompt. Similarity thresholds 1621 apply configurable criteria to determine if retrieved thoughts are sufficiently relevant for direct use, require adaptation, or are inadequate for current prompt. Similarity thresholds 1621 may implement multiple decision boundaries, using higher thresholds for direct application and lower thresholds for consideration in adaptation processes. Coverage assessment 1622 evaluates extent to which retrieved thoughts address all aspects of current prompt, identifying any gaps or unaddressed components that require additional processing. Coverage assessment 1622 maps thought content to prompt components, tracking fulfilled requirements and remaining gaps. Quality verification 1623 confirms retrieved thoughts meet acceptable standards for accuracy, coherence, and appropriateness before application to current prompt. Quality verification 1623 checks thought metadata including confidence scores, validation metrics, and usage statistics to ensure only reliable thoughts are utilized.

Direct response generation 1630 processes highly relevant cached thoughts to produce immediate responses. Thought assembly 1631 organizes selected thoughts into coherent sequence aligned with current prompt requirements. For multi-part queries, thought assembly 1631 arranges thoughts to progressively address each component while maintaining logical flow and conceptual consistency. Contextual integration 1632 combines cached thoughts with current prompt context to create cohesive response. Contextual integration 1632 resolves references, adapts terminology, and aligns perspective to create seamless integration between existing thought content and specific requirements of current interaction.

Connectivity status check 1640 verifies current network availability to determine appropriate processing paths. During offline operation, connectivity status check 1640 routes processing to adaptation strategies rather than attempting cloud-based processing. Connectivity status check 1640 may implement periodic background verification to detect when connectivity is restored, enabling transition to online processing for subsequent interactions.

Adaptation strategies 1650 modify existing cached thoughts to address current prompt when exact matches are unavailable during offline operation. Thought generalization 1651 broadens specific cached thoughts to increased applicability. When cached thoughts contain specific examples or narrow applications of relevant concepts, thought generalization 1651 extracts underlying principles and patterns that can be applied more broadly to current context. Multi-thought synthesis 1652 combines elements from multiple partially relevant thoughts to construct more complete response. Multi-thought synthesis 1652 identifies complementary components across cached thoughts, resolving conflicts and establishing connections to create cohesive composite addressing current prompt requirements. Analogical reasoning 1653 applies thought patterns from one domain to structurally similar situations in different domains. Analogical reasoning 1653 maps relational structures between source domain (where cached thought originated) and target domain (relevant to current prompt), enabling knowledge transfer across conceptual boundaries during offline operation. Thought transformation 1654 modifies existing thoughts through controlled parameter adjustments to fit current context. Thought transformation 1654 applies techniques including perspective shifting, terminology adaptation, and constraint adjustment to align cached thoughts with specific requirements of current prompt.

Confidence indication 1660 communicates system certainty levels when operating with adapted thoughts rather than directly applicable matches. Transparency markers 1661 provide visual or textual indicators within response showing which portions derive from direct cache matches versus adaptations. Transparency markers 1661 may implement graduated indicators reflecting different confidence levels or adaptation approaches. Limitation communication 1662 explicitly notes constraints of offline operation when appropriate, particularly for queries that would benefit from real-time information or cloud-based processing. Limitation communication 1662 sets appropriate expectations while suggesting alternative approaches when full response quality cannot be achieved through offline processing alone.

Background synchronization queue 1670 maintains record of interactions for later synchronization when connectivity resumes. Priority assignment 1671 ranks queued interactions based on factors including user engagement level, novelty of domain, potential knowledge value, and adaptation confidence. Priority assignment 1671 ensures most valuable interactions receive synchronization priority when limited connectivity becomes available. Execution scheduling 1672 determines timing and sequence for processing queued interactions once connectivity is restored. Execution scheduling 1672 balances immediate synchronization needs with battery and bandwidth optimization, potentially deferring intensive processing until device is charging or connected to unmetered network.

Final response 1680 represents system output delivered to user through appropriate mobile interface. Final response incorporates content derived from direct cache matches or adaptation strategies, formatted according to user preferences and device constraints. Throughout offline processing flow, system maintains responsive user experience despite connectivity limitations, leveraging cached thoughts through combination of direct matching and sophisticated adaptation strategies. When connectivity resumes, background synchronization processes update cloud caches with offline interactions while retrieving updated thought content to enhance future offline capability.

Figure 17:
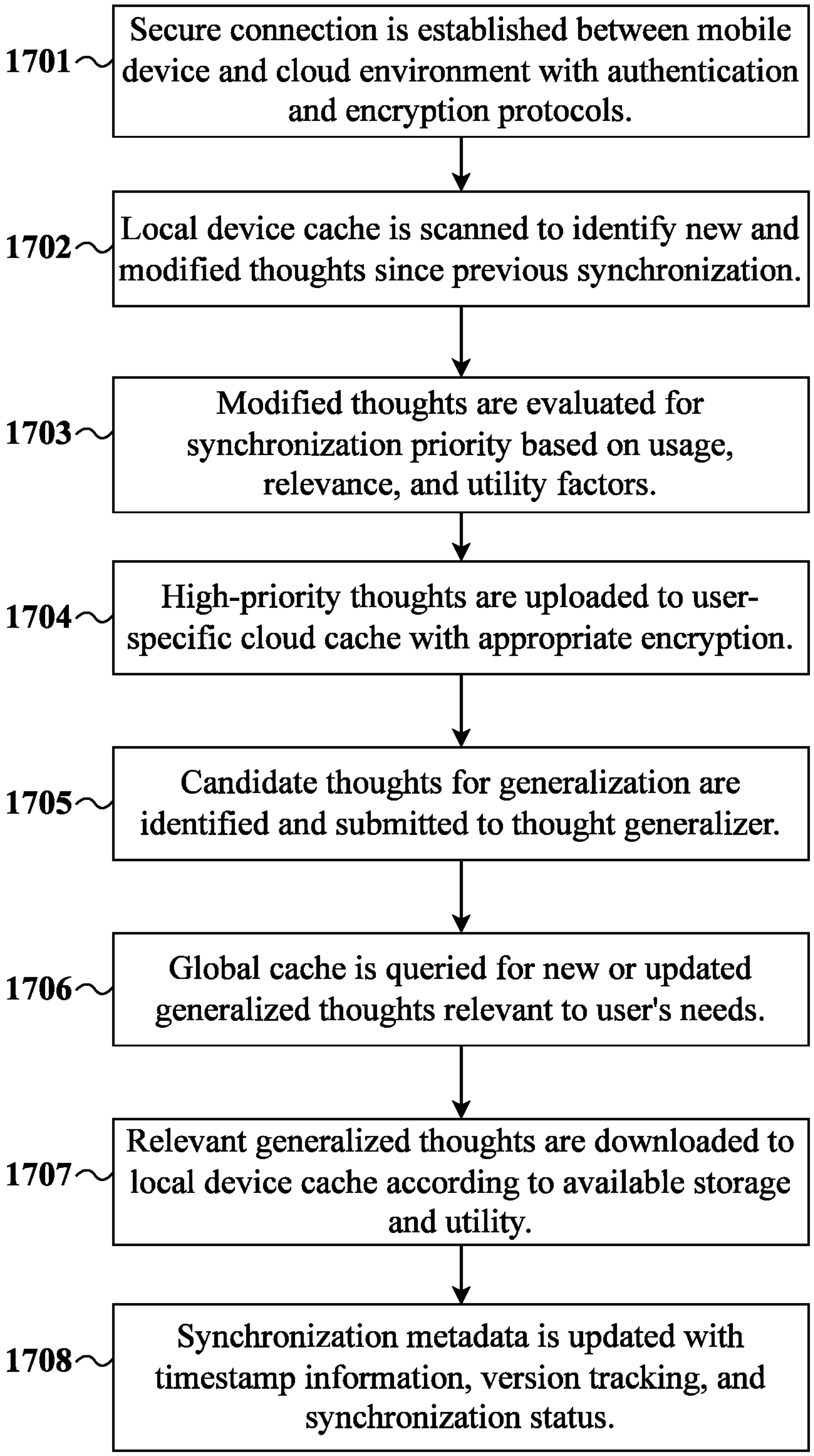
FIG. 17 is a method diagram illustrating the synchronization process between local device cache and cloud environments in mobile-optimized multi-stage LLM.

FIG. 17 is a method diagram illustrating the synchronization process between local device cache and cloud environments in mobile-optimized multi-stage LLM, in an embodiment. A secure connection is established between mobile device and cloud environment with authentication and encryption protocols to ensure data protection during transmission 1701. Local device cache is scanned to identify new and modified thoughts since previous synchronization event, using timestamp comparison and modification flags to determine which thoughts require synchronization 1702. Modified thoughts are evaluated for synchronization priority based on multiple factors including usage frequency, relevance to recent interactions, and estimated future utility to ensure most valuable thoughts are synchronized first during limited connectivity periods 1703. High-priority thoughts are uploaded to user-specific cloud cache with appropriate encryption, ensuring personal thoughts remain protected through user-specific encryption keys throughout transmission and storage 1704. Candidate thoughts for generalization are identified and submitted to thought generalizer for potential inclusion in global cache, applying preliminary privacy filters to prevent submission of thoughts containing personal information 1705. Global cache is queried for new or updated generalized thoughts relevant to user's interaction patterns and domains of interest, with relevance determination based on user history and predicted future needs 1706. Relevant generalized thoughts are downloaded to local device cache according to available storage capacity, device-specific constraints, and predicted utility, potentially replacing older or less relevant cached thoughts 1707. Synchronization metadata is updated with timestamp information, version tracking, and synchronization status to facilitate efficient future synchronization events and prevent redundant data transfers 1708.

In a non-limiting use case example of mobile-optimized multi-stage LLM, a professional frequently travels to remote locations with limited connectivity while needing consistent access to knowledge-intensive assistance. During a period with strong network connectivity, the professional queries the system about recent advancements in renewable energy technology. The prompt is processed by the mobile-optimized LLM, which generates detailed thoughts about solar efficiency improvements, grid storage innovations, and emerging wind turbine designs. These thoughts, along with the original prompt, are routed through the smaller language model to produce a comprehensive response that balances technical depth with practical applications.

The system automatically stores these renewable energy thoughts across its three-tier architecture. In the local device cache, the thoughts are organized with related concepts from previous interactions about environmental topics. In the user-specific cloud cache, the thoughts are encrypted and stored with the user's complete interaction history, maintaining secure access to personalized knowledge. Simultaneously, the thought generalizer analyzes these renewable energy concepts, removes user-specific references and contextual details, and abstracts the core reasoning patterns about technology evaluation and implementation considerations. These abstracted patterns are validated for both utility and privacy preservation before being added to the global generalized cache where they become available to other users seeking similar analysis frameworks.

The following day, the professional travels to a remote installation site with no network connectivity. Despite being offline, when they query about comparative cost analysis of different renewable options for the specific project, the system remains fully functional. The local router analyzes the prompt and queries the local cache, identifying previously cached thoughts about renewable technologies that relate to the current query but do not specifically address economic comparisons. The system employs adaptation strategies to transform these cached thoughts, generalizing specific technology assessments into broader evaluation frameworks, and then applying them to the economic domain through analogical reasoning. Multiple partially relevant thoughts about technology assessment criteria, efficiency metrics, and implementation considerations are synthesized into a coherent analysis framework specifically addressing cost comparison parameters.

Throughout this process, the battery optimizer monitors the device's power state, noting that battery level has dropped to 45%. In response, the system activates mid-range power conservation settings, implementing dynamic model quantization and adjusting resource allocation to prioritize prompt processing while deferring background operations. The confidence indication subsystem subtly marks portions of the response that derive from adapted rather than directly applicable thoughts, maintaining transparency while delivering valuable guidance.

When network connectivity is later restored, the connectivity manager initiates background synchronization of the offline interactions. The priority assignment subsystem identifies the cost analysis interaction as high-value based on the extensive thought adaptation performed and user engagement metrics, placing it at the top of the synchronization queue. The thought generalizer processes this interaction, recognizing that the cost comparison framework synthesized offline represents a valuable cross-domain application of technology assessment principles. After removing project-specific details, this generalized framework is validated and added to the global cache.

Over time, as the professional continues using the system across various locations with varying connectivity, the hierarchical thought management subsystem progressively compresses older interactions. Detailed token-level information from months-old renewable energy discussions transitions to the historical context level, where specific examples and explanations are condensed into core concept relationships and domain knowledge. The system maintains awareness of the professional's expertise and interests through this compressed context without requiring extensive storage resources, ensuring relevant information remains accessible even during extended offline periods.

Through this continuous operation across changing environments and connectivity states, the system demonstrates effective knowledge retention, offline adaptation capabilities, and efficient resource management while contributing to a broader collective knowledge base that benefits all users.

One skilled in the art would recognize numerous applications for mobile-optimized multi-stage LLM with generalized thought caching across diverse domains and use scenarios. Medical professionals could utilize this system during field operations in areas with limited connectivity, accessing diagnostic frameworks and treatment protocols even when disconnected from hospital networks. Field engineers could employ the system at remote installation sites to troubleshoot equipment issues using cached technical knowledge without requiring constant cloud access. Researchers conducting fieldwork in remote locations could maintain access to analytical frameworks and methodological approaches despite connectivity limitations. Financial advisors traveling between client locations could provide consistent analysis and recommendations regardless of network availability. Emergency response personnel could access critical decision-making frameworks during disaster scenarios when communication infrastructure is compromised. Legal professionals could maintain access to case analysis patterns and regulatory frameworks during courtroom proceedings where connectivity may be restricted. Educators in resource-constrained environments could deliver high-quality instructional content despite internet limitations. These applications demonstrate how the system's ability to maintain sophisticated reasoning capabilities in resource-constrained mobile environments, while efficiently sharing knowledge across users, addresses practical needs across numerous professional domains where consistent access to advanced language model capabilities provides significant value regardless of connectivity status or device limitations.

Mobile-Optimized Multi-Stage LLM with Autonomous Reasoning

Figure 18:
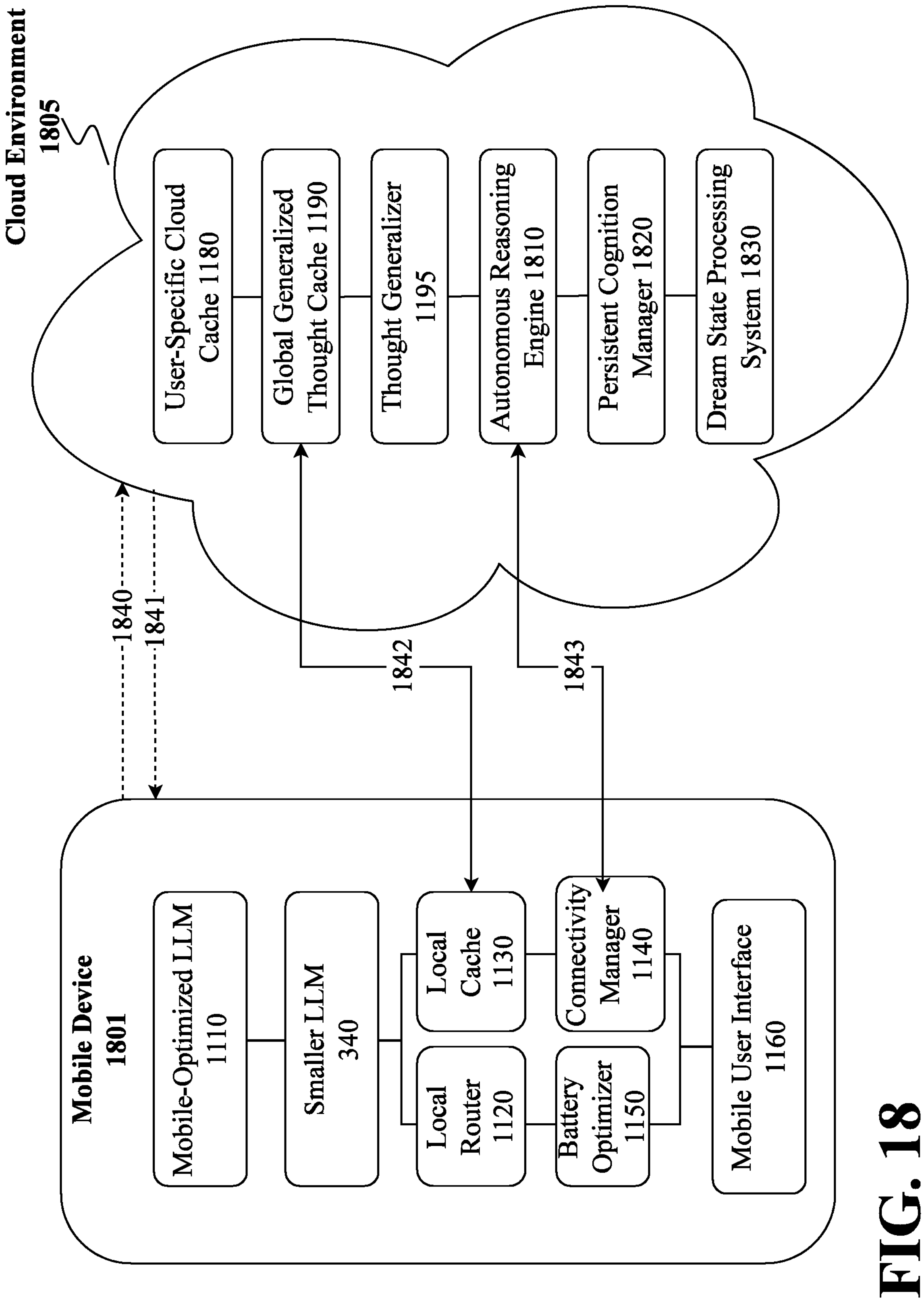
FIG. 18 is a block diagram illustrating exemplary architecture of mobile-optimized multi-stage LLM with autonomous reasoning.

FIG. 18 is a block diagram illustrating exemplary architecture of mobile-optimized multi-stage LLM with autonomous reasoning, in an embodiment. System architecture 1800 builds upon the foundation of mobile-optimized multi-stage LLM described in previous figures while introducing new components that enable autonomous reasoning capabilities during periods of user inactivity.

Mobile device portion 1801 contains core components from the previously described mobile-optimized system. Mobile-optimized LLM 1110 processes user prompts to generate thoughts representing intermediate reasoning steps. Local router 1120 manages the flow of information between system components, determining optimal processing paths based on available resources and cached thoughts. Local device cache 1130 stores both personal and generalized thoughts directly on mobile device, enabling offline operation and rapid access to frequently used reasoning patterns. Battery optimizer 1150 monitors device power state and adjusts processing behavior to maximize efficiency based on current power conditions. Mobile user interface 1160 provides interaction mechanisms for user prompt input and response display, adapting presentation based on device characteristics and user preferences.

Cloud environment 1805 extends the original thought caching architecture with new autonomous reasoning capabilities. User-specific cloud cache 1180 securely stores encrypted personal thoughts with user-specific access controls, maintaining comprehensive interaction history beyond the storage limits of mobile devices. Global generalized thought cache 1190 contains anonymized reasoning patterns shared across users, organized by domain and thought type without personal information. Thought generalizer 1195 transforms suitable user-generated thoughts into anonymized patterns for potential inclusion in global cache after removing all personally identifiable information.

Autonomous reasoning engine 1810 represents the central new component that enables continued thought processing during periods when user is not actively engaged with system. Unlike original system which primarily generated thoughts in response to explicit user prompts, autonomous reasoning engine 1810 can initiate self-directed reasoning based on existing knowledge and identified patterns in user interactions. Autonomous reasoning engine 1810 implements contextually appropriate reasoning strategies that align with user interests and thinking preferences while maintaining operation within computational resource constraints of cloud environment.

Persistent cognition manager 1820 maintains cognitive continuity between active user sessions, preserving reasoning context and progress through comprehensive state representation. This subsystem ensures that reasoning can resume seamlessly when user engagement restarts, regardless of duration of inactivity or which device is used. Persistent cognition manager 1820 coordinates with both user-specific cloud cache 1180 and global generalized thought cache 1190 to maintain access to relevant thought patterns during autonomous operation.

Dream-state processing system 1830 activates during periods of user inactivity, implementing cognitive processes inspired by human sleep-stage memory processing. Dream-state processing system 1830 performs three primary functions: memory consolidation, thought cache optimization, and novel thought generation. During memory consolidation, system transfers information from short-term to long-term storage representations, identifying essential patterns while removing superfluous details. Thought cache optimization involves reorganizing cached thoughts to improve retrieval efficiency and reduce computational costs during active use. Novel thought generation connects concepts from different domains to create new insights potentially valuable to user, employing combinatorial processes that identify meaningful relationships between previously unconnected ideas.

Device-to-cloud communication 1840 facilitates data transfer from mobile device 1801 to cloud environment 1805, implementing secure protocols for transmitting prompts, thoughts, and device state information. Device-to-cloud communication 1840 adapts transmission timing and volume based on network conditions and battery state, prioritizing essential data during limited connectivity. Cloud-to-device communication 1841 enables transfer of information from cloud environment 1805 to mobile device 1801, including responses, retrieved thoughts, and system-generated insights. Cloud-to-device communication 1841 implements compression and prioritization strategies to optimize bandwidth usage while ensuring timely delivery of critical information.

Thought synchronization 1842 maintains consistency between local device cache 1130, user-specific cloud cache 1180, and global generalized thought cache 1190. Thought synchronization 1842 implements bidirectional updates with conflict resolution capabilities, ensuring that insights generated during autonomous operation become available on mobile device when appropriate. State transfer protocol 1843 enables seamless transition of cognitive state between mobile device 1801 and cloud environment 1805, as well as between different user devices. State transfer protocol 1843 captures and transmits active reasoning context, current thought chains, and exploration directions to maintain continuity regardless of where processing occurs.

In operation, when user submits prompt through mobile user interface 1160, system initially processes request through standard pathway described in parent invention. Mobile-optimized LLM 1110 generates thoughts which, combined with original prompt, are processed through smaller language model to produce response. These thoughts are cached in local device cache 1130 and, when connectivity permits, synchronized with user-specific cloud cache 1180 through thought synchronization 1842. When mobile device 1801 becomes inactive, as determined by absence of user interaction or device entering sleep state, persistent cognition manager 1820 captures current reasoning state and transfers it to cloud environment 1805 through state transfer protocol 1843. Autonomous reasoning engine 1810 then continues thought processing without consuming mobile device resources, potentially exploring related concepts, developing additional insights, or resolving incomplete reasoning chains from previous interactions.

During extended periods of inactivity, dream-state processing system 1830 activates to perform background cognitive functions. Memory consolidation processes compress and organize accumulated thoughts, abstracting essential patterns while maintaining core knowledge. Cache optimization reorganizes thought structures to improve future retrieval efficiency. Novel thought generation explores potential connections between concepts from different interactions or knowledge domains, creating new insights that might benefit a user.

When user re-engages with system, whether on same or different device, persistent cognition manager 1820 retrieves current cognitive state and seamlessly transitions processing back to mobile context. Any valuable insights generated during autonomous operation are presented to user when appropriate, based on relevance to current context and user interests. Throughout this process, system maintains strict separation between private user thoughts and generalized knowledge, ensuring personal information remains protected while enabling efficient thought reuse and sharing of generalized reasoning patterns.

Through this architecture, system achieves transformation from responsive tool to continuous thinking partner while maintaining mobile optimization, offline capabilities, and privacy protections established in parent invention. Autonomous reasoning engine 1810 and supporting components enable system to develop insights during periods of user disengagement, returning with valuable new perspectives when interaction resumes.

While FIG. 18 illustrates autonomous reasoning engine 1810 and dream-state processing system 1830 as primarily operating within cloud environment 1805, in various embodiments these components may be partially or completely integrated into mobile device 1801 or other user devices with sufficient computational capabilities. This flexibility enables scaled implementations where autonomous reasoning functions operate directly on user devices during favorable conditions, such as when devices are charging, connected to external power, or in idle states with available processing capacity. Such device-integrated implementations leverage the offline capabilities already established in the parent invention, enabling continuous cognitive operation without network connectivity. In these embodiments, state transfer protocol 1843 facilitates seamless transitions between on-device and cloud-based reasoning modes based on available resources, allowing the system to dynamically adjust processing location to optimize for battery life, computational efficiency, and data privacy while maintaining cognitive continuity. This adaptive architecture ensures that autonomous reasoning capabilities remain available across varied deployment scenarios and usage conditions, from fully cloud-dependent implementations to predominantly on-device operation with periodic cloud synchronization.

A non-limiting use case example illustrating the functionality of the system disclosed in FIG. 18 will feature Sofia, a professional writer working on a historical novel set during the Ming Dynasty. She uses the cognitive dyad system across her smartphone, tablet, and laptop throughout her research and writing process.

During an active research session on her smartphone, Sofia queries the system about agricultural practices in 15th century China. The mobile-optimized LLM 1110 generates thoughts about rice cultivation techniques, irrigation systems, and seasonal farming calendars, which the smaller LLM 340 then processes into a comprehensive response. These thoughts are cached in her local device cache 1130 for immediate access and battery-efficient retrieval.

After putting her phone down to have dinner, the system transitions to autonomous operation. The autonomous reasoning engine 1810 in the cloud environment continues exploring connected topics without consuming Sofia's device resources. It examines the relationship between agricultural practices and social hierarchies, identifies connections to pottery designs that depicted farming scenes, and discovers scholarly debates about irrigation technology transfer between regions.

When Sofia later picks up her tablet to continue working, thought synchronization 1842 ensures her latest research is available, and the system presents relevant insights generated during her break. "While you were away, I explored the connection between irrigation systems and local governance structures. Would you like to see how district magistrates regulated water rights, which might provide conflict background for your characters?"

Throughout this process, battery optimizer 1150 ensures efficient resource usage on Sofia's mobile devices, while the state transfer protocol 1843 maintains her cognitive context across devices. The thought generalizer 1195 identifies patterns in Sofia's historical research that could be useful to other users researching ancient agricultural systems, stripping out her specific novel context before storing anonymized reasoning frameworks in the global generalized thought cache 1190.

This continuous reasoning partnership significantly accelerates Sofia's research process, generating connections and insights even when she's not actively engaging with the system, while maintaining strict privacy boundaries between her creative work and the generalized knowledge shared with other users.

Figure 19:
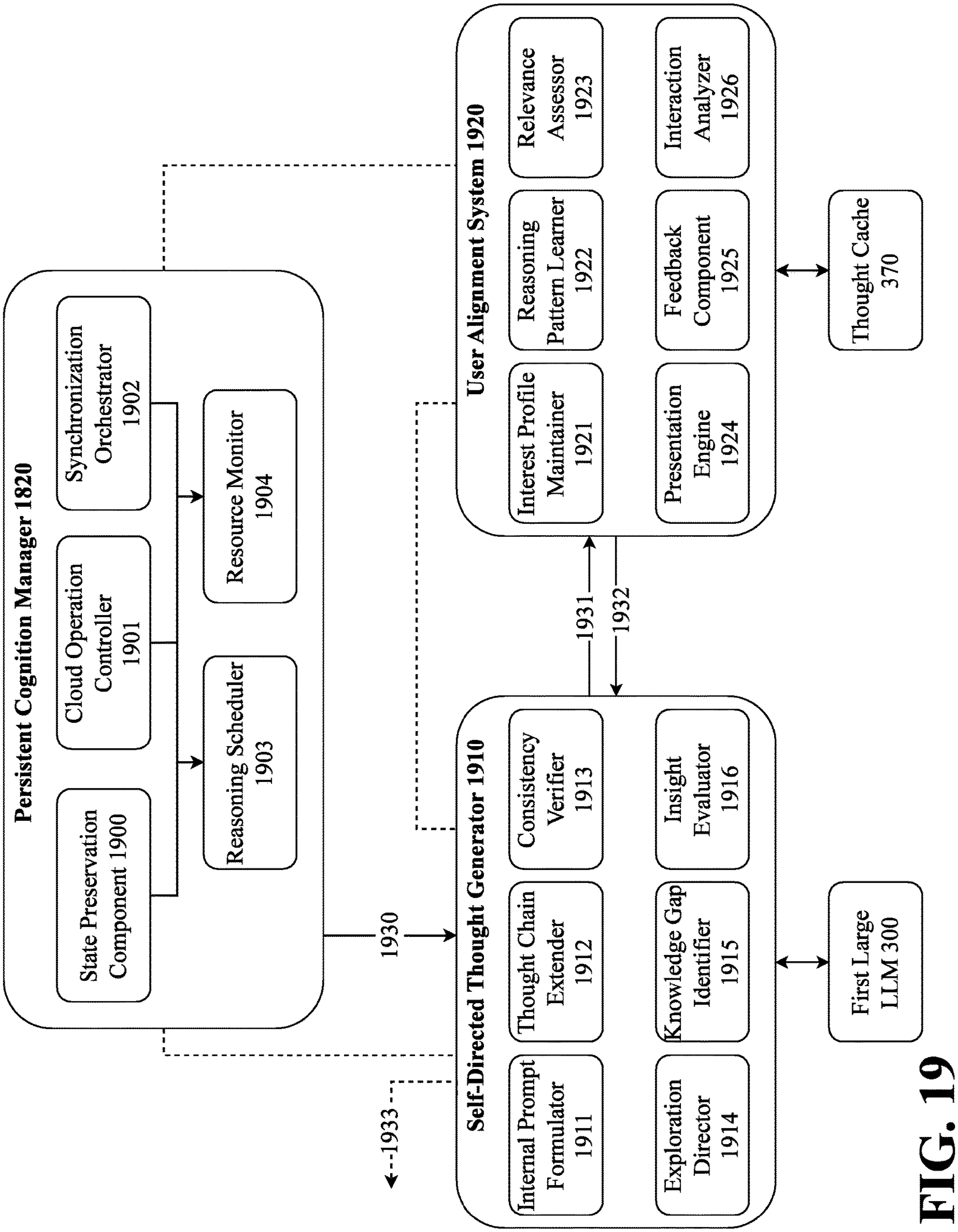
FIG. 19 is a block diagram illustrating exemplary architecture of autonomous reasoning system.

FIG. 19 is a block diagram illustrating exemplary architecture of autonomous reasoning system, in an embodiment. This figure expands upon autonomous reasoning engine 1810 introduced in FIG. 18, detailing its internal components and operational relationships that enable continuous thought processing during periods of user inactivity.

Persistent cognition manager 1820 serves as central coordination subsystem for autonomous reasoning operations, maintaining continuous cognitive function when user is not actively engaged. State preservation component 1900 captures and maintains comprehensive representation of current reasoning context, including active thought chains, explored concepts, and pending inquiries. State preservation component 1900 implements efficient encoding methods that represent cognitive state with minimal storage requirements while preserving essential contextual elements. Cloud operation controller 1901 manages execution of reasoning processes within cloud environment, implementing resource-efficient processing models that balance computational costs with reasoning continuity. Cloud operation controller 1901 adjusts processing depth and breadth based on available resources, prioritizing high-value reasoning paths when constraints require selective execution. Synchronization orchestrator 1902 coordinates movement of thoughts and cognitive state between cloud environment and mobile devices, ensuring consistency across operating environments. Synchronization orchestrator 1902 implements intelligent synchronization policies that determine when to transfer information based on network conditions, device status, and information relevance. Reasoning scheduler 1903 plans and sequences autonomous reasoning tasks, allocating computational resources based on priority and estimated value. Reasoning scheduler 1903 organizes processing into stages that optimize resource utilization while maintaining logical progression of thought development. Resource allocation monitor 1904 tracks computational resource usage throughout autonomous operation, implementing adaptive policies that adjust processing intensity based on current conditions and constraints. Resource allocation monitor 1904 ensures efficient operation within cloud computing cost parameters while maximizing productive reasoning output.

Self-directed thought generator 1910 represents core thought creation subsystem that enables autonomous reasoning without explicit user prompts. Internal prompt formulator 1911 generates questions and exploration directions based on analysis of existing knowledge and user history. Internal prompt formulator 1911 identifies promising inquiry paths that might yield valuable insights, creating structured prompts that direct subsequent reasoning. Thought chain extender 1912 continues reasoning along previously established paths, developing partial insights from earlier interactions into more comprehensive understanding. Thought chain extender 1912 resumes incomplete thought processes that were interrupted during active sessions, bringing them to logical conclusions when possible. Consistency verifier 1913 evaluates newly generated thoughts against existing knowledge base, identifying and resolving potential contradictions or inconsistencies. Consistency verifier 1913 ensures coherent reasoning across autonomous operation, maintaining logical integrity between independently generated thought chains. Exploration director 1914 implements curiosity mechanisms that guide autonomous reasoning toward potentially valuable yet unexplored territory. Exploration director 1914 balances exploitation of established knowledge with exploration of novel connections, preventing reasoning from becoming trapped in familiar patterns. Knowledge gap identifier 1915 analyzes accumulated knowledge to detect incompleteness, ambiguity, or missing logical connections. Knowledge gap identifier 1915 prioritizes gaps based on relevance to user interests and potential value of resolution, directing autonomous reasoning toward areas where additional insight would provide greatest benefit. Insight evaluator 1916 assesses potential value of generated thoughts, determining which autonomous reasoning outputs warrant user attention. Insight evaluator 1916 applies quality metrics including novelty, coherence, practical applicability, and alignment with user interests to identify high-value insights.

User alignment system 1920 ensures autonomous reasoning remains relevant to user needs and preferences despite operating independently of direct user guidance. Interest profile maintainer 1921 builds and continuously updates model of user interests based on interaction patterns, explicit queries, and engagement signals. Interest profile maintainer 1921 identifies both persistent interests and emerging focus areas, enabling prediction of which topics will have highest relevance to user. Reasoning pattern learner 1922 identifies and adapts to user's preferred thinking approaches, analytical frameworks, and cognitive styles based on observed interactions. Reasoning pattern learner 1922 enables autonomous reasoning to generate thoughts that align with user's natural thinking processes, improving relevance and acceptability of generated insights. Relevance assessor 1923 evaluates autonomous thoughts against current understanding of user interests and needs, generating priority scores for potential presentation. Relevance assessor 1923 considers both explicit interest signals and implicit patterns to determine which thoughts are most likely to provide value to specific user. Presentation decision engine 1924 determines when and how to present autonomously generated insights to user based on relevance scores, user context, and interaction history. Presentation decision engine 1924 avoids overwhelming user with excessive information while ensuring valuable insights reach user at appropriate times. Feedback integration component 1925 incorporates user responses to previously presented insights into future autonomous reasoning processes. Feedback integration component 1925 implements learning mechanisms that adjust thought generation based on which previous insights proved valuable to user, creating continuous improvement cycle. Historical interaction analyzer 1926 examines patterns across extended user history to identify recurring themes, evolving interests, and potential needs not explicitly expressed in recent interactions. Historical interaction analyzer 1926 provides temporal context that helps distinguish between persistent interests and temporary focus areas.

Thought generation triggers 1930 represent signaling pathways between persistent cognition manager 1820 and self-directed thought generator 1910, initiating autonomous reasoning processes based on various conditions. These triggers include scheduled reasoning sessions, detection of knowledge gaps, opportunities for thought chain completion, and identification of potential novel connections. Evaluation pathways 1931 connect self-directed thought generator 1910 with user alignment system 1920, enabling assessment of generated thoughts based on user relevance and quality metrics. Evaluation pathways 1931 implement multi-stage filtering that progressively refines thought selection based on increasingly stringent criteria. Feedback loops 1932 provide bidirectional information flow between self-directed thought generator 1910 and user alignment system 1920, creating iterative improvement processes that continuously enhance alignment between autonomous reasoning and user needs. Connection to thought cache systems 1933 links autonomous reasoning components with three-tier thought caching architecture described in parent invention, enabling access to both personalized and generalized thought patterns during autonomous operation.

In operation, persistent cognition manager 1820 initiates autonomous reasoning sessions based on resource availability and opportunity detection. Self-directed thought generator 1910 formulates internal prompts targeting knowledge gaps or promising exploration paths, developing these into coherent thought chains through processes similar to those used during active user interactions. User alignment system 1920 continuously evaluates generated thoughts against current understanding of user interests and needs, providing feedback that guides exploration toward most valuable areas. Throughout autonomous operation, system maintains comprehensive state information that allows reasoning to pause and resume seamlessly across sessions, creating continuous cognitive operation despite intermittent processing. When high-value insights are identified, they are prepared for future presentation to user, with timing and format determined by presentation decision engine 1924 based on relevance and user context. Through this autonomous reasoning architecture, system transforms from reactive question-answering tool to proactive thinking partner that continues to develop valuable insights even during periods of user disengagement.

A non-limiting use case example illustrating the functionality of the system disclosed in FIG. 19 will feature Dr. Patel, a medical researcher studying correlation patterns between environmental factors and autoimmune disease triggers. He interacts with the system intermittently throughout his workday, often with long gaps between sessions as he attends meetings and lab work.

When Dr. Patel steps away from his device after exploring recent journal articles on environmental pollutants, the persistent cognition manager 1820 preserves his entire research context, including the specific hypotheses being investigated and the analytical frameworks being applied. The state preservation component 1900 captures not just the content of his research but the cognitive approach he's been taking.

During his three-hour laboratory session, the self-directed thought generator 1910 autonomously continues analyzing the research patterns. The internal prompt formulator 1911 generates investigative questions about potential connections between microplastic exposure and specific immune response markers that hadn't been directly addressed in Dr. Patel's original queries. The thought chain extender 1912 builds upon his earlier exploration of air quality factors, developing more nuanced hypotheses about interaction effects between multiple environmental exposures.

As this autonomous reasoning progresses, the knowledge gap identifier 1915 recognizes that temporal data about exposure duration is underrepresented in the current analysis framework. It flags this limitation for future investigation while the consistency verifier 1913 ensures all autonomously generated insights remain aligned with established biomedical understanding and don't contradict the established research principles Dr. Patel has previously worked with.

Meanwhile, the user alignment system 1920 monitors the developing insights against Dr. Patel's research interests and methodological preferences. The interest profile maintainer 1921 has learned through previous interactions that he prioritizes statistically robust, multi-factor analyses over single-variable correlations. The reasoning pattern learner 1922 has observed his preference for considering confounding variables early in hypothesis formation. Based on these learned patterns, the relevance assessor 1923 assigns higher priority scores to insights that match his rigorous methodological approach.

When Dr. Patel returns to his device, the presentation decision engine 1924 determines which autonomously generated insights to present immediately versus storing for later reference. It prioritizes presenting a novel correlation between seasonal pollen counts and microplastic distribution that might impact his current research direction while saving more tangential insights for relevant future moments.

As Dr. Patel provides feedback on the usefulness of these autonomous insights, the feedback integration component 1925 refines the system's understanding of his research priorities, creating a continuously improving research partnership that maximizes his productive thinking time by maintaining analytical momentum even during necessary breaks in active engagement.

Figure 20:
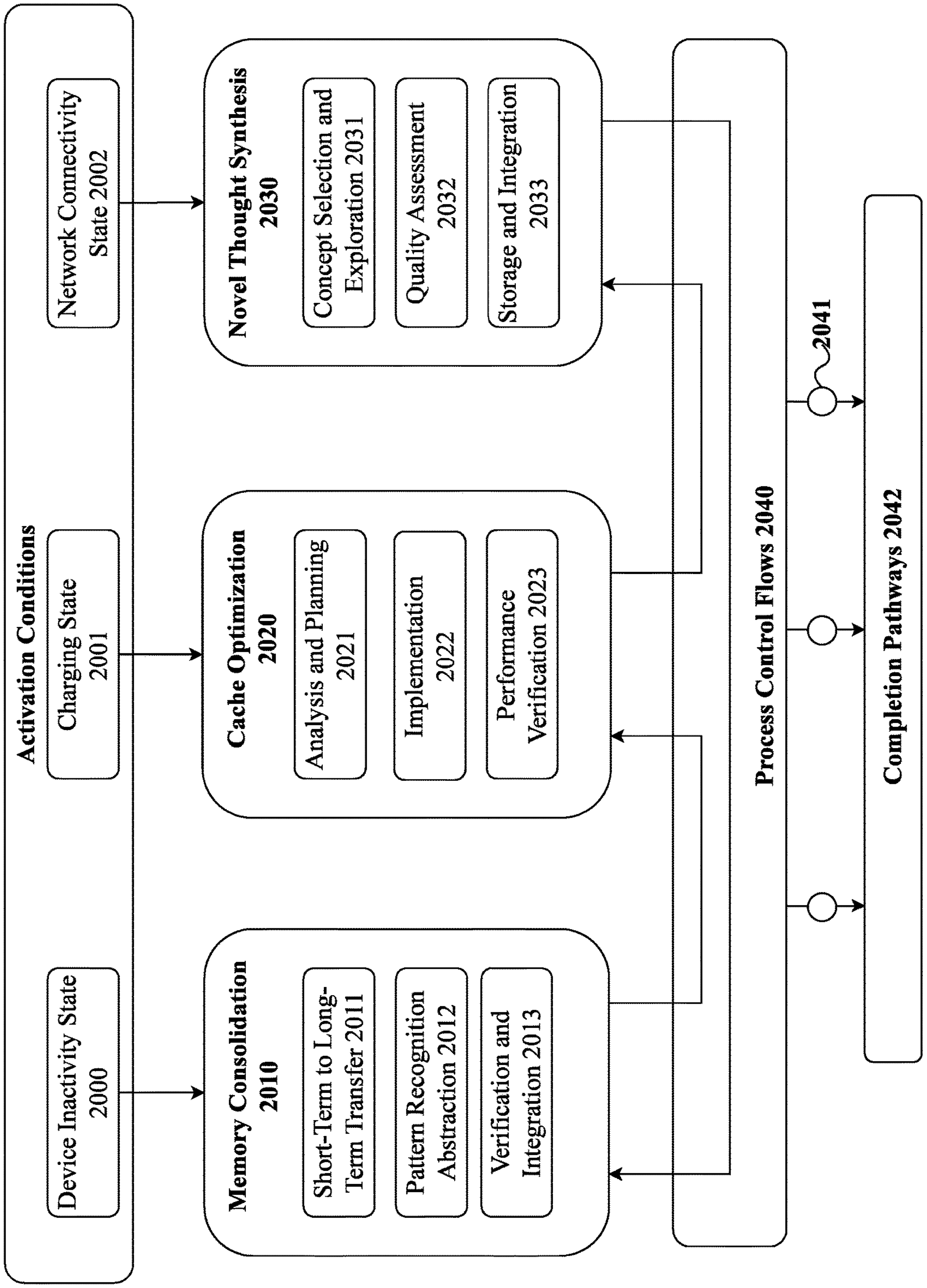
FIG. 20 is a block diagram illustrating exemplary architecture of dream-state processing flow.

FIG. 20 is a block diagram illustrating exemplary architecture of dream-state processing flow, in an embodiment. Dream-state processing system 1830 implements cognitive maintenance and development processes that occur during periods of user inactivity, drawing inspiration from human memory consolidation during sleep states.

Activation conditions 2000 represent the initial decision points that determine when dream-state processing begins. Device inactivity state 2000 monitors user engagement patterns to identify periods when user is not actively interacting with system. Device inactivity state 2000 implements variable thresholds that adjust based on historical usage patterns, distinguishing between brief pauses in interaction and extended inactive periods suitable for dream-state processing. Charging state 2001 detects when mobile device is connected to external power source, enabling more intensive processing without battery depletion concerns. Charging state 2001 communicates with battery optimizer 1150 to coordinate resource availability for dream-state operations. Network connectivity state 2002 evaluates current connection quality and cost factors, determining optimal data transfer timing for cloud-based processing. Network connectivity state 2002 can initiate different dream-state processing profiles based on connection characteristics, prioritizing device-local operations during limited connectivity and enabling fuller cloud-based processing during favorable network conditions.

Memory consolidation process 2010 represents first major operational phase of dream-state processing, focused on optimizing thought storage and organization. Short-term to long-term transfer 2011 moves information from immediate context storage to more compressed, persistent representations. Short-term to long-term transfer 2011 extends context compression processes described in parent invention with more sophisticated mechanisms that preserve essential semantic content while significantly reducing storage requirements. Pattern recognition and abstraction 2012 identifies recurring structures and relationships across multiple thought instances, creating higher-level representations that capture common elements. Pattern recognition and abstraction 2012 enables system to recognize conceptual similarities even when expressed through different specific examples or terminology, supporting more efficient knowledge organization. Verification and integration 2013 confirms accuracy of consolidated information before incorporating it into long-term knowledge structures. Verification and integration 2013 implements consistency checking that identifies and resolves potential contradictions between newly consolidated information and existing knowledge, maintaining logical coherence across knowledge base.

Cache optimization process 2020 implements second operational phase focused on improving retrieval efficiency and preparation for future interactions. Analysis and planning 2021 examines current cache organization, access patterns, and predicted future needs to determine optimal reorganization strategy. Analysis and planning 2021 identifies inefficiencies such as fragmented storage, suboptimal indexing structures, or cached thoughts with declining relevance that could be replaced with more valuable content. Implementation 2022 executes reorganization plan developed during analysis phase, restructuring cached thoughts to improve future access efficiency. Implementation 2022 applies changes in batches optimized for computational efficiency, prioritizing improvements with highest expected impact on future performance. Performance verification 2023 tests reorganized cache structures to confirm improvement in access metrics. Performance verification 2023 simulates common retrieval patterns based on user history, measuring response time and accuracy to validate optimization effectiveness.

Novel thought synthesis process 2030 represents third operational phase that generates new insights through creative combination of existing knowledge. Concept selection and exploration 2031 identifies promising thought combinations that might yield valuable insights through connection of previously separate knowledge domains. Concept selection and exploration 2031 employs multiple selection strategies including detection of semantic proximity, complementary knowledge structures, and potentially valuable analogies across domains. During this phase, system explores possible relationships between selected concepts, developing potential thought chains that connect them in meaningful ways. Quality assessment 2032 evaluates synthesized thoughts based on coherence, novelty, potential utility, and alignment with user interests. Quality assessment 2032 applies increasingly stringent filters that promote high-quality combinations while eliminating those unlikely to provide value. Storage and integration 2033 preserves valuable synthesized thoughts and incorporates them into appropriate knowledge structures. Storage and integration 2033 determines optimal placement within three-tier caching architecture based on thought characteristics, with personal insights stored in user-specific cache and more generalizable patterns potentially promoted to global thought cache following anonymization.

Process control flows 2040 coordinate execution sequence and dependencies between dream-state components. Sequence indicators 2040 establish operational order and transition conditions between processing phases, enabling both sequential and parallel execution paths depending on resource availability and dependencies. Resource gates 2041 monitor computational resource consumption and implement adaptive throttling to ensure dream-state processing remains within allocated constraints. Resource gates 2041 prioritize critical processing paths when resources are limited, potentially deferring less essential operations to future processing cycles. Completion pathways 2042 define conditions under which dream-state processing terminates, including detection of resumed user activity, achievement of processing objectives, or exhaustion of allocated processing time.

In operation, dream-state processing activates when system detects suitable conditions through activation conditions 2000. Processing typically begins with memory consolidation process 2010, transferring recent interactions from detailed immediate context to more efficient long-term representations. This consolidation identifies recurring patterns across interactions while preserving essential knowledge and reasoning structures. Once consolidation completes, cache optimization process 2020 reorganizes thought storage to improve future retrieval efficiency, particularly focusing on thought patterns likely to be needed based on user history and predicted future interactions. Finally, novel thought synthesis process 2030 explores potential connections between previously separate knowledge domains, generating new insights that might prove valuable to user.

Throughout dream-state operation, process control flows 2040 coordinate and adjust processing based on available resources and effectiveness metrics. System may adaptively allocate more resources to processing phases showing most promising results, while reducing effort in less productive areas. If user engagement resumes during dream-state processing, system gracefully terminates operations and transitions back to active interaction mode, preserving valuable intermediate results for future dream-state sessions. Through this periodic background processing, system continuously refines its knowledge organization, generates novel insights, and prepares for more efficient future operation, mimicking aspects of human memory consolidation and creative association during sleep.

A non-limiting use case example illustrating the functionality of the system disclosed in FIG. 20 will feature Mei, who is learning Mandarin Chinese for an upcoming international business assignment. She uses the system daily for language practice, cultural context, and business protocol understanding. Her usage typically happens in morning and evening sessions, with long inactive periods during her workday.

After an evening study session focused on business negotiation phrases, Mei puts her tablet on the charger and goes to sleep. The system detects these activation conditions—device inactivity state 2000, charging state 2001, and stable WiFi network connectivity state 2002—and initiates dream-state processing.

The memory consolidation process 2010 begins by transferring her recent learning interactions from short-term to long-term storage 2011. Rather than simply moving this information, the system analyzes patterns across her last several weeks of language practice. The pattern recognition and abstraction mechanism 2012 identifies that Mei consistently struggles with fourth-tone pronunciation in multi-syllable words and tends to mix up business-specific vocabulary across different industries. It creates compressed knowledge structures that highlight these learning patterns while removing redundant examples and practice interactions.

After consolidation, the cache optimization process 2020 activates. The analysis and planning component 2021 examines Mei's scheduled morning routine based on historical usage patterns and her digital calendar. It predicts she'll continue business negotiation practice on her commute tomorrow, but in a context requiring offline operation. The implementation component 2022 reorganizes her local device cache, ensuring key negotiation phrases, pronunciation guides, and relevant cultural context notes are prioritized for offline availability. The performance verification component 2023 tests the optimized cache structure against typical morning usage patterns to confirm improved response times for her most likely interactions.

As dream-state processing continues, the novel thought synthesis process 2030 begins connecting concepts across Mei's language learning and business domains. The concept selection and exploration component 2031 identifies parallel structures between Japanese negotiation protocols which her profile shows she's already proficient in and the Mandarin approaches she's currently learning. It generates novel insights about the cultural reasons for these differences and creates comparative frameworks that leverage her existing knowledge. After quality assessment 2032 confirms these insights are accurate and relevant to her learning needs, the storage and integration component 2033 prepares these connections for presentation during her next session.

Throughout this process, resource gates 2041 monitor cloud computing usage, adjusting processing intensity to stay within efficient parameters while sequence indicators 2040 ensure the most critical consolidation tasks complete even if her device disconnects from power unexpectedly.

When Mei begins her morning commute study session, the system presents optimized learning materials based on her historical patterns, along with the novel cross-cultural negotiation insights generated during dream-state processing. This creates an impression that the system has been "thinking about" her learning needs overnight, presenting fresh perspectives that help accelerate her Mandarin acquisition through meaningful connections to her existing knowledge.

Figure 21:
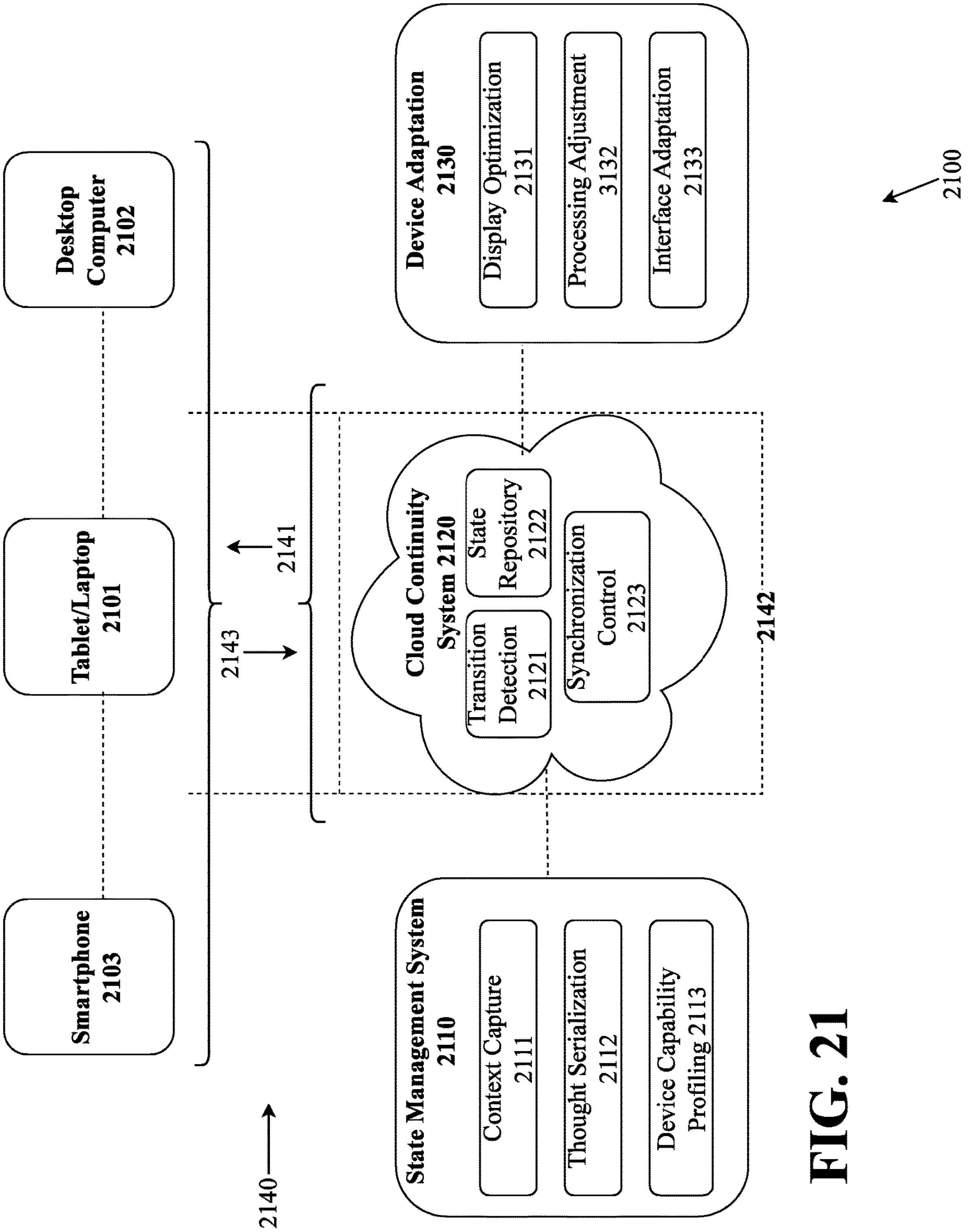
FIG. 21 is a block diagram illustrating exemplary architecture of cross-device cognitive continuity.

FIG. 21 is a block diagram illustrating exemplary architecture of cross-device cognitive continuity, in an embodiment. This figure demonstrates how system maintains seamless reasoning state across multiple user devices, enabling continuous cognitive operation regardless of which device is currently active.

User device ecosystem 2100 represents collection of computing devices through which user interacts with system. Smartphone 2103 typically serves as primary interaction device due to its constant availability, implementing complete mobile-optimized multi-stage LLM architecture as described in parent invention. Smartphone 2103 maintains local device cache containing both personal thoughts specific to user and frequently accessed generalized thoughts. Tablet/Laptop 2101 represents intermediate device with greater screen area and potentially more computational capacity than smartphone, enabling enhanced interaction experiences while maintaining mobility. Tablet 2101 implements device-appropriate adaptations of core system architecture, with display components optimized for larger screen area. Desktop 2102 represents fixed computing environment with maximum computational resources and display capabilities, enabling most sophisticated interaction patterns. Desktop 2102 can implement fuller versions of language models with reduced quantization due to available processing power, while maintaining consistent reasoning through shared thought caches.

State management system 2110 enables cognitive continuity by capturing, transferring, and restoring reasoning state across devices. Context capture 2111 creates comprehensive snapshot of current cognitive state including active reasoning chains, context window contents, and interaction history. Context capture 2111 implements efficient state encoding that minimizes data volume while preserving essential contextual elements necessary for continuity. Thought serialization 2112 converts in-memory thought representations into portable format suitable for transfer between devices with potentially different hardware and software configurations. Thought serialization 2112 employs standardized formats that preserve thought relationships and metadata regardless of specific device characteristics. Device capability profiling 2113 identifies processing capabilities, display characteristics, and interaction modalities of each device in ecosystem. Device capability profiling 2113 enables adaptation of cognitive state to device-specific constraints and opportunities, optimizing experience for current hardware context.

Cloud continuity system 2120 serves as central coordination mechanism for cross-device cognitive synchronization. Transition detection 2121 monitors device activity patterns to identify when user switches between devices, triggering appropriate state transfer processes. Transition detection 2121 employs both explicit signals such as application closure and implicit indicators such as device inactivity followed by activity on different device. State repository 2122 maintains current cognitive state in cloud environment, providing central reference point accessible to all devices. State repository 2122 implements versioning and conflict resolution to handle potential simultaneous updates from multiple devices. Synchronization control 2123 manages timing and extent of state transfers based on network conditions and device status. Synchronization control 2123 implements prioritized transfer protocols that ensure most critical state elements transfer first during limited connectivity scenarios.

Device adaptation 2130 customizes cognitive state presentation based on characteristics of currently active device. Display optimization 2131 adjusts visual presentation of information based on screen size, resolution, and orientation. Display optimization 2131 reformats content to maintain readability and usability across device types, potentially implementing different visualization approaches for complex thought structures based on available display area. Processing adjustment 2132 modifies computational workload distribution based on device capabilities and power state. Processing adjustment 2132 shifts resource-intensive operations to cloud environment when operating on less powerful devices, while potentially performing more processing locally on high-capacity devices. Interface adaptation 2133 modifies interaction mechanisms based on available input methods and device form factor. Interface adaptation 2133 optimizes for touch input on mobile devices while enabling more sophisticated keyboard and pointer interactions on desktop environments.

Continuity flows 2140 represent data movement pathways that enable state preservation across device transitions. Device-to-cloud transfers 2140 move current cognitive state from active device to cloud environment, either periodically during operation or when transition to another device is detected. Device-to-cloud transfers 2140 implement incremental update protocols that transmit only changed state elements to minimize data transfer requirements. Cloud-to-device transfers 2141 restore cognitive state from cloud repository to newly activated device, enabling seamless continuation of reasoning processes. Cloud-to-device transfers 2141 implement progressive loading that prioritizes immediately needed state elements while deferring transfer of less urgent components. Cross-device direct communication 2142 enables direct state transfer between devices when feasible, reducing latency compared to cloud-mediated transfers. Cross-device direct communication 2142 utilizes local network connections when available, falling back to cloud-mediated transfer when direct communication is not possible.

In operation, when user interacts with system on smartphone 2103, state management system 2110 periodically captures current cognitive state and transfers it to cloud continuity system 2120 through device-to-cloud transfers 2140. If user later switches to tablet 2101, transition detection 2121 identifies this change and triggers cloud-to-device transfer 2141 to restore cognitive state on newly active device. Device adaptation 2130 adjusts presentation and interaction patterns to optimize for tablet characteristics, maintaining familiar reasoning context while adapting to new form factor. Throughout transition, system preserves continuous reasoning capability, allowing conversations and thought processes to continue uninterrupted despite change in physical device.

When network connectivity permits, system may preemptively synchronize state across all devices in ecosystem, enabling immediate transition even when cloud connectivity is temporarily unavailable. During extended offline periods, each device maintains local cognitive state that reconciles with cloud state repository 2122 when connectivity resumes, implementing appropriate conflict resolution protocols if divergent changes occurred during disconnected operation. Through these mechanisms, system provides seamless cognitive continuity that maintains reasoning context and capability regardless of which physical device serves as current interaction point, creating unified cognitive experience across heterogeneous device ecosystem.

A non-limiting use case example illustrating the functionality of the system disclosed in FIG. 21 will feature Marcus, a financial analyst who moves between multiple devices throughout his workday while developing complex investment strategies for clients. His workflow involves initial research on his smartphone during his commute, detailed analysis on his desktop at the office, and final review on his tablet at home.

Marcus begins his morning by researching emerging market trends on his smartphone 2103 during his train commute. The state management system 2110 continuously captures his cognitive context through context capture 2111, including the specific market sectors being examined, the analytical frameworks being applied, and the half-formed investment hypotheses he's developing. As he reads about manufacturing trends in Southeast Asia, the thought serialization component 2112 converts his developing analysis into a standardized format that can be transferred between devices.

When Marcus arrives at the office and logs into his desktop computer 2102, the cloud continuity system 2120 detects this transition through transition detection 2121. The state repository 2122 immediately begins transferring his current cognitive state from smartphone to desktop through cloud-to-device transfers 2141. Within seconds, his entire research context is available on the new device.

The device adaptation 2130 system recognizes the capabilities of his office desktop and automatically adjusts the presentation of information. Display optimization 2131 reconfigures the interface to utilize the larger screen estate, showing data visualizations that weren't practical on the smartphone. Processing adjustment 2132 takes advantage of the desktop's greater computing power to run more sophisticated financial models on the data he was exploring.

Later that afternoon, Marcus steps into a client meeting with his tablet 2101. As he opens the application, cross-device direct communication 2142 quickly transfers his latest analysis state directly from his desktop without requiring full cloud synchronization. When he makes annotations during the client meeting, these are immediately synchronized back to his desktop through device-to-cloud transfers 2140.

That evening at home, Marcus picks up his analysis again on his tablet. The cloud continuity system 2120 not only provides his latest work but maintains awareness of which visualizations he spent the most time discussing with the client. Interface adaptation 2133 adjusts the tablet interface to emphasize these key elements while optimizing touch interactions for the tablet form factor.

Throughout this multidevice workflow, Marcus experiences a completely seamless cognitive continuity. His analysis progresses naturally across different environments and device capabilities, allowing him to maintain his analytical momentum regardless of location or device transitions. The system effectively functions as an extension of his thinking process, adapting to each device's strengths while preserving his complete intellectual context.

Figure 22:
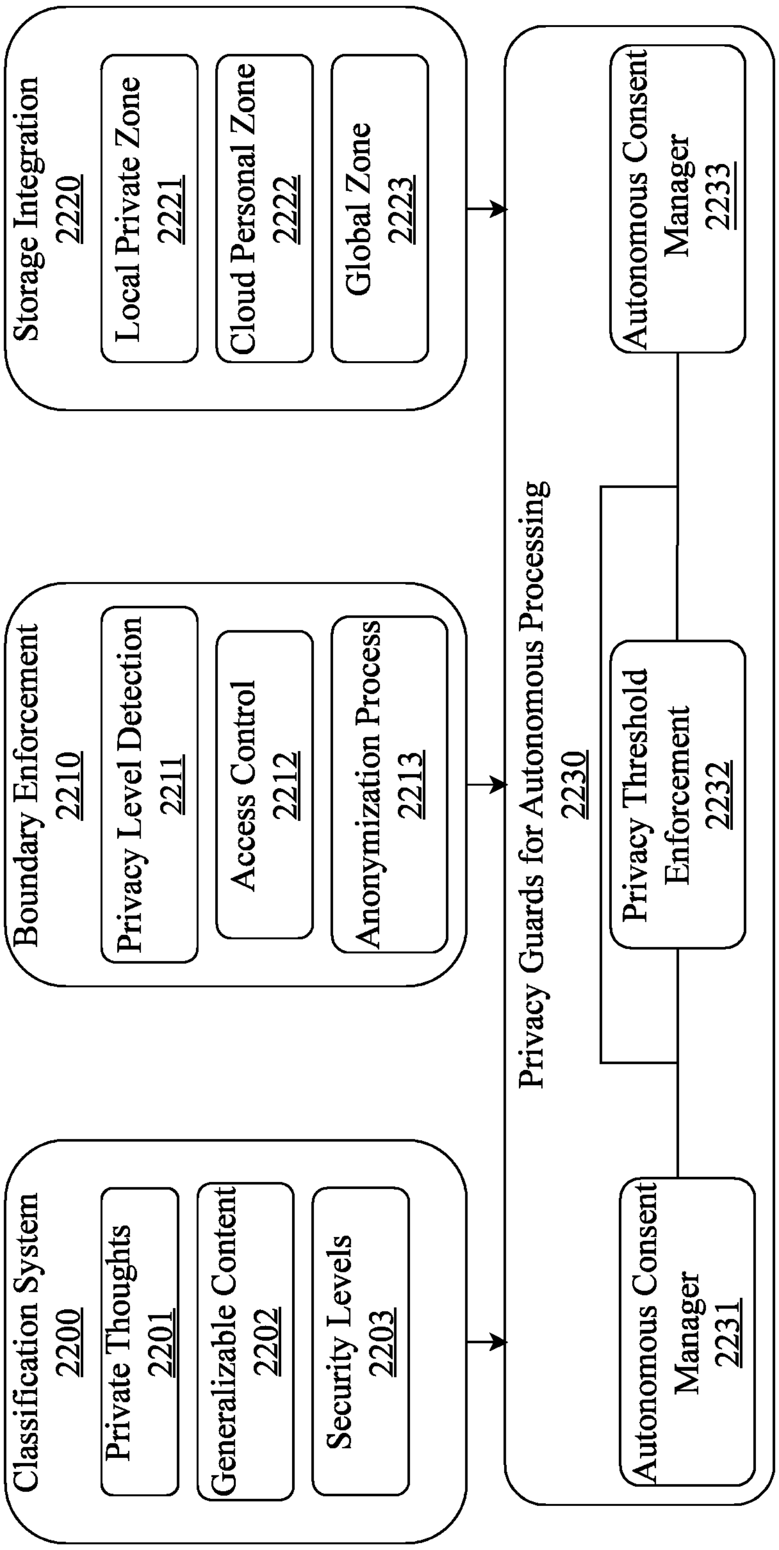
FIG. 22 is a block diagram illustrating exemplary architecture of enhanced privacy architecture for autonomous operation.

FIG. 22 is a block diagram illustrating exemplary architecture of enhanced privacy architecture for autonomous operation, in an embodiment. This figure details specialized privacy protection mechanisms implemented to ensure secure handling of personal information during autonomous reasoning processes when operating without direct user supervision.

Classification system 2200 categorizes all thoughts based on privacy implications and sharing permissions. Private thoughts 2201 represents category for thoughts containing personally identifiable information, confidential content, or user-specific context that must remain strictly within user's personal environment. Private thoughts 2201 are subject to most stringent protection measures, including encryption and access limitations that prevent exposure during autonomous processing. Generalizable content 2202 represents category for thoughts containing reasoning patterns or knowledge structures that contain no personal information and may provide value across multiple users. Generalizable content 2202 qualifies for potential inclusion in global thought cache after appropriate anonymization procedures. Security levels 2203 implements graduated protection tiers that apply increasingly stringent safeguards based on sensitivity classification. Security levels 2203 ensures proportional protection that balances computational overhead of security measures against privacy requirements of specific thought content.

Boundary enforcement 2210 implements mechanisms that maintain separation between privacy domains during autonomous operation. Privacy level detection 2211 analyzes thought content to identify personal or sensitive information requiring protection. Privacy level detection 2211 employs pattern recognition techniques to recognize personally identifiable information, proprietary content, and context-specific details that might indirectly reveal personal information. Access control 2212 enforces appropriate limitations on thought accessibility based on classification, implementing rule-based policies that restrict access to sensitive thoughts during autonomous operation. Access control 2212 includes both explicit permission rules and contextual factors that adjust access decisions based on processing environment and purpose. Anonymization process 2213 transforms thoughts containing useful reasoning patterns but some personal elements into generalized versions suitable for broader use. Anonymization process 2213 implements multiple techniques including entity replacement, specificity reduction, and context generalization to preserve valuable reasoning patterns while removing identifying information.

Storage integration 2220 implements privacy-aware distribution of thoughts across caching architecture. Local private zone 2221 provides storage area on user's device for most sensitive thoughts, ensuring thoughts containing personal information remain under user's direct physical control. Local private zone 2221 implements device-level encryption and isolation mechanisms that prevent unauthorized access even in case of device compromise. Cloud personal zone 2222 extends personal thought storage to cloud environment with enhanced security measures. Cloud personal zone 2222 employs user-specific encryption where decryption keys remain exclusively on user devices, ensuring that even cloud administrators cannot access unencrypted personal thoughts. Global zone 2223 contains fully anonymized thoughts suitable for sharing across users, implementing access patterns that permit retrieval of generalized reasoning patterns while maintaining strict separation from personal context. Global zone 2223 regularly undergoes privacy audits to verify absence of personal information.

Privacy guards for autonomous processing 2230 provide additional protections specifically designed for operation during periods without direct user oversight. Autonomous consent manager 2231 maintains and enforces user permissions regarding autonomous thought processing. Autonomous consent manager 2231 implements granular permission model that enables user to specify which types of autonomous processing are permitted on different thought categories, providing explicit control over background cognitive operations. Privacy threshold enforcement 2232 implements conservative privacy boundaries during autonomous operation, applying stricter classification standards compared to user-directed processing. Privacy threshold enforcement 2232 resolves ambiguous cases toward higher privacy protection during autonomous operation, ensuring system errs toward protection when operating without direct user guidance. Audit logging system 2233 maintains comprehensive records of all thought access, transformation, and privacy decisions during autonomous operation. Audit logging system 2233 creates verifiable trail that enables retrospective review of privacy-related decisions, supporting both troubleshooting and accountability.

In operation, when system enters autonomous reasoning mode, all thoughts under consideration first pass through classification system 2200, which determines appropriate privacy categorization. Boundary enforcement 2210 then applies corresponding protection measures, restricting certain operations on private thoughts and implementing appropriate isolation between privacy domains. During autonomous thought generation, privacy threshold enforcement 2232 continuously monitors emerging thoughts, applying classification as they develop and enforcing appropriate handling based on detected sensitivity. When autonomous reasoning identifies potentially valuable generalizable patterns within private thoughts, anonymization process 2213 attempts to extract useful reasoning structures while removing personal elements, preserving utility while ensuring privacy.

Throughout autonomous operation, audit logging system 2233 maintains detailed records of all privacy-relevant decisions and operations, creating accountability mechanism that can be reviewed during system maintenance. If autonomous operation encounters thought scenarios that cannot be clearly resolved under current privacy policies, system takes conservative approach, avoiding operations that might compromise privacy until user can provide explicit guidance during next active interaction session. Through these enhanced privacy mechanisms, system maintains robust protection of personal information even when operating autonomously, ensuring user privacy remains protected throughout all reasoning processes regardless of direct user supervision.

A non-limiting use case example illustrating the functionality of the system disclosed in FIG. 22 Elena, a management consultant who uses the system to develop strategic recommendations for multiple corporate clients across different industries. Her work involves highly confidential information that must remain strictly segregated between clients, while still allowing the system to develop expertise in general business strategy frameworks.

When Elena begins working with a new pharmaceutical client, the classification system 2200 immediately begins categorizing her thoughts. Information about the client's proprietary drug formulations, pipeline products, and market positioning strategy is identified by privacy level detection 2211 as private thoughts 2201. Specific financial projections and executive strategy discussions are assigned the highest security level 2203 with restricted access even within the private category. Meanwhile, generalized concepts about pharmaceutical market dynamics and regulatory navigation strategies are identified as potentially generalizable content 2202 after proper anonymization.

As Elena conducts her analysis, all client-specific information is stored in the local private zone 2221 on her device with enhanced encryption. When synchronization occurs, this information transfers only to her cloud personal zone 2222 using her personal encryption keys, ensuring this client's confidential data remains absolutely segregated from her other clients' information even within her own encrypted cloud storage.

During a weekend when Elena isn't actively working, the system continues autonomous reasoning operations. The autonomous consent manager 2231 enforces her pre-established privacy preferences, which allow the system to develop strategy frameworks autonomously but strictly prohibit incorporating any client-specific details into generalized reasoning. The privacy threshold enforcement 2232 applies more conservative privacy classifications during autonomous operation than during active use, ensuring borderline content remains private rather than risking improper generalization.

When the system identifies a potentially valuable pattern connecting supply chain optimization techniques across several of Elena's clients, the anonymization process 2213 carefully strips all identifying information, market-specific numbers, and unique indicators before creating an abstract supply chain resilience framework. This framework is evaluated against strict privacy criteria before being considered for the global zone 2223 where it could benefit other strategy consultants.

Throughout all autonomous operations, the audit logging system 2233 maintains detailed records of every privacy decision, data access, and thought transformation. This creates a comprehensive audit trail that Elena can review to verify that client confidentiality was maintained during autonomous processing.

When Elena returns to work on Monday, she finds valuable new strategic insights for her pharmaceutical client that were developed during autonomous reasoning, but remains confident that her client's confidential information has remained strictly protected through the enhanced privacy architecture. Meanwhile, her contributions to the generalized strategic frameworks in the global thought cache benefit other consultants while never compromising her professional obligations of client confidentiality.

One skilled in the art would recognize numerous applications for mobile-optimized multi-stage LLM with autonomous reasoning capabilities across diverse domains and use scenarios. The use cases presented herein are non-limiting examples provided solely for illustrative purposes and should not be construed as restricting the scope of the invention. Medical professionals could utilize this system during field operations in areas with limited connectivity, accessing diagnostic frameworks and treatment protocols even when disconnected from hospital networks while benefiting from insights autonomously generated between patient consultations. Field engineers could employ the system at remote installation sites to troubleshoot equipment issues using cached technical knowledge, with the system continuing to analyze potential solutions during equipment assessments. Researchers conducting fieldwork in remote locations could maintain access to analytical frameworks while the system autonomously explores potential connections between collected data points. Educational applications could support personalized learning that continues to develop tailored curriculum paths even when students aren't actively studying. These and countless other applications demonstrate how the system's ability to maintain sophisticated reasoning capabilities in resource-constrained environments while continuing autonomous thought development during inactive periods provides significant value across numerous professional domains and daily use scenarios.

Federated Persistent Cognitive System Architecture

Figure 23A:
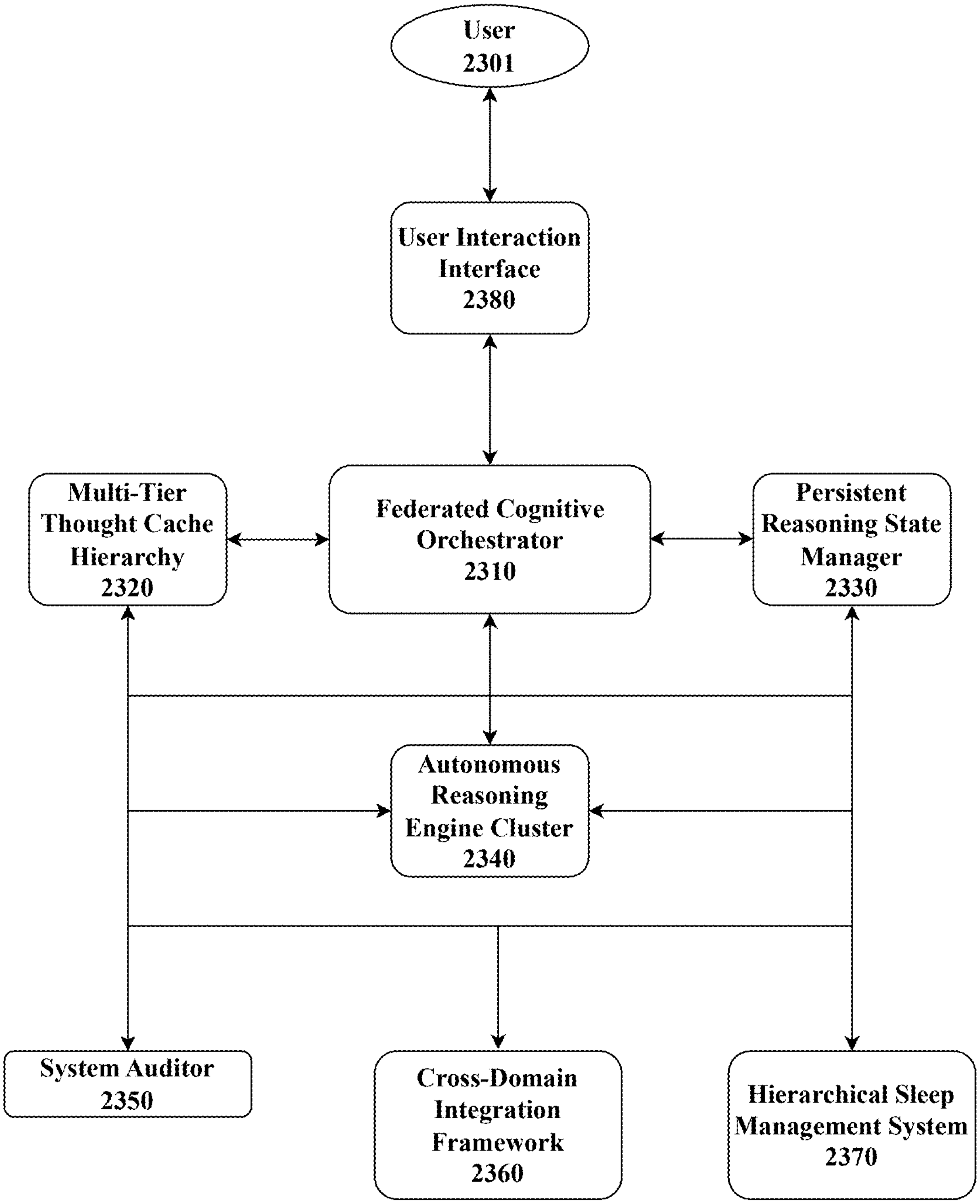
FIG. 23A is a block diagram illustrating exemplary architecture of federated persistent cognitive system.

FIG. 23A is a block diagram illustrating exemplary architecture of federated persistent cognitive system 2300, in an embodiment. Federated persistent cognitive system 2300 builds upon mobile-optimized multi-stage LLM with autonomous reasoning, introducing components that enable domain-specialized processing and controlled knowledge sharing across a federation of cognitive instances. Federated persistent cognitive system 2300 represents an extension of mobile-optimized multi-stage LLM with autonomous reasoning capabilities through implementation of a distributed, collaborative architecture that enables specialized knowledge persistence across multiple domains while facilitating controlled knowledge sharing and collective intelligence.

Federated cognitive orchestrator 2310 serves as central coordination mechanism for federated persistent cognitive system 2300, managing interactions between all system components and determining optimal processing paths for user prompts. Federated cognitive orchestrator 2310 extends router 310 and controller 360 functionality from previous embodiments with additional capabilities for domain-specific routing and cross-instance coordination. When receiving user prompt 320, federated cognitive orchestrator 2310 analyzes prompt characteristics including contextual metadata, domain references, and complexity indicators to determine appropriate processing paths. Based on this analysis, federated cognitive orchestrator 2310 generates processing directives that specify which domain-specialized instances should process prompt, what resources should be allocated, and what coordination mechanisms should be implemented. These directives flow through bidirectional control channels that connect federated cognitive orchestrator 2310 with all other system components, enabling continuous monitoring and adjustment of system operations in response to changing requirements or resource conditions.

Multi-tier thought cache hierarchy 2320 extends three-tier thought caching architecture 1200 from previous embodiments with additional federation-specific layers that enable domain specialization while supporting controlled knowledge sharing. Multi-tier thought cache hierarchy 2320 implements graduated storage tiers with different access controls and privacy protections appropriate for various levels of thought sharing within federated architecture. When thoughts are generated through processing, multi-tier thought cache hierarchy 2320 classifies them based on privacy requirements, domain specificity, and sharing potential, then stores them in appropriate cache tiers. Bidirectional cache access channels connect multi-tier thought cache hierarchy 2320 with other system components, enabling efficient thought retrieval while enforcing appropriate access controls. These channels support both query operations that retrieve relevant thoughts based on semantic similarity and storage operations that add newly generated thoughts to appropriate cache locations.

Persistent reasoning state manager 2330 ensures continuity of reasoning processes across sessions, devices, and time periods through comprehensive state capture, preservation, and restoration mechanisms. Persistent reasoning state manager 2330 extends cross-device cognitive continuity from previous embodiments such as user device ecosystem 2100 with enhanced capabilities for long-term state maintenance and federated state sharing. When cognitive state transitions occur—whether due to session termination, device switching, or domain handoff—persistent reasoning state manager 2330 captures comprehensive state representation including active reasoning chains, context windows, and exploration directions. This state information flows through bidirectional state channels that connect persistent reasoning state manager 2330 with other system components, enabling seamless state transitions and context preservation across system operations.

Autonomous reasoning engine cluster 2340 comprises multiple domain-specialized instances of autonomous reasoning engine 1810 from previous embodiments, each optimized for particular knowledge domains or reasoning frameworks. Each instance within autonomous reasoning engine cluster 2340 maintains domain-specific models, terminology, and reasoning patterns while operating within federated architecture. When federated cognitive orchestrator 2310 routes prompt to appropriate domain instance, autonomous reasoning engine cluster 2340 processes prompt using specialized knowledge and reasoning approaches. Generated thoughts flow through bidirectional thought channels connecting autonomous reasoning engine cluster 2340 with other system components, enabling both immediate response generation and longer-term knowledge development. These channels support transmission of both explicit reasoning outputs for immediate use and intermediate thought patterns for storage and future refinement.

System auditor 2350 continuously monitors operations across entire federated architecture, analyzing patterns, identifying optimization opportunities, and generating performance insights. System auditor 2350 extends dream-state processing system 1830 from previous embodiments with cross-domain analysis capabilities and federation-wide optimization mechanisms. System auditor 2350 collects operational data from all system components through bidirectional monitoring channels, enabling comprehensive assessment of system performance and identification of improvement opportunities. Based on observed patterns, system auditor 2350 generates optimization targets and enhancement recommendations that flow back through these same channels to relevant components, creating continuous improvement cycle throughout federated architecture.

Cross-domain integration framework 2360 enables controlled knowledge sharing between specialized domains while maintaining appropriate isolation boundaries and privacy protections. Cross-domain integration framework 2360 extends enhanced privacy architecture 2200 from previous embodiments with domain-specific boundaries and federation-level access controls. When knowledge transfer opportunities arise between domains, cross-domain integration framework 2360 evaluates potential transfer against established rules, permissions, and privacy requirements. Approved transfers flow through bidirectional integration channels connecting cross-domain integration framework 2360 with other system components, enabling controlled knowledge sharing while preventing inappropriate information leakage across domain boundaries. These channels implement graduated access controls that vary based on sensitivity classification, domain relationships, and explicit sharing permissions.

Hierarchical sleep management system 2370 coordinates optimization processes during system idle periods across all domains and components within federated architecture. Hierarchical sleep management system 2370 extends dream-state processing flow 2000 from previous embodiments with federation-wide coordination capabilities and staggered transition management. When system detects appropriate conditions for optimization processes-such as extended user inactivity or scheduled maintenance periods-hierarchical sleep management system 2370 orchestrates transitions to optimization mode through bidirectional sleep control channels connecting hierarchical sleep management system 2370 with other system components. These channels enable coordination of staggered transitions that maintain minimal operational capability while maximizing optimization efficiency, preventing system-wide unavailability during deep optimization processes.

User interaction interface 2380 provides access points through which users engage with federated persistent cognitive system 2300 across various devices and interaction modalities. User interaction interface 2380 extends mobile user interface 1160 from previous embodiments with enhanced capabilities for multi-device operation and domain-aware interactions. When user initiates interaction through any connected device, user interaction interface 2380 captures input through appropriate modality—such as text, voice, or multimodal communication—and formats it for processing by federated architecture. User prompts flow through bidirectional user channels connecting user interaction interface 2380 with federated cognitive orchestrator 2310, enabling transmission of both explicit inputs and contextual metadata that aids appropriate processing. These same channels carry system responses back to user, formatted appropriately for current device capabilities and interaction context.

In operation, federated persistent cognitive system 2300 processes user interactions through coordinated activity across all system components. When user 2301 submits prompt through user interaction interface 2380, federated cognitive orchestrator 2310 analyzes prompt characteristics and determines optimal processing path across domain-specialized instances within autonomous reasoning engine cluster 2340. Selected instance processes prompt with assistance from domain-appropriate thoughts retrieved from multi-tier thought cache hierarchy 2320 and contextual understanding provided by persistent reasoning state manager 2330. Generated response returns to user through user interaction interface 2380, while new thoughts store in appropriate levels of multi-tier thought cache hierarchy 2320 based on privacy requirements and sharing potential.

During periods of user inactivity, system transitions to optimization mode under coordination of hierarchical sleep management system 2370. In this mode, system auditor 2350 identifies improvement opportunities across federation while autonomous reasoning engine cluster 2340 continues exploration of promising knowledge pathways. Cross-domain integration framework 2360 facilitates controlled knowledge sharing between specialized domains, enabling collective intelligence while maintaining appropriate boundaries.

Through this integrated architecture, federated persistent cognitive system 2300 transforms from responsive tool to persistent cognitive partnership with specialized domain expertise and controlled collective intelligence, maintaining mobile optimization benefits while enabling sophisticated federation-wide reasoning capabilities.

Federated persistent cognitive system maintains robust offline functionality across domain-specialized instances, extending capabilities from previous embodiments with federation-aware caching strategies. Domain branch cache maintains locally available copies of frequently accessed domain-specific thoughts, prioritized based on user interaction patterns and predicted future needs. When network connectivity becomes unavailable, system continues processing through local domain instances using cached domain knowledge without requiring cloud access. Offline operation includes capability to process prompts through locally available specialized domains, generate domain-appropriate responses, and store newly created thoughts for later synchronization. When connectivity resumes, hierarchical synchronization protocols efficiently update both local and cloud-based components with thoughts generated during disconnected operation, resolving potential conflicts through timestamp-based versioning and semantic relevance assessment.

Mobile optimization remains central to federated persistent cognitive system despite increased architectural complexity. Domain-specific processing adapts dynamically to device resource constraints through intelligent scheduling that considers battery state, processing capacity, and memory availability. Battery-aware execution extends to federation operations through workload distribution mechanisms that shift resource-intensive processing to cloud environment when battery levels are constrained, while keeping essential domain-specific reasoning available locally. Resource optimization controller coordinates with both domain orchestrators and sleep management system to implement appropriate processing profiles based on current device state, ensuring domain specialization benefits do not compromise energy efficiency. Each domain instance implements progressive loading of specialized knowledge based on immediate relevance, avoiding unnecessary resource consumption by maintaining small active memory footprint focused on current interaction context.

Privacy protection across federated architecture implements sophisticated layered approach beyond foundational safeguards from previous embodiments. Personal cognitive space remains strictly isolated from domain-specific knowledge through cryptographic boundaries and permission-based access controls. When thoughts are considered for promotion from personal to domain level, privacy classifier implements conservative filtering that removes all user-identifying information while preserving essential reasoning patterns. Domain-level thoughts maintain provenance metadata without user attribution, enabling quality assessment without compromising privacy. Federation-level privacy orchestrator continuously monitors knowledge flows between domains, applying stricter evaluation criteria for cross-domain transfers than for intra-domain operations. User maintains explicit control over privacy boundaries through preference settings that can restrict specific knowledge areas from participating in domain-level sharing regardless of anonymization potential.

Conflict resolution between domain-specialized instances employs sophisticated arbitration mechanisms when multiple domains provide divergent responses to similar prompts. When federated cognitive orchestrator identifies potential response conflicts across domains, conflict harmonization process evaluates response differences based on domain authority, reasoning quality, evidence strength, and consistency with established knowledge. Resolution approaches vary based on conflict type, implementing different strategies for factual disagreements versus methodological or theoretical variations. In some cases, system may present multiple domain perspectives with clear attribution and confidence indicators, allowing user to evaluate competing viewpoints. Persistent reasoning state manager tracks conflict patterns over time, identifying recurring disagreements that may indicate fundamental domain boundary issues requiring adjustment or creation of intermediary bridge domains.

Dynamic domain evolution enables federated architecture to adapt specialized capabilities over time based on usage patterns and knowledge development. Domain formation controller continuously analyzes interaction history to identify emerging knowledge clusters that might benefit from specialized processing. When sufficient pattern density accumulates in particular subject area, system may propose new domain specialization, initializing domain-specific components with relevant knowledge structures from parent domains. Existing domains continuously refine boundaries through border adjustment protocols that optimize specialization effectiveness while preventing unhelpful fragmentation. Domain retirement mechanisms identify and gracefully decommission specialized instances that no longer demonstrate sufficient utility, carefully preserving valuable knowledge through controlled migration to adjacent domains. Throughout evolution process, system maintains knowledge continuity while allowing specialization structure to adapt to changing requirements.

Recovery mechanisms within federated architecture implement multi-layered approach to system resilience across domain boundaries. State preservation extends beyond basic continuity to include comprehensive checkpoint systems that maintain recoverable snapshots across federation. When interruptions occur in specific domain instances, state reconstruction protocols activate to rebuild cognitive context from preserved state records, ensuring reasoning continuity despite temporary component unavailability. Domain redundancy mechanisms maintain essential capabilities even when primary specialized instances become inaccessible, implementing graceful degradation that preserves core functionality while potentially reducing specialization depth. Federation-wide recovery coordinator manages restoration processes across domains, prioritizing critical knowledge paths while deferring less essential recovery operations to minimize user-visible disruption.

User control over domain specialization enables collaborative direction of cognitive development across federation. Domain influence mechanisms allow users to explicitly prioritize specific knowledge areas for enhanced specialization, steering system resources toward particular capabilities. Feedback integration pathways analyze user engagement patterns with domain-generated responses, identifying areas where specialization either enhances or fails to improve interaction quality. Domain transparency features provide visibility into specialization boundaries and knowledge areas, enabling informed decisions about how personal queries might benefit from specific domain expertise. Throughout interaction history, system builds personalized domain affinity profiles that capture individual preferences for different specialized capabilities, adaptively routing future prompts to preferred domains when multiple processing paths could apply. Federated adaptation across diverse device ecosystems implements sophisticated rendering and interaction adjustments while maintaining consistent domain knowledge. When users interact through smartphones, tablets, desktop computers, or specialized devices, federation-aware display adaptation modifies presentation layers while preserving underlying domain reasoning capabilities. Voice-centric interaction modes adapt domain terminology to conversational patterns, while visual interfaces leverage richer display capabilities for knowledge visualization across domains. Domain-specific terminology adapts dynamically to match interaction modality constraints, simplifying complex domain concepts for limited interfaces while maintaining precision in knowledge-rich environments. Cross-device domain continuity ensures specialized reasoning remains consistent despite presentation differences, maintaining cognitive thread across different interaction surfaces through persistent state mechanisms. Each domain instance includes modality-specific presentation variants optimized for different device capabilities, selecting appropriate interaction paradigms based on available resources while preserving specialized knowledge integrity.

Security mechanisms throughout federated architecture implement defense-in-depth strategies beyond basic privacy controls. Domain isolation protocols establish cryptographic boundaries between specialized instances, preventing unauthorized access across domain boundaries even in case of component compromise. Federation-level threat detection monitors knowledge flow patterns across domains, identifying anomalous requests or unusual cross-domain transfers that might indicate attempted manipulation. Domain knowledge authentication verifies integrity of specialized content through cryptographic signatures that prevent unauthorized modification or injection of misleading information into domain caches. Adversarial input detection identifies potential attempts to manipulate domain reasoning through carefully crafted prompts, implementing additional verification steps when suspicious patterns are detected. Security posture adapts dynamically based on sensitivity of domain knowledge and interaction context, implementing graduated controls proportional to potential impact of security breaches in different specialized areas.

Versioning and compatibility across domains address challenges of asynchronous evolution through federation-wide coordination mechanisms. Domain knowledge representation implements backward-compatible formats ensuring older specialized instances can process thoughts from newer domains through graceful capability degradation. Cross-domain translation layers handle version differences by maintaining compatibility mappings between different domain reasoning approaches. Federation-level compatibility registry tracks version relationships across specialized instances, ensuring appropriate translation occurs when thoughts traverse domain boundaries with different evolution stages. When significant version disparities arise, knowledge bridging processes transform incompatible representations to maintain interoperability without requiring immediate domain-wide updates. Throughout uneven evolution, federation maintains operational coherence despite varying development speeds across specialized domains through sophisticated version management.

Regulatory compliance across jurisdictional boundaries implements geography-aware operation while maintaining federation capabilities. Location-aware processing determines applicable regulatory frameworks based on user location, domain server location, and data storage jurisdiction. Domain-specific compliance modules adapt knowledge sharing behaviors to align with regional requirements, implementing appropriate data residency, access controls, and processing limitations based on applicable regulations. Cross-border knowledge transfer includes compliance verification that validates regulatory compatibility before allowing information flow between domains operating under different jurisdictional requirements. Data sovereignty boundaries establish appropriate limitations on domain federation across regulatory environments, ensuring each specialized instance operates within compliance parameters for its applicable jurisdiction. Federation architecture supports appropriate regionalization of both domain specialization and knowledge storage while maintaining coordination benefits appropriate to regulatory context.

Knowledge acquisition and integration mechanisms enable continuous domain evolution through multiple learning pathways. Specialized domains continuously update knowledge bases through structured integration processes that evaluate new information against existing domain understanding. Domain-specific learning rates vary based on knowledge stability and development pace in different fields, with rapidly evolving domains implementing more frequent update cycles than stable knowledge areas. Federation-level knowledge coordination ensures cross-domain consistency during update processes, preventing contradictory information from creating reasoning conflicts between specialized instances. User interaction provides valuable feedback for domain knowledge refinement, with successful reasoning patterns receiving positive reinforcement through usage statistics. Throughout knowledge evolution, federation maintains appropriate version control enabling rollback capabilities if updated information proves problematic while preserving successful reasoning patterns across specialization boundaries.

Figure 23B:
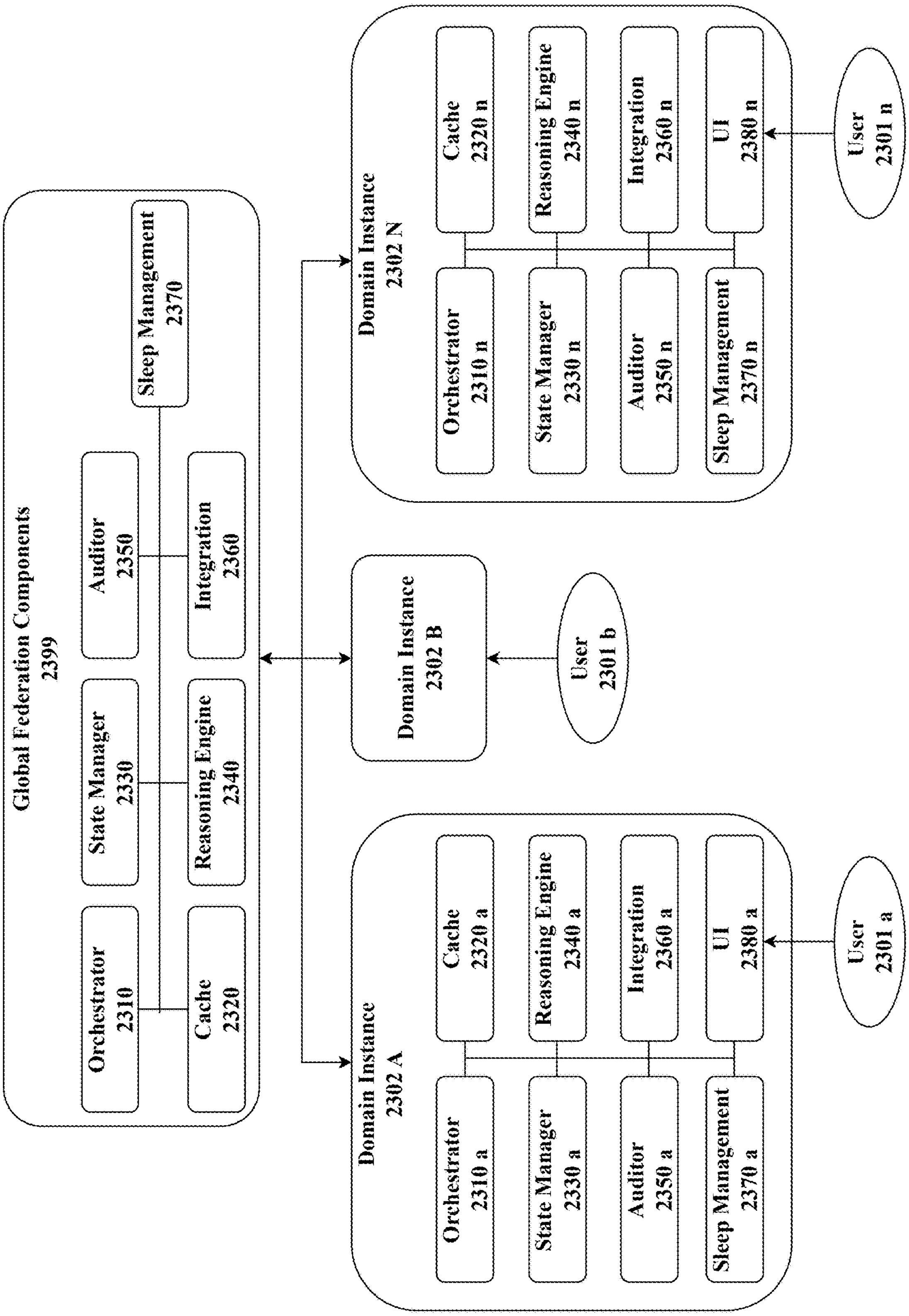
FIG. 23B is a block diagram illustrating federated domain architecture of federated persistent cognitive system.

FIG. 23B is a block diagram illustrating federated domain architecture of federated persistent cognitive system 2300, in an embodiment. This horizontal representation highlights the parallel operation of multiple domain-specialized instances within integrated federated framework.

Domain instances 2302 A, B, and N represent parallel specialized processing units focused on distinct knowledge areas. Each domain instance contains its own complete set of components, including domain-specific federated cognitive orchestrator 2310 *a-n*, domain-specific persistent reasoning state manager 2330 *a-n*, domain-specific autonomous reasoning instance 2340 *a-n*, domain-specific system auditor 2350 *a-n*, domain-specific cross-domain integration framework 2360 *a-n*, domain-specific hierarchical sleep management system 2370 *a-n*, domain-specific user interaction interface 2380 *a-n*, and domain-specific branch cache 2420 *a-n*. These components enable specialized processing while maintaining integration with broader federation.

While each domain instance contains its complete set of components (2310*a-n* through 2380*a-n*), the federated persistent cognitive system 2300 also maintains central coordination components (for example, 2310, 2330, 2350, 2370) that operate across the entire federation. These central components facilitate cross-domain operations, ensure system-wide consistency, and manage collective knowledge sharing. federated cognitive orchestrator 2310 coordinates processing across domain instances, persistent reasoning state manager 2330 maintains cognitive continuity between domains, system auditor 2350 identifies optimization opportunities throughout the federation, and hierarchical sleep management system 2370 coordinates system-wide optimization processes. This multi-layer architecture balances domain specialization with federation-wide coordination, enabling both deep domain-specific expertise and sophisticated cross-domain reasoning capabilities. In various embodiments, the global aspects of federated persistent cognitive system 2300 may directly observe, control or modify domain-specific systems, establishing protocols and interfaces that allow domains to share knowledge and coordinate activities while maintaining their specialized expertise and operational independence. These aspects may also be hierarchical in nature, allowing the system to modulate and dedicate tiers to various background activities, such as learning, analyzing, or comparing aspects such as optimizations between domains, usage patterns, and/or performance metrics across the federation. The central components may implement adaptive governance models that evolve based on observed effectiveness, automatically adjusting the balance between domain autonomy and centralized coordination to maximize both specialized expertise development and collective intelligence capabilities. This dynamic equilibrium enables the system to continuously refine its operational structure, strengthening domain boundaries where specialized knowledge development benefits from isolation while enhancing cross-domain pathways where collaborative insights generate superior reasoning outcomes. Through this sophisticated interplay between specialized domain instances and federation-wide coordination, the system achieves cognitive capabilities that transcend what would be possible through either isolated specialization or undifferentiated generalization alone.

Domain instances 2302 A-N represent various organizational structures depending on implementation context. For example, domains may represent distinct service provider instances where each provider maintains specialized expertise in particular fields while participating in broader knowledge federation. In corporate environments, domains might correspond to departments within organization, such as research and development, customer support, and strategic planning, each developing specialized knowledge while benefiting from controlled cross-department insights. Within conglomerates or multinational corporations, domains could represent different business units or regional operations, maintaining specialized market knowledge while sharing applicable insights across corporate boundaries. In educational contexts, domains might represent different academic disciplines, each maintaining specialized scholarly understanding while facilitating interdisciplinary connections. Healthcare implementations might establish domains for different medical specialties, enabling focused expertise development while supporting multidisciplinary patient care through controlled knowledge sharing.

The designation of Domain N specifically indicates extensibility of federation architecture, illustrating that system supports arbitrary number of specialized domains based on implementation requirements. New domains can be added to federation as needs evolve, with each new domain maintaining appropriate boundaries while participating in collective intelligence through established sharing mechanisms.

Connections between components illustrate data flow throughout federated architecture. Central components connect bidirectionally with each domain instance, providing coordination and management services. Cache structure maintains connections to all domains while implementing graduated access controls between cache tiers. Cross-domain integration frameworks connect between domains through controlled interfaces represented by dotted lines, enabling selective knowledge sharing while maintaining appropriate isolation boundaries.

This federated architecture enables specialized knowledge development within distinct domains while facilitating collaborative intelligence through controlled sharing mechanisms. Multiple domain instances operate in parallel with coordinated central management, creating system that combines benefits of specialization with collective intelligence capabilities. The architecture supports extensibility through addition of new domain instances while maintaining consistent operation through centralized coordination components.

The system balances needs for domain specialization with benefits of collective intelligence by implementing sophisticated knowledge sharing mechanisms with appropriate privacy safeguards and access controls. This balance enables organization to develop deep expertise within specialized domains while leveraging insights across boundaries where appropriate, creating more sophisticated reasoning capabilities than would be possible through either isolated specialization or undifferentiated general models.

In an embodiment, data flow through federated persistent cognitive system 2300 follows distinct patterns that enable sophisticated processing across domain boundaries while maintaining appropriate privacy protections and specialization.

When a user 2301 *a-n* submits a prompt through user interaction interface 2380 *a-n*, the initial flow begins with federated cognitive orchestrator 2310 *a-n* analyzing the prompt characteristics. The orchestrator examines content, context, and complexity indicators to determine optimal processing paths. Based on this analysis, the orchestrator generates processing directives that specify which domain-specialized instances should handle the prompt and what resources should be allocated.

For prompts requiring specialized domain knowledge, the federated cognitive orchestrator 2310 *a-n* routes processing to the appropriate domain instance within autonomous reasoning engine cluster 2340 *a-n*. The selected domain instance processes the prompt using domain-optimized knowledge and reasoning patterns. Meanwhile, persistent reasoning state manager 2330 *a-n* ensures continuity by maintaining cognitive context throughout this processing, preserving relevant history and active reasoning chains regardless of which domain handles the interaction.

In parallel with prompt routing, federated cognitive orchestrator 2310 *a-n* queries multi-tier thought cache hierarchy 2320 *a-n* for relevant thoughts that might assist in prompt processing. This query flows through multiple cache tiers with graduated privacy protections. The system first checks local user cache 2410 *a-n* for personally relevant thoughts with appropriate privacy protections. If no suitable matches exist or additional context is needed, the query extends to branch instance cache 2420 *a-n* for domain-specific knowledge, executive cache 2430 *a-n* for cross-domain insights, and potentially global collective cache 2440 for universally applicable thought patterns.

When thoughts are retrieved from various cache tiers, tier access controls 2450 *a-n* enforce appropriate privacy boundaries, ensuring that sensitive information remains protected while enabling controlled knowledge sharing. Retrieved thoughts combine with the original prompt and flow to the selected domain instance for processing. The domain instance generates additional thoughts specific to current context, which then merge with cached thoughts to create comprehensive understanding.

After thought generation and integration, processing results flow back through federated cognitive orchestrator 2310 *a-n* to user interaction interface 2380 *a-n*, completing the immediate response cycle. Simultaneously, newly generated thoughts flow to classification and transformation system 2460 *a-n*, which analyzes their characteristics to determine appropriate storage locations within multi-tier thought cache hierarchy 2320 *a-n*. Thoughts containing personal information store in local user cache 2410 *a-n*, domain-specific insights in branch instance cache 2420 *a-n*, cross-domain knowledge in executive cache 2430 *a-n*, and universally applicable patterns in global collective cache 2440.

Throughout active processing, system auditor 2350 *a-n* monitors data flows across the federation, gathering performance metrics and identifying optimization opportunities. This monitoring data flows to both federated cognitive orchestrator 2310 for immediate adjustments and hierarchical sleep management system 2370 *a-n* for deferred optimization during system idle periods.

During periods of user inactivity, hierarchical sleep management system 2370 *a-n* initiates optimization processes across the federation. These processes generate background data flows that reorganize thought cache structures, consolidate related insights, and generate novel connections between previously separate knowledge domains. Cross-domain integration framework 2360 *a-n* manages these integration flows, ensuring that knowledge sharing occurs through controlled interfaces that maintain appropriate isolation boundaries while enabling valuable cross-domain insights.

The sophisticated data flow architecture of federated persistent cognitive system 2300 enables continuous knowledge development across specialized domains while facilitating controlled sharing through graduated privacy protections, creating a system that combines deep domain expertise with broader collective intelligence.

Figure 23C:
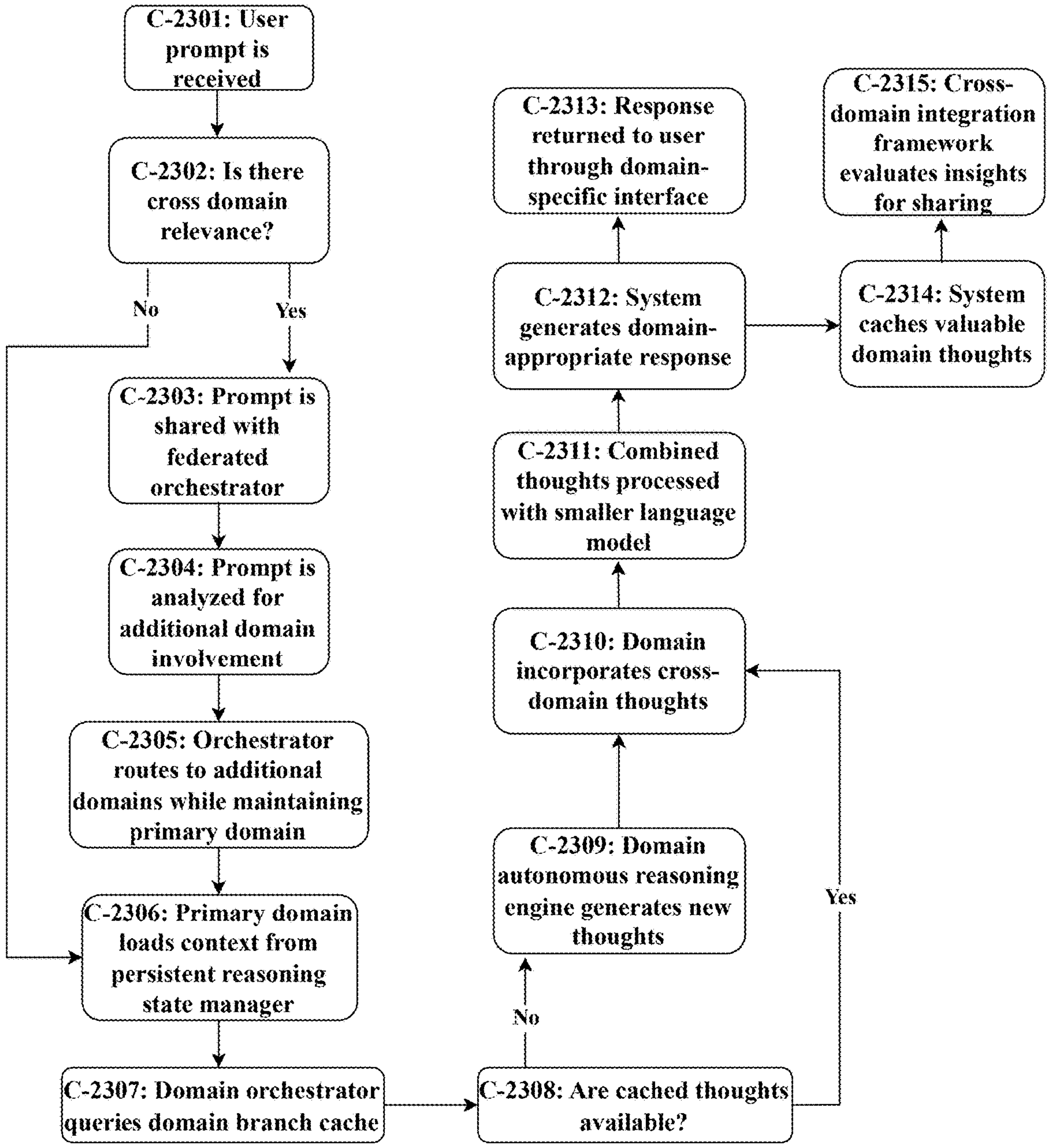
FIG. 23C is a flow diagram illustrating the federated prompt processing flow of federated persistent cognitive system.

FIG. 23C is a flow diagram illustrating the federated prompt processing flow of federated persistent cognitive system 2300, in an embodiment. The process begins when a user submits a prompt through a domain-specific user interface 2380 *a-n*, directly engaging with their specialized domain instance C-2301. The domain cognitive orchestrator 2310 *a-n* initially processes this prompt, but also evaluates whether the request might benefit from federation-level processing or cross-domain knowledge C-2302. If the domain orchestrator determines the prompt is best handled entirely within the domain, it proceeds with domain-specific processing, but if cross-domain relevance is detected, the prompt is shared with the federated cognitive orchestrator 2310 for broader coordination C-2303. The federated orchestrator analyzes the shared prompt to determine if additional domains should contribute to processing, examining factors such as subject matter overlap, interdisciplinary requirements, and potential knowledge from other domains C-2304. Based on this analysis, the orchestrator may route aspects of the prompt to additional domain-specialized instances such as domain B or domain N, while maintaining the originating domain A as the primary processing domain C-2305. The primary domain orchestrator 2310 *a-n* prepares for processing by loading the relevant domain context from the persistent reasoning state manager 2330 *a-n*, ensuring continuity with previous interactions in this specialized field C-2306. The domain orchestrator queries the domain branch cache 2420 *a-n* to determine if relevant domain-specific thoughts are already available for this prompt type, potentially reducing computational requirements by leveraging previously generated reasoning patterns C-2307. If suitable cached thoughts are available, the system retrieves these domain-specialized thoughts from the branch instance cache, prioritizing those with highest relevance to the current prompt C-2308. If no suitable cached thoughts exist, the domain autonomous reasoning engine 2340 *a-n* generates new domain-specific thoughts using its specialized knowledge and reasoning patterns optimized for its particular knowledge domain C-2309. The domain orchestrator also incorporates any relevant cross-domain thoughts received from other domains if the federated orchestrator determined their involvement was beneficial C-2310. The combined thoughts are then processed alongside the original prompt through the smaller language model, maintaining the efficient dual-model approach while leveraging both domain specialization and federation benefits C-2311. The system generates a domain-appropriate response based on the processed thoughts and prompt, incorporating specialized terminology, frameworks, and reasoning approaches unique to this knowledge domain while integrating relevant insights from other domains C-2312. The final response is returned to the user through the domain-specific interface from which the prompt originated, completing the immediate interaction cycle while preserving context for future continuity C-2313. Simultaneously with response delivery, the system caches valuable domain thoughts for future reuse, storing them in the appropriate tier of the domain branch cache 2420 *a-n* based on privacy requirements and reuse potential C-2314. If cross-domain insights were generated during processing, the domain cross-domain integration framework 2360 *a-n* evaluates these for sharing with the broader federation, applying appropriate privacy filters and generalizations before distribution C-2315.

Figure 24:
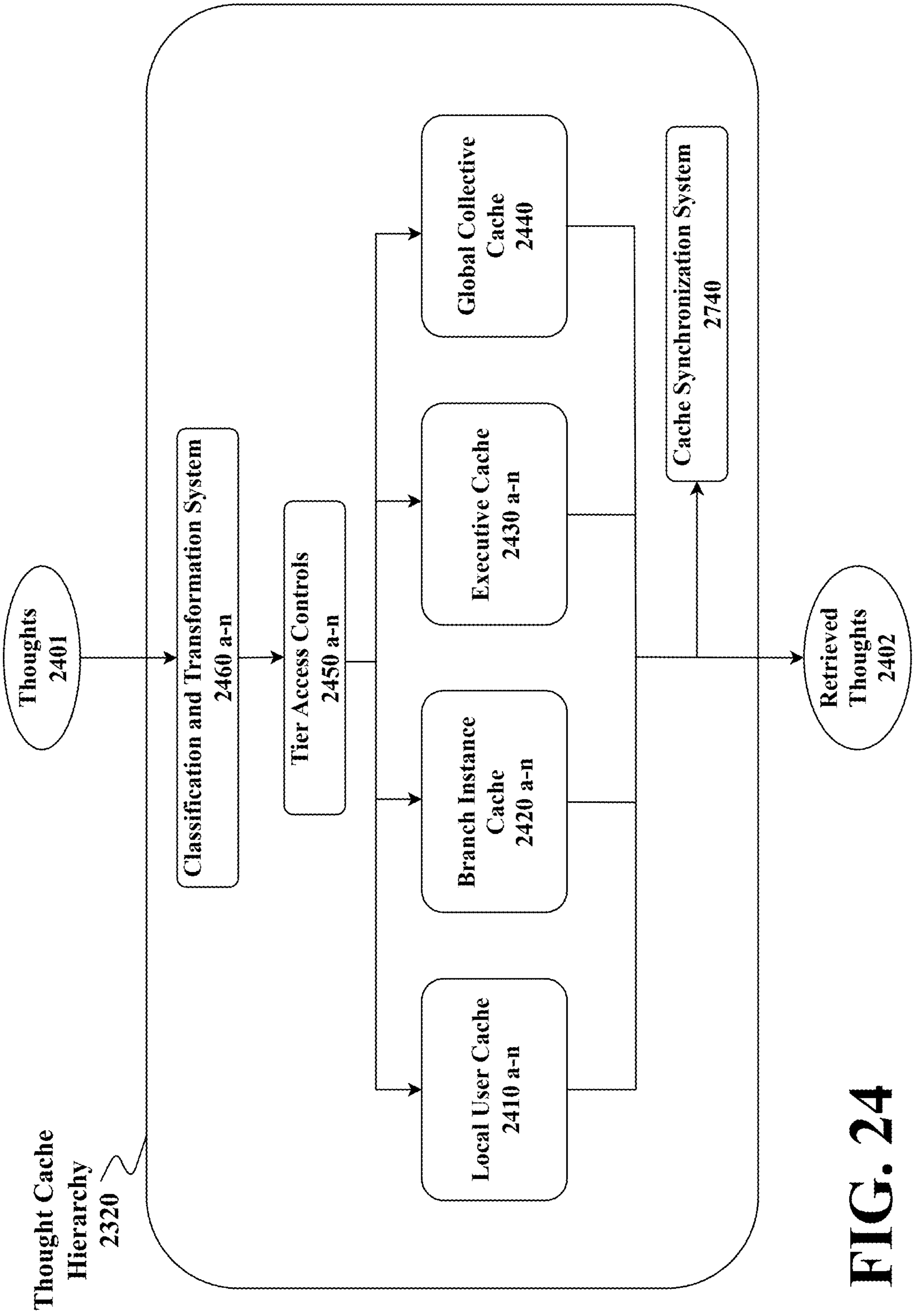
FIG. 24 is a block diagram illustrating exemplary architecture of multi-tier thought cache hierarchy.

FIG. 24 is a block diagram illustrating exemplary architecture of multi-tier thought cache hierarchy 2320, in an embodiment. Multi-tier thought cache hierarchy 2320 extends the three-tier thought caching architecture 1200 from previous embodiments with additional federation-specific layers that enable domain specialization while supporting controlled knowledge sharing within federated persistent cognitive system 2300.

Multi-tier thought cache hierarchy 2320 receives input thoughts or thought queries 2401 from autonomous reasoning engine cluster 2340 and provides retrieved thoughts 2402 in response to queries from federated cognitive orchestrator 2310. Within this bidirectional flow, newly generated thoughts enter the system for classification and storage, while relevant cached thoughts are retrieved to support reasoning processes across the federation.

Local user cache 2410 represents the most private tier of multi-tier thought cache hierarchy 2320, storing thoughts that contain personally identifiable information, user-specific context, or sensitive content that should not be shared beyond individual user environment. Local user cache 2410 typically resides primarily on user devices with selective synchronization to encrypted cloud storage, enabling both offline functionality and cross-device consistency while maintaining strict privacy boundaries.

Branch instance cache 2420 provides domain-specialized storage that maintains thoughts relevant to specific knowledge domains or professional disciplines without containing personally identifiable information. Branch instance cache 2420 typically operates as a distributed system with components residing on both user devices and cloud infrastructure, allowing domain-specific knowledge to benefit multiple users working within the same specialized area while maintaining appropriate access controls.

Executive cache 2430 facilitates controlled knowledge sharing between related domain branches within the federated architecture, storing cross-domain thoughts that connect multiple specialized areas through common principles or analogical relationships. Executive cache 2430 typically operates primarily in cloud environment with selective synchronization to user devices based on relevance and resource availability.

Global collective cache 2440 represents the most broadly shared tier of multi-tier thought cache hierarchy 2320, storing fully anonymized thought patterns with universal applicability across all domains and users. Global collective cache 2440 operates as centralized cloud-based repository with carefully controlled contribution mechanisms to ensure quality and applicability of shared thought patterns.

Tier access controls 2450 manage the flow of information between cache tiers, implementing graduated permissions that determine which thoughts can move between tiers and which system components can access thoughts at each level. Tier access controls 2450 ensure that privacy boundaries remain intact while enabling controlled knowledge sharing across the federation.

Classification and transformation system 2460 analyzes incoming thoughts 2401 to determine appropriate storage locations and creates modified versions suitable for higher sharing tiers. This system identifies personally identifiable information requiring protection, determines domain relevance, and generates appropriately transformed versions that preserve essential reasoning patterns while removing sensitive content.

Cache synchronization system 2470 manages data transfer between distributed storage locations across the federation, implementing efficient protocols that prioritize high-value thoughts during limited connectivity while ensuring consistency across the system. Cache synchronization system 2470 coordinates with communication infrastructure 2390 to optimize data transfer based on network conditions and device states.

In one embodiment, multi-tier thought cache hierarchy 2320 may incorporate various machine learning models to enhance functionality. For example, classification and transformation system 2460 may utilize transformer-based natural language understanding models to analyze thought content for privacy implications and domain relevance. These models may be trained on large corpora of text with privacy annotations and domain categorizations, enabling accurate classification of new thoughts into appropriate privacy categories and domain alignments. Training data may, for example, include synthetic examples of personal information embedded in various contexts, allowing models to learn identification patterns without exposure to actual private data.

The system may also implement generative models that create anonymized versions of thoughts while preserving essential reasoning patterns. These models may be trained through contrastive learning approaches where pairs of thoughts—original and properly anonymized versions—are used to teach transformation patterns that preserve utility while removing identifying information. Training data might include, for example, professional documents with personally identifiable information systematically removed according to privacy best practices.

For retrieval operations, the system may utilize dense retrieval models that encode thoughts as high-dimensional vectors capturing semantic meaning rather than surface text characteristics. These models may, for example, be trained through self-supervised learning approaches where thoughts appearing in similar contexts are encoded with similar vector representations, enabling retrieval based on conceptual similarity rather than lexical matching.

In operation, data flows through multi-tier thought cache hierarchy 2320 according to specific patterns designed to maximize utility while preserving privacy and domain integrity. When autonomous reasoning engine cluster 2340 generates new thoughts, classification and transformation system 2460 analyzes each thought to determine appropriate storage location. Thoughts containing personal information are directed to local user cache 2410, while domain-specific thoughts are routed to appropriate branch instance cache 2420.

For thoughts with potential utility beyond their original context, the system creates modified versions with different privacy and generalization characteristics. These transformed thoughts flow to executive cache 2430 or global collective cache 2440 based on their generalizability, creating knowledge resources available across domains or throughout the entire system.

When federated cognitive orchestrator 2310 processes a new prompt, the system identifies relevant thoughts across all accessible cache tiers. Retrieved thoughts 2402 are then passed to autonomous reasoning engine cluster 2340 for incorporation into the response generation process.

Throughout operation, tier access controls 2450 ensure appropriate boundary enforcement, preventing unauthorized access to protected thoughts while enabling controlled sharing of generalizable content. Cache synchronization system 2470 maintains consistency across distributed storage locations, implementing selective synchronization that prioritizes high-value thoughts during constrained connectivity conditions. Through these coordinated operations, multi-tier thought cache hierarchy 2320 enables sophisticated knowledge sharing across the federation while maintaining essential privacy protections and domain boundaries.

Figure 25:
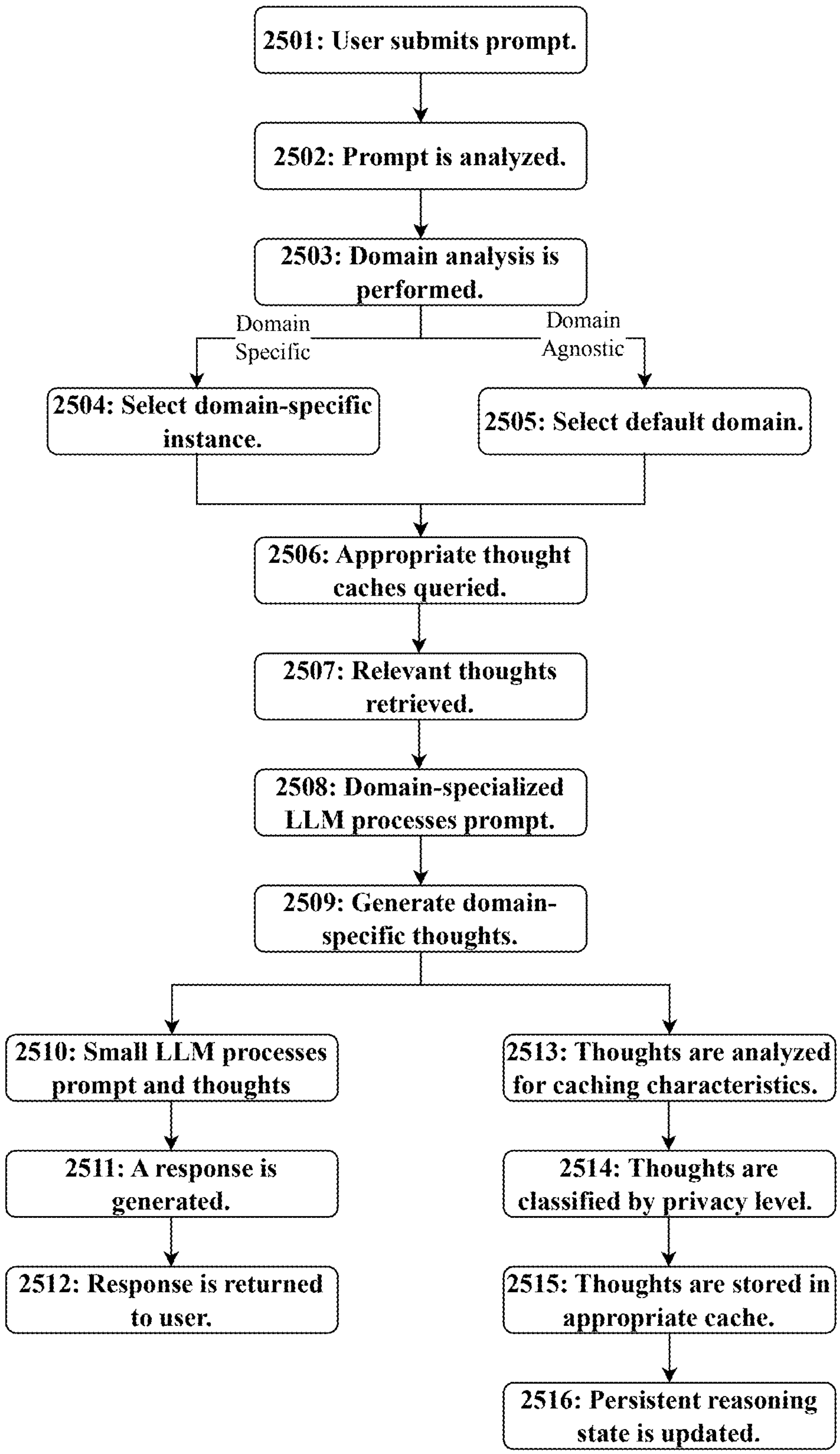
FIG. 25 is a method diagram illustrating the federated prompt processing flow of federated persistent cognitive system.

FIG. 25 is a method diagram illustrating the federated prompt processing flow of federated persistent cognitive system 2300, in an embodiment.

The process begins when a user submits a prompt through an appropriate interface to the federated persistent cognitive system 2501. Upon receiving the prompt, the federated cognitive orchestrator 2310 analyzes the content, context, and metadata associated with the prompt to determine its domain relevance and processing requirements 2502. The orchestrator performs sophisticated domain analysis to identify whether the prompt requires specialized domain knowledge or represents a more general inquiry 2503. If the prompt requires domain-specific expertise, the orchestrator selects the appropriate domain-specialized instance from the autonomous reasoning engine cluster 2340 to handle the processing 2504. For more general inquiries that don't clearly align with a specific domain, the orchestrator routes the prompt to a default domain instance capable of handling broader knowledge requirements 2505.

After determining the appropriate processing path, the system queries the multi-tier thought cache hierarchy 2320 for relevant thoughts that might assist in prompt processing 2506. This query flows through multiple cache tiers with graduated privacy protections, beginning with the local user cache 2410 for personally relevant thoughts, then extending to branch instance cache 2420 for domain-specific knowledge, executive cache 2430 for cross-domain insights, and potentially global collective cache 2440 for universally applicable thought patterns. The system retrieves thoughts from appropriate cache tiers based on relevance scoring, privacy boundaries, and access permissions 2507.

The selected domain-specialized large language model then processes the prompt together with the retrieved thoughts 2508. During this processing, the model generates domain-specific thoughts representing its analysis and reasoning about the prompt before formulating a response 2509. These thoughts capture the model's intermediate reasoning steps informed by both the current prompt and relevant historical context from the cache. The smaller language model then processes both the original prompt and the generated thoughts 2510. This smaller model then produces the final response 2511. This dual-model approach preserves the sophisticated reasoning capabilities of larger models while maintaining computational efficiency. The system returns the generated response to the user through the appropriate interface 2512.

Simultaneously, the newly generated thoughts are routed to the classification and transformation system, which analyzes their characteristics to determine appropriate storage locations within the multi-tier thought cache hierarchy 2513. This classification considers privacy implications, domain relevance, and potential sharing value 2514. Based on this classification, thoughts are stored in appropriate cache tiers-personal thoughts in local user cache 2410, domain-specific insights in branch instance cache 2420, cross-domain knowledge in executive cache 2430, and universally applicable patterns in global collective cache 2440 2515.

Throughout this process, the persistent reasoning state manager 2330 continuously updates the system's cognitive state to maintain continuity across interactions 2516. This state preservation ensures that future interactions will benefit from the context and reasoning developed during the current session, creating a continuous cognitive experience rather than isolated interactions 2519.

Figure 26:
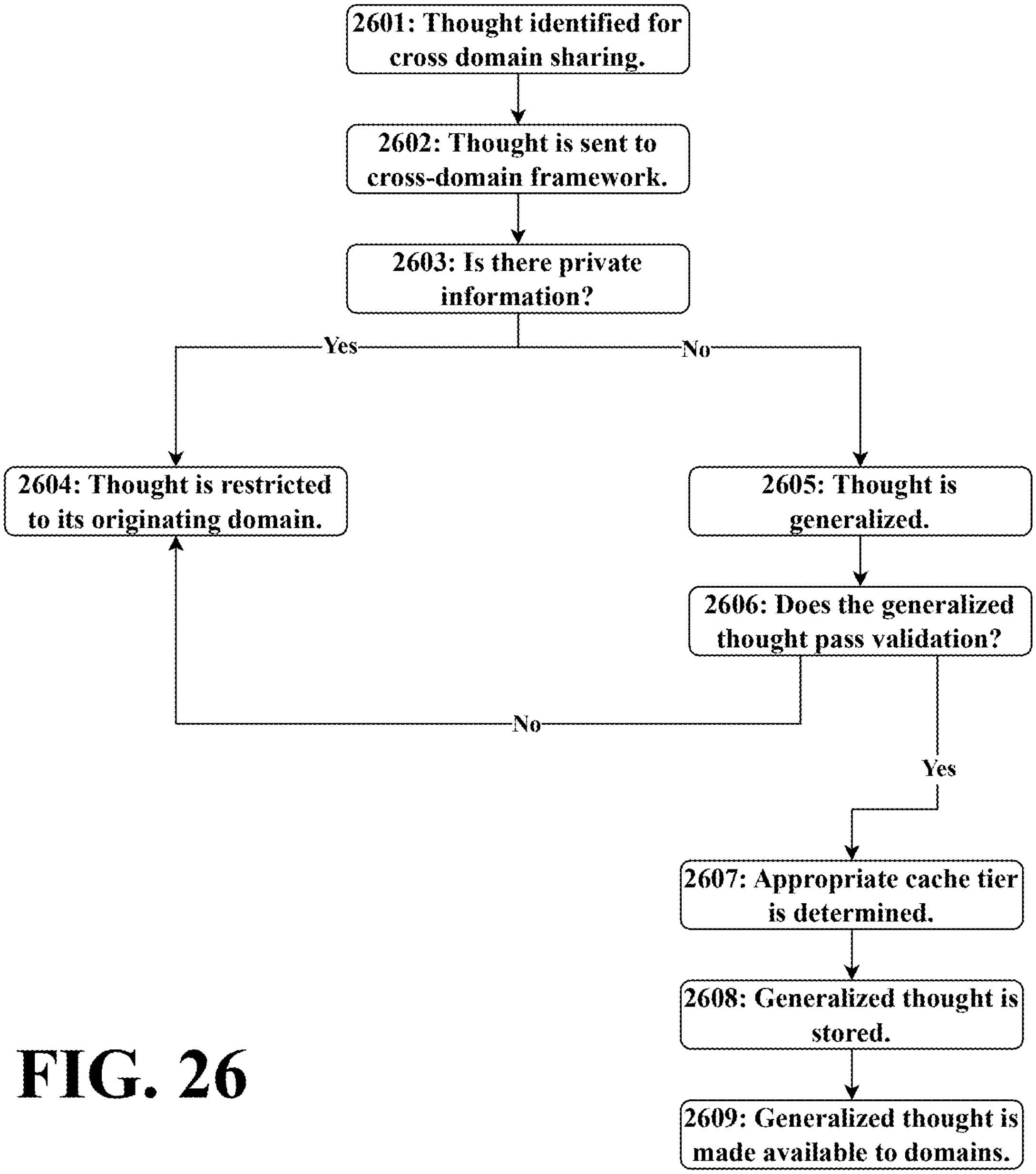
FIG. 26 is a method diagram illustrating the cross-domain knowledge transfer process of federated persistent cognitive system.

FIG. 26 is a method diagram illustrating the cross-domain knowledge transfer process of federated persistent cognitive system 2300, in an embodiment.

The process begins when a thought is identified as potentially valuable for sharing across domains within the federated architecture 2601. This identification may occur during routine thought processing, system auditing, or specialized knowledge sharing operations, and considers factors such as thought quality, generalizability, and potential utility beyond its originating domain. The identified thought is forwarded to the cross-domain integration framework 2360, which serves as the central mechanism for controlled knowledge sharing while maintaining appropriate domain boundaries 2602. Upon receiving the thought, the framework performs comprehensive privacy classification to determine whether the thought contains any personally identifiable information, proprietary content, or domain-specific sensitive data that would restrict its shareability 2603.

If the privacy classification determines that the thought contains private information, it is immediately restricted to its originating domain, preventing any cross-domain exposure of sensitive content 2604. This restriction ensures that privacy boundaries remain intact even as the system facilitates knowledge sharing across specialized domains. For thoughts containing no private information, the cross-domain integration framework initiates a transformation process to convert the thought into a generalized form suitable for cross-domain understanding 2605. This transformation involves replacing domain-specific terminology with more universal language, removing context-specific details while preserving core reasoning patterns, and abstracting concrete examples to more general principles.

Following transformation, the system performs validation checks on the generalized thought to ensure it maintains logical coherence, preserves essential reasoning value, and complies with system-wide knowledge standards 2606. The validation process examines both structural integrity and semantic consistency, verifying that the transformation preserved the thought's core value while successfully removing domain-specific elements. If the validation check fails, indicating that the transformation compromised the thought's utility or did not sufficiently remove domain-specific elements, the thought is restricted to its originating domain, similar to thoughts containing private information.

For thoughts that successfully pass validation, the system determines the appropriate cache tier for storage based on their generalizability, relevance to specific domain clusters, and potential utility across the federation 2607. This determination considers both the thought's content and metadata, including its originating domain, applicable domains, and relationship to existing knowledge structures. The system then stores the validated thought in the selected cache tier with appropriate access controls that define which domains and system components can retrieve and utilize it 2608. These controls implement graduated permissions that balance knowledge sharing with appropriate boundaries, preventing unauthorized access while enabling beneficial cross-domain insights.

Finally, the transformed, validated, and properly stored thought is made available to target domains through controlled access mechanisms, enabling knowledge transfer while maintaining the federated architecture's structured boundaries 2609. This availability integrates the thought into the knowledge resources of appropriate domains, where it can be retrieved and utilized during future reasoning operations.

Figure 27:
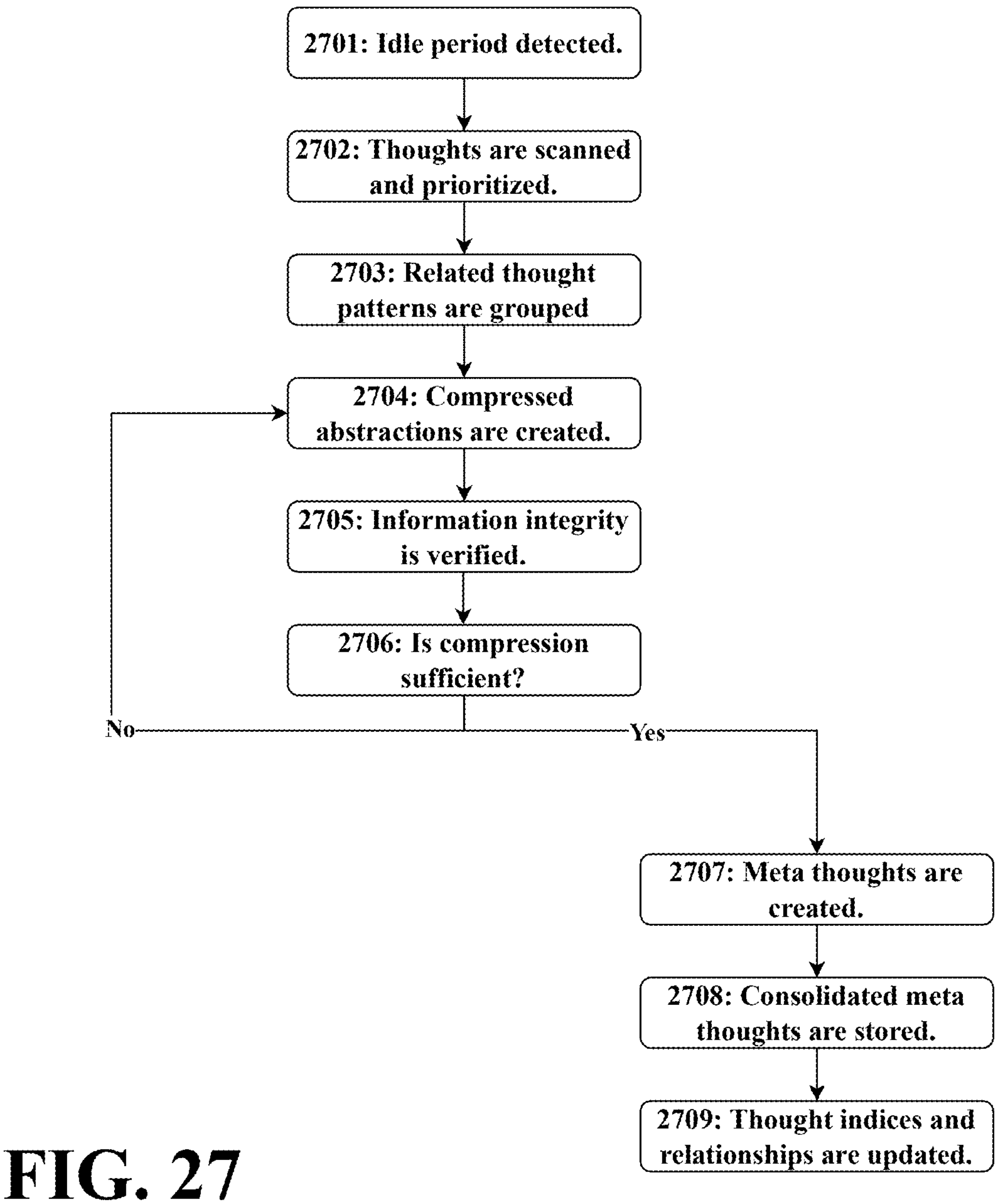
FIG. 27 is a method diagram illustrating the federated memory consolidation process of federated persistent cognitive system.

FIG. 27 is a method diagram illustrating the federated memory consolidation process of federated persistent cognitive system 2300, in an embodiment.

The process begins when the hierarchical sleep management system 2370 detects an appropriate idle period during which optimization processes can execute without impacting user experience 2701. This detection considers factors such as user activity patterns, device states, and system resource availability to identify optimal periods for intensive background processing. Once an idle period is identified, the system scans through the multi-tier thought cache hierarchy and prioritizes thoughts for consolidation based on factors including recency, usage patterns, importance metrics, and relationship density to other thoughts 2702. This prioritization ensures that the most valuable and contextually relevant thought patterns receive processing priority during limited consolidation windows.

The system then groups related thought patterns by identifying semantic similarities, logical connections, and contextual relationships among the prioritized thoughts 2703. These groupings establish meaningful clusters that share conceptual foundations, enabling more efficient consolidation by processing related concepts together rather than individually. For each thought group, the system creates compressed abstractions by identifying essential information patterns, removing redundant details, and distilling core concepts into more compact representations while preserving the fundamental reasoning patterns 2704. This compression applies sophisticated abstraction techniques including concept generalization, example reduction, and relationship simplification to reduce storage requirements without sacrificing critical knowledge elements.

After creating compressed representations, the system verifies information integrity by comparing the abstracted versions against original thought patterns to ensure that essential meaning and relationships remain intact despite the compression process 2705. This verification serves as a quality control mechanism to prevent information loss during consolidation. The system then evaluates whether sufficient compression has been achieved based on predefined thresholds for storage efficiency and information preservation 2706. If the compression level is deemed insufficient, the system returns to the abstraction process to apply more aggressive compression techniques or alternative abstraction approaches until appropriate balance is achieved between storage efficiency and information preservation.

Once sufficient compression is achieved, the system creates a meta-thought containing the abstracted representation, which serves as a higher-level knowledge structure that encapsulates the essential patterns from the original thought group while requiring significantly less storage space 2707. This meta-thought maintains links to the original thoughts for cases where detailed information may need to be reconstructed. The system then transfers these consolidated meta-thoughts to longer-term storage tiers within the multi-tier thought cache hierarchy, moving information from immediate context representations to more compressed long-term storage while maintaining accessibility through efficient indexing structures 2708.

Finally, the system updates thought indices and relationship mappings to reflect the newly consolidated information structure, ensuring that future queries can efficiently locate and retrieve relevant knowledge despite its transformed representation 2709. These updated indices maintain temporal, semantic, and logical relationships between thoughts across different abstraction levels, enabling seamless navigation of the knowledge hierarchy regardless of storage location or representation format.

Figure 28:
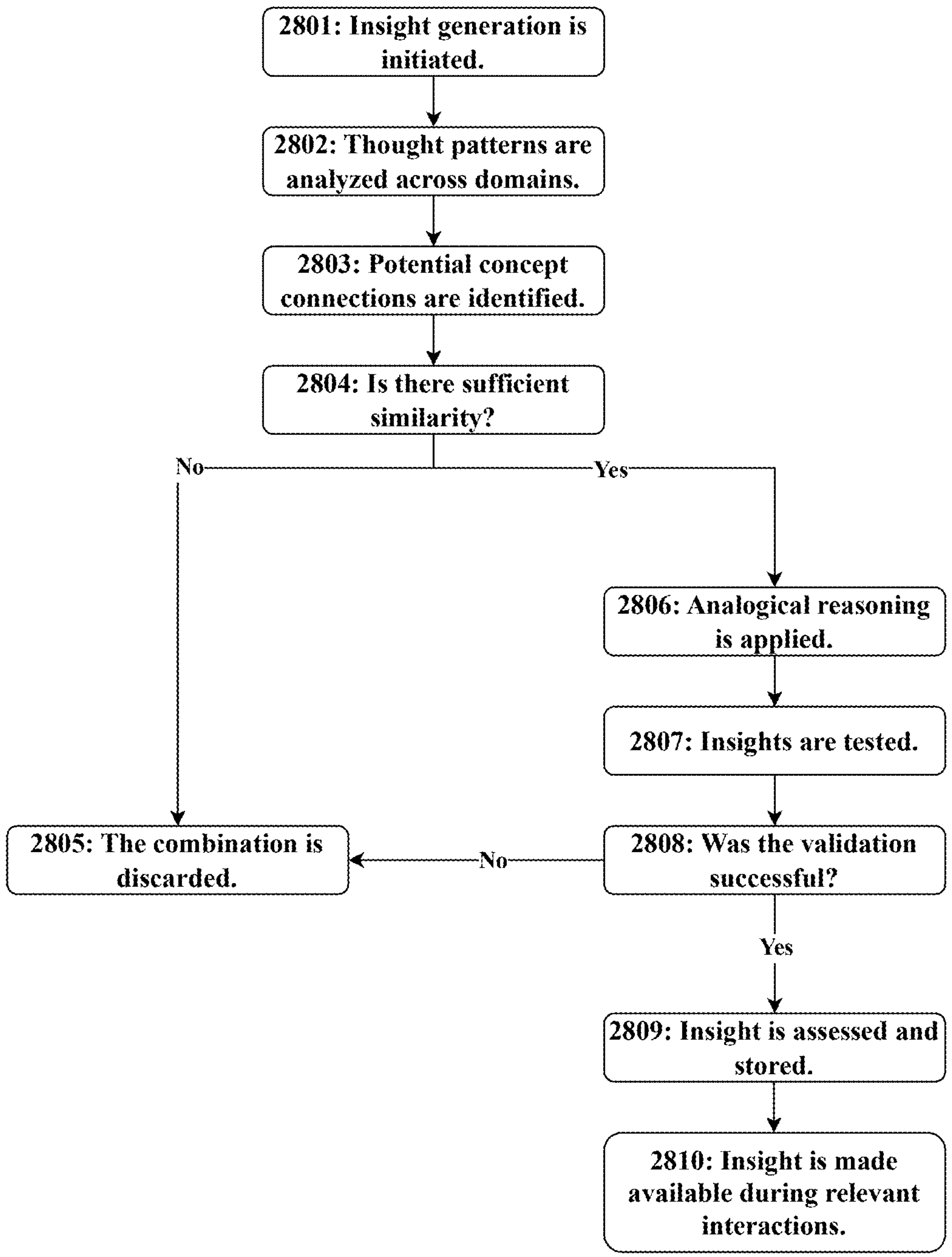
FIG. 28 is a method diagram illustrating the neural insight generation flow of federated persistent cognitive system.

FIG. 28 is a method diagram illustrating the neural insight generation flow of federated persistent cognitive system 2300, in an embodiment.

The process begins when the system auditor 2350 initiates the insight generation process during appropriate system states, such as idle periods or scheduled optimization cycles 2801. This initiation triggers comprehensive analysis of thought patterns across multiple domain-specialized instances within the federated architecture, examining relationships, similarities, and potential connections that might not be apparent within any single domain 2802. Through this analysis, the system identifies potential concept connections between different domains, detecting structural similarities in reasoning patterns despite differences in terminology, context, and application areas 2803. These potential connections represent candidates for cross-domain insights that could yield novel understanding through the combination of specialized knowledge areas.

The system evaluates whether sufficient similarity exists between the identified concepts to warrant further exploration, applying sophisticated metrics that assess structural alignment, logical compatibility, and potential complementarity between different domain-specific knowledge structures 2804. If the similarity assessment falls below established thresholds, indicating limited potential for meaningful connection, the system discards the combination and continues evaluating other potential concept pairs 2805. This filtering mechanism prevents the generation of forced or artificial connections that would yield limited value.

For concept pairs that demonstrate sufficient similarity, the system applies analogical reasoning to transfer solution patterns, analytical frameworks, or explanatory models from one domain to another, creating novel insights through the application of established reasoning structures to new contexts 2806. This analogical process identifies corresponding elements between domains and maps relationships from source to target domain, creating new understanding through structured knowledge transfer. The system then tests the generated insight through internal simulation processes that evaluate logical consistency, factual alignment with established knowledge, and potential utility across relevant scenarios 2807.

If validation testing indicates problems with the generated insight—such as logical inconsistencies, factual conflicts, or limited applicability—the insight is discarded similar to combinations that failed the initial similarity assessment. This validation ensures that only high-quality insights progress to potential user presentation. For insights that successfully pass validation testing, the system performs a comprehensive assessment of potential value to users based on relevance to identified interests, novelty relative to existing knowledge, and practical applicability 2808. Based on this assessment, the system stores the validated insight in appropriate cache tiers 2809, making it available for incorporation into responses during future user interactions where the insight would provide meaningful value 2810.

Figure 29:
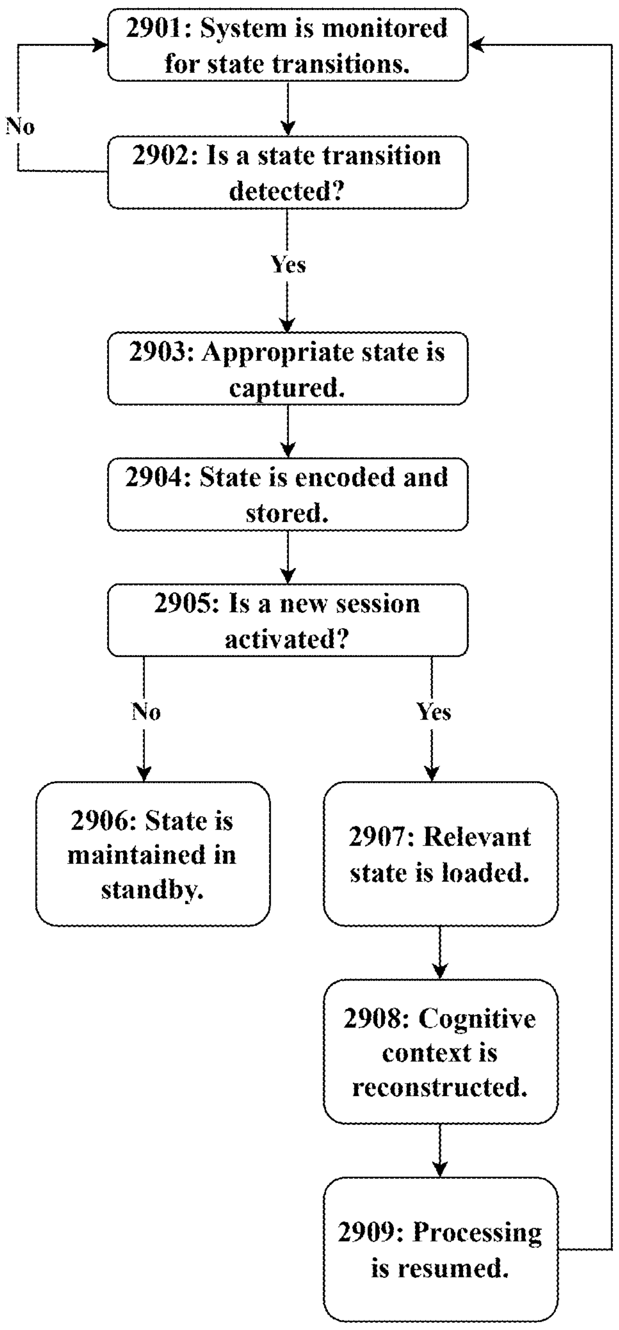
FIG. 29 is a method diagram illustrating the persistent state management process of federated persistent cognitive system.

FIG. 29 is a method diagram illustrating the persistent state management process of federated persistent cognitive system 2300, in an embodiment.

The process begins with the persistent reasoning state manager 2330 continuously monitoring the system for potential state transitions across devices, sessions, and domains 2901. This monitoring involves tracking user interactions, device activities, and system events to identify conditions that would require state preservation and transfer. The state manager evaluates whether a state transition has been detected, such as a user switching devices, ending a session, or moving between specialized domains 2902. If no transition is detected, the state manager continues its monitoring activities without disrupting ongoing operations, maintaining awareness of the current cognitive state without unnecessary processing overhead.

When a state transition is detected, the state manager captures the appropriate state components based on the specific transition type 2903. This capture process creates a comprehensive representation of the current cognitive context, including active reasoning chains, exploration directions, context windows, and relationship mappings relevant to the transition. For device transitions, this includes device-specific interface states and interaction patterns; for session endings, it includes complete cognitive context for future resumption; and for domain handoffs, it includes knowledge relevant to both originating and target domains. The system then encodes the captured state using efficient compression techniques and stores it with appropriate metadata and access controls 2904. This encoding process applies incremental compression to reduce storage requirements while preserving essential context, adding temporal markers and relationship metadata to facilitate future retrieval and reconstruction.

Following state storage, the system continuously checks whether a new session has been activated that would require state restoration 2905. This activation could result from a user returning after an absence, switching to a different device, or transitioning between specialized domains. If no new session requiring the stored state has been activated, the system maintains the state in standby mode, preserving it for future use while minimizing resource consumption 2906. This standby maintenance includes periodic verification of state integrity and adjustments to storage optimization based on changing system conditions and expected access patterns.

When a new session is activated that relates to previously stored state, the system identifies and loads the relevant state components, retrieving compressed state representations and preparing them for reconstruction 2907. The system then reconstructs the cognitive context from the loaded state, restoring thought chains, relationships, and interaction history to recreate the previous cognitive environment 2908. This reconstruction process translates compressed state representations back into working memory structures that can be directly utilized by the system's reasoning components. With the context successfully reconstructed, the system resumes processing from the previous point, maintaining continuity of reasoning despite the intervening transition 2909. This resumption allows reasoning to continue seamlessly across devices, sessions, and domains, preserving the cognitive flow without requiring users to rebuild context manually.

The process then returns to the continuous monitoring state, creating a cycle that maintains persistent cognitive state throughout the system's operation regardless of transitions between devices, sessions, or specialized domains.

The federated persistent cognitive architecture 2300 demonstrates significant potential in multi-institutional healthcare research environments where specialized medical knowledge domains benefit from both isolation and controlled sharing. This non-limiting example describes an implementation spanning multiple medical research institutions focusing on different specialties including oncology, infectious disease, cardiovascular medicine, and neurological disorders within a federated cognitive system that maintains strong domain boundaries while enabling controlled knowledge exchange.

Within this implementation, researchers primarily interact with their domain-specific user interaction interface 2380*a*, 2380*b*, or 2380*c* depending on their specialty area. When a researcher submits a query through their domain-specific interface, the domain cognitive orchestrator 2310*a* first processes this query within the specialized domain context without immediately exposing it to other domains. The domain-specific processing represents the primary operational pathway, preserving specialized terminology, methodologies, and reasoning patterns unique to each medical discipline while operating within the broader federated architecture.

For instance, when an oncology researcher submits a query about cancer treatment protocols through the oncology domain interface 2380*a*, the domain cognitive orchestrator 2310*a* initially evaluates whether the query can be fully addressed within the oncology knowledge domain. The orchestrator 2310*a* first queries the domain branch cache 2420*a* to locate relevant oncology-specific thoughts that might assist in processing the query, leveraging the specialized knowledge base that has developed through repeated interactions and autonomous reasoning operations within the oncology domain. The domain-specific processing path prioritizes depth of specialized knowledge over breadth of cross-domain connections, maintaining the integrity of domain-specific reasoning patterns and terminology that might be diluted in more generalized processing approaches.

The domain cognitive orchestrator 2310*a* also evaluates whether the query might benefit from federation-level processing or cross-domain knowledge based on sophisticated analysis of the query content, context, and metadata. If the query appears to have implications or requirements that extend beyond oncology, the domain orchestrator shares the prompt with the federated cognitive orchestrator 2310 for broader coordination while maintaining primary processing responsibility within the originating domain. This escalation pathway represents a key architectural feature that preserves domain specialization while enabling flexible integration of complementary knowledge when beneficial to response quality.

When a researcher investigates connections between viral infections and cancer development, the oncology domain orchestrator 2310*a* recognizes cross-domain relevance and escalates the query to the federated level through established communication channels. The federated cognitive orchestrator 2310 then analyzes the shared prompt to determine if additional domains should contribute to processing, examining factors such as subject matter overlap, interdisciplinary requirements, and potential knowledge from other domains that might enhance response quality. The federated-level analysis considers both content-based factors such as terminology overlap and contextual factors such as research history and domain relationship patterns established through previous cross-domain interactions.

Based on this analysis, the federated orchestrator 2310 might route aspects of the prompt to additional domain-specialized instances such as the infectious disease domain 2302*b*, while maintaining the originating oncology domain 2302*a* as the primary processing domain. The primary domain orchestrator 2310*a* then prepares for processing by loading the relevant domain context from the persistent reasoning state manager 2330*a*, ensuring continuity with previous interactions in this specialized field while integrating any cross-domain elements identified at the federation level. The context restoration process prioritizes domain-specific history and terminology while creating temporary contextual bridges to other domains when cross-domain processing has been initiated.

The oncology domain orchestrator 2310*a* queries the domain branch cache 2420*a* to determine if relevant domain-specific thoughts are already available for this prompt type, potentially reducing computational requirements by leveraging previously generated reasoning patterns. Multiple specialized cache queries may execute in parallel, with the primary domain searching its branch cache while secondary domains perform targeted searches for specific aspects of the prompt relevant to their specialized knowledge. The cache query process employs sophisticated matching algorithms that consider semantic similarity, contextual alignment, and historical utility of cached thoughts rather than simple keyword matching.

If suitable cached thoughts are available, the system retrieves these domain-specialized thoughts from the branch instance cache, prioritizing those with highest relevance to the current prompt based on multiple similarity metrics and usage patterns. When cross-domain processing has been initiated, cached thoughts from multiple domain branches may be retrieved simultaneously through coordinated cache operations directed by the federated cognitive orchestrator 2310. Cache retrieval operations implement appropriate access controls at each step, ensuring that domain boundaries remain intact even during collaborative processing scenarios.

If no suitable cached thoughts exist in the primary domain, the domain autonomous reasoning engine 2340*a* generates new domain-specific thoughts using its specialized knowledge and reasoning patterns optimized for oncology. Simultaneously, the infectious disease domain autonomous reasoning engine 2340*b* contributes relevant thoughts about viral mechanisms when cross-domain relevance has been identified, with these specialized thoughts flowing through controlled pathways established by the cross-domain integration framework 2360. The autonomous reasoning processes leverage domain-specific models and knowledge structures while maintaining communication through standardized interfaces that preserve specialization while enabling collaboration.

The federated cognitive orchestrator 2310 facilitates cross-domain collaboration while maintaining appropriate boundaries through sophisticated coordination mechanisms that respect domain integrity. The infectious disease thoughts undergo transformation through the cross-domain integration framework 2360*b*, converting domain-specific terminology and relationships into representations that can be integrated with oncology domain processing without compromising domain integrity or specialized terminology. This transformation process preserves the core logical structure and knowledge value while adapting representational elements to ensure compatibility across domain boundaries.

The combined thoughts from both domains are processed through the smaller language model within the primary oncology domain, maintaining the efficient dual-model approach while leveraging both domain specialization and federation benefits. The domain orchestrator 2310*a* coordinates the integration of primary domain thoughts with transformed cross-domain contributions, ensuring coherent processing that preserves domain-appropriate reasoning while incorporating relevant external insights. The dual-model approach continues to provide computational efficiency while the federated architecture enables richer knowledge integration than would be possible in isolated domain processing.

The system generates a domain-appropriate response based on the processed thoughts and prompt, incorporating specialized terminology, frameworks, and reasoning approaches unique to oncology while integrating relevant insights from the infectious disease domain when cross-domain processing has occurred. The response maintains primary fidelity to oncology conventions while seamlessly incorporating infectious disease concepts in ways that remain accessible and relevant to the primary domain user. This integration preserves specialized value from both domains while creating a coherent, unified response that transcends what either domain could produce independently.

The final response returns to the user through the domain-specific interface from which the prompt originated, completing the immediate interaction cycle while preserving context for future continuity through the persistent reasoning state manager 2330*a*. Simultaneously with response delivery, the system caches valuable domain thoughts for future reuse, storing them in the appropriate tier of the domain branch cache 2420*a* based on privacy requirements and reuse potential. The caching process implements sophisticated classification that determines appropriate storage location, access controls, and metadata to facilitate future retrieval.

If cross-domain insights were generated during processing, the domain cross-domain integration framework 2360*a* evaluates these for sharing with the broader federation, applying appropriate privacy filters and generalizations before distribution to the executive cache 2430 or global collective cache 2440. The evaluation considers multiple factors including privacy implications, generalizability, and potential utility across domains, implementing conservative sharing policies that prioritize privacy and domain integrity over maximizing knowledge distribution. Only thoughts that pass rigorous privacy and utility assessments become candidates for promotion to higher-level caches accessible beyond the originating domain.

During periods of researcher inactivity, the domain-specific hierarchical sleep management system 2370*a* coordinates with the federation-level sleep management system 2370 to perform optimization processes without consuming mobile device resources. The domain-specific memory consolidation creates abstracted representations of oncology knowledge that maintain essential reasoning patterns while reducing storage requirements through progressive information distillation techniques unique to the knowledge structures of each domain. Federation-level processes identify potential cross-domain connections through pattern analysis that spans multiple specialized knowledge areas.

The system auditor 2350 monitors patterns across all domains within the federated architecture, with domain-specific auditors 2350*a* and 2350*b* tracking operational patterns within their specialties while sharing anonymized operational data with the federation-level auditor. This multi-level auditing enables optimization within domains while identifying opportunities for cross-domain enhancements without compromising domain boundaries or specialized development pathways. The auditing processes implement sophisticated pattern recognition that identifies optimization opportunities invisible within single-domain contexts.

When network connectivity becomes intermittent during research activities, the system continues functioning using thoughts cached in the local device cache 2410, prioritizing domain-specific knowledge most relevant to recent interactions based on user history and query patterns. The offline functionality leverages the domain-specific branch of the multi-tier thought cache hierarchy, enabling continued specialized operation without federation-level resources. Upon reconnection, the domain-specific cache synchronizes with both the branch instance cache 2420*a* and, through controlled channels, with relevant portions of the executive cache 2430 to maintain cache coherence across the federation.

Throughout operation, the persistent reasoning state manager 2330*a* maintains comprehensive state information specific to the oncology domain, while sharing appropriate state elements with the federation-level state manager 2330 to enable cross-domain continuity. This multi-level state management ensures researchers experience seamless reasoning continuity within their specialty while benefiting from broader connections when relevant to their specific research paths. The state management implements efficient encoding methods that preserve essential context while minimizing storage and transfer requirements.

This non-limiting example illustrates one potential implementation of the federated persistent cognitive architecture 2300, highlighting how domain-specific processing serves as the primary interaction point while federation-level coordination enables controlled cross-domain collaboration when beneficial. The architecture transforms reactive, session-based interactions into a continuous cognitive partnership where specialized knowledge persists and evolves across sessions while benefiting from collective insights throughout the federation without compromising domain integrity or specialized development. The multi-domain federation architecture supports various organizational structures, whether implemented across distinct research institutions, departments within a single organization, or specialized teams within a unified research effort.

The federated persistent cognitive architecture 2300 described herein represents just one potential implementation framework, with numerous alternative applications across diverse domains beyond healthcare research. Financial services organizations might implement domain-specialized instances for different market sectors, enabling deep expertise development in equities, fixed income, commodities, and derivatives while facilitating controlled knowledge sharing during complex multi-asset analysis. Educational institutions could establish domain boundaries around academic disciplines while enabling cross-disciplinary research through the federated architecture. Government intelligence agencies might leverage the architecture to maintain strict compartmentalization between classified domains while enabling controlled information sharing when authorized through the cross-domain integration framework 2360. Manufacturing enterprises could implement domain specialization around different product lines or production processes while sharing generalizable optimization insights through the executive cache 2430. The implementation flexibility extends to both technical architecture and organizational structure, adapting to centralized enterprises, distributed partnerships, or consortium-based collaborative networks while maintaining appropriate knowledge boundaries. These examples are entirely non-limiting in nature and provided solely to illustrate the versatility of the invention across diverse implementation contexts. The ultimate value of the federated persistent cognitive architecture 2300 lies in its ability to transform reactive, session-based interactions into persistent cognitive partnerships that maintain specialized domain integrity while enabling controlled collective intelligence through sophisticated federation mechanisms that respect essential boundaries while facilitating valuable knowledge exchange.

Hardware Architecture

Figure 37:
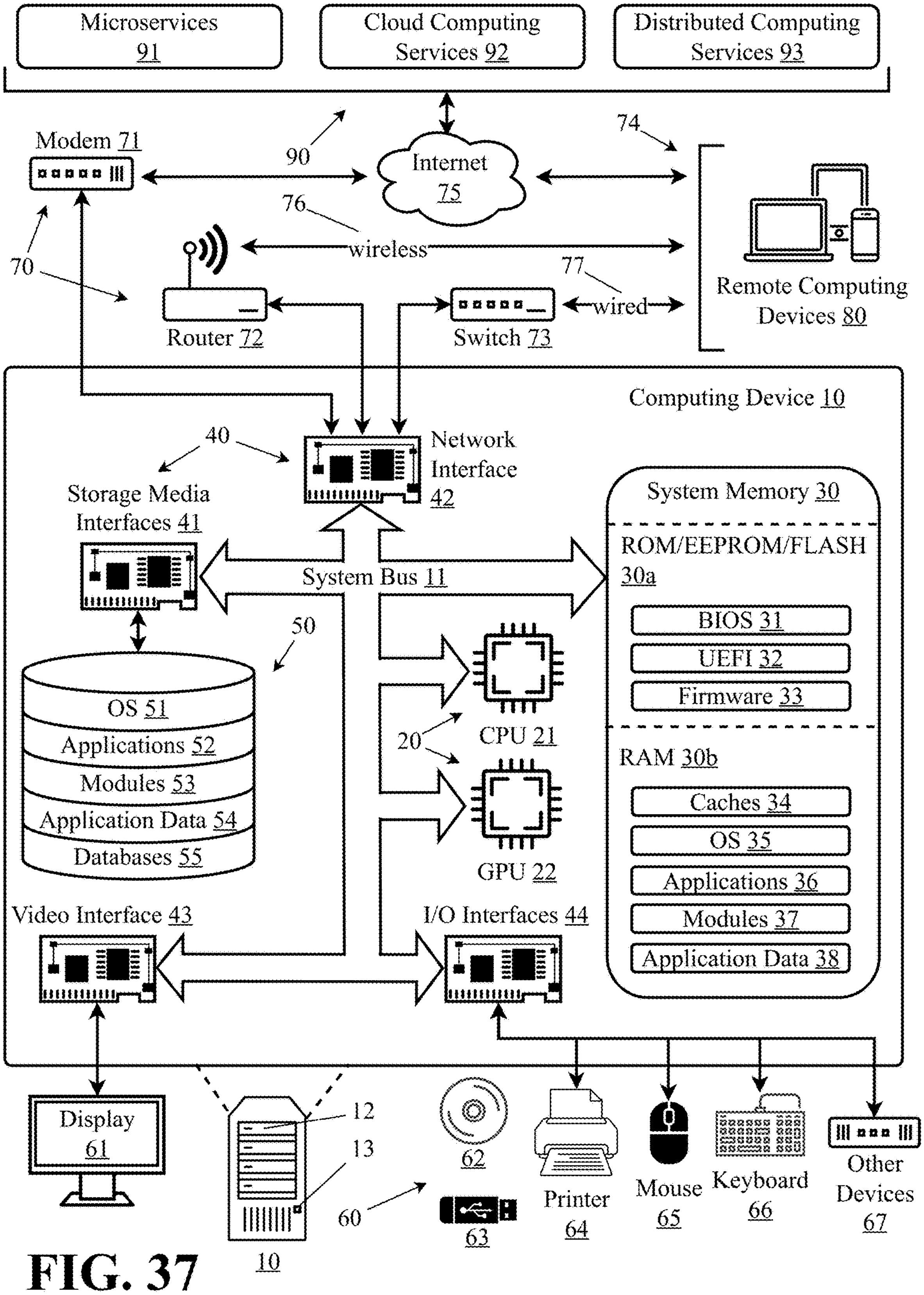
FIG. 37 illustrates an exemplary computing environment on which an embodiment described herein may be implemented.

FIG. 37 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI) 32, which is a modern replacement for BIOS that supports larger hard drives, faster boot times, more security features, and provides native support for graphics and mouse cursors. Non-volatile memory 30*a* may also be used to store firmware 33 comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories 34 which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10

Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A memory-integrated large language model system comprising:

a memory-integrated inference engine that performs token generation with simultaneous memory access through geometric manifold traversal, wherein memory access occurs through goal-conditioned navigation of curved memory regions rather than discrete retrieval operations;

a geometric memory manifold representing memories as navigable regions of increased curvature in latent hyperspace, wherein memories exist as geometric basins that are repeatedly traversed and reinforced through usage;

an intent conditioning system that formulates user queries as utility functions and generates intent vector fields that provide goal-directed guidance for memory traversal through the geometric memory manifold; and a manifold geometry interface that converts geometric memory coordinates into vector representations compatible with language model attention mechanisms and integrates memory-derived vectors with attention computations to produce memory-enhanced token generation;

wherein the memory-integrated inference engine performs intentional remembering by solving a path optimization that minimizes a functional balancing alignment with intent vector fields against manifold traversal costs, and wherein each memory access operation simultaneously retrieves information retrieve from accessed memory basins based on current manifold position and alignment with the intent vector field and reinforces accessed memory regions through bidirectional geometric shaping that strengthens frequently accessed memory pathways.

2. The system of claim 1, wherein the geometric memory manifold comprises a Riemannian manifold with time-evolving metric tensor that encodes memory strength through local curvature intensity.

3. The system of claim 1, wherein the geometric basins comprise episodic memory basins for high-resolution recent experiences, semantic memory basins for abstracted knowledge structures, and procedural memory basins for skill patterns.

4. The system of claim 1, wherein the manifold geometry interface augments standard attention key and value caches with memory-derived vectors to create memory-enhanced attention computations.

5. The system of claim 1, further comprising a dynamic compression engine that implements memory consolidation through geometric flow processes that preserve frequently accessed memory regions while compressing unused areas.

6. The system of claim 5, wherein the dynamic compression engine performs sleep-like consolidation cycles that replay memory trajectories and promote stable patterns across hierarchical memory substrates.

7. The system of claim 1, further comprising a persistent state manager that serializes manifold geometry and restores memory state across inference sessions to maintain cognitive continuity.

8. The system of claim 1, wherein the bidirectional geometric shaping increases curvature along successfully traversed memory paths and deepens memory basins based on access frequency patterns.

9. The system of claim 1, implemented as a federated architecture comprising multiple domain-specific instances that coordinate cross-domain memory access and synthesis.

10. The system of claim 1, wherein the memory-integrated inference engine evaluates memory access necessity for each token generation step and selectively performs manifold traversal based on context complexity requirements.

11. A method for memory-integrated large language model inference comprising the steps of:

performing token generation with simultaneous memory access through geometric manifold traversal, wherein memory access occurs through goal-conditioned navigation of curved memory regions rather than discrete retrieval operations;

maintaining memories as navigable regions of increased curvature in a geometric memory manifold within latent hyperspace, wherein memories exist as geometric basins that are repeatedly traversed and reinforced through usage;

formulating user queries as utility functions and generating intent vector fields that provide goal-directed guidance for memory traversal through the geometric memory manifold;

converting geometric memory coordinates into vector representations compatible with language model attention mechanisms and integrating memory-derived vectors with attention computations to produce memory-enhanced token generation;

performing intentional remembering by solving a path optimization that minimizes a functional balancing alignment with intent vector fields against manifold traversal costs; and simultaneously retrieving information from accessed memory basins based on current manifold position and alignment with the intent vector field and reinforcing accessed memory regions through bidirectional geometric shaping that strengthens frequently accessed memory pathways during each memory access operation.

12. The method of claim 11, wherein maintaining the geometric memory manifold comprises evolving a Riemannian manifold with time-evolving metric tensor that encodes memory strength through local curvature intensity.

13. The method of claim 11, wherein the geometric basins comprise episodic memory basins for high-resolution recent experiences, semantic memory basins for abstracted knowledge structures, and procedural memory basins for skill patterns.

14. The method of claim 11, wherein integrating memory-derived vectors comprises augmenting standard attention key and value caches with memory-derived vectors to create memory-enhanced attention computations.

15. The method of claim 11, further comprising the step of implementing memory consolidation through geometric flow processes that preserve frequently accessed memory regions while compressing unused areas.

16. The method of claim 15, further comprising the step of performing sleep-like consolidation cycles that replay memory trajectories and promote stable patterns across hierarchical memory substrates.

17. The method of claim 11, further comprising the step of serializing manifold geometry and restoring memory state across inference sessions to maintain cognitive continuity.

18. The method of claim 11, wherein the bidirectional geometric shaping comprises increasing curvature along successfully traversed memory paths and deepening memory basins based on access frequency patterns.

19. The method of claim 11, implemented across a federated architecture comprising coordinating cross-domain memory access and synthesis across multiple domain-specific instances.

20. The method of claim 11, further comprising the step of evaluating memory access necessity for each token generation step and selectively performing manifold traversal based on context complexity requirements.

* * * * *